US012786355B2

(12) United States Patent
Aikawa et al.

(10) Patent No.: US 12,786,355 B2
(45) Date of Patent: Nov. 3, 2026

(54) IMAGE CAPTURING APPARATUS, TRANSMISSION METHOD, AND RECORDING MEDIUM

(71) Applicants: Tomonori Aikawa, Kanagawa (JP); Kenichiro Morita, Tokyo (JP); Takeshi Homma, Hyogo (JP)

(72) Inventors: Tomonori Aikawa, Kanagawa (JP); Kenichiro Morita, Tokyo (JP); Takeshi Homma, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 18/751,752

(22) Filed: Jun. 24, 2024

(65) Prior Publication Data

US 2025/0024003 A1 Jan. 16, 2025

(30) Foreign Application Priority Data

Jul. 11, 2023 (JP) ................................ 2023-113459

(51) Int. Cl.

*H04N 7/18* (2006.01)
*H04N 23/61* (2023.01)
*H04N 23/62* (2023.01)
*H04N 23/661* (2023.01)

(52) U.S. Cl.

CPC ............ *H04N 7/183* (2013.01); *H04N 23/61* (2023.01); *H04N 23/62* (2023.01); *H04N 23/662* (2023.01)

(58) Field of Classification Search

None

See application file for complete search history.

(56) References Cited

U.S. PATENT DOCUMENTS

| | | | | |
|---|---|---|---|---|
| 9,635,235 B2 * | 4/2017 | Kimura | H04N 23/667 |
| 10,805,545 B2 * | 10/2020 | Ishida | H04N 23/55 |
| 11,184,549 B2 * | 11/2021 | Yamaguchi | H04N 23/63 |
| 2008/0018748 A1 * | 1/2008 | Niemi | H04N 23/6812 348/E5.024 |
| 2017/0228214 A1 * | 8/2017 | Pacheco | G06F 3/162 |
| 2018/0098029 A1 * | 4/2018 | Cassini | H04N 7/152 |
| 2020/0186407 A1 | 6/2020 | Morita et al. | |
| 2020/0296284 A1 | 9/2020 | Aikawa et al. | |
| 2020/0296302 A1 | 9/2020 | Shiro et al. | |

(Continued)

FOREIGN PATENT DOCUMENTS

| | | |
|---|---|---|
| JP | 2001-024934 A | 1/2001 |
| WO | 2013/049248 | 4/2013 |

OTHER PUBLICATIONS

Extended European Search Report for 24187347.0 mailed on Nov. 25, 2024.

*Primary Examiner* — Daniel T Tekle
(74) *Attorney, Agent, or Firm* — IPUSA, PLLC

(57) ABSTRACT

An image capturing apparatus comprising circuitry to: perform an image capturing process to repeatedly generate image frames included in a moving image captured by an imaging device; transmit the image frames repeatedly generated to a communication terminal at a site different from a site at which the image capturing apparatus is located; accept a lock instruction to lock an image frame to be transmitted to the communication terminal among the image frames; and repeatedly transmit the image frame for which the lock instruction is received to the communication terminal in response to the acceptance of the lock instruction.

14 Claims, 36 Drawing Sheets

(56) References Cited

U.S. PATENT DOCUMENTS

| | | | | |
|---|---|---|---|---|
| 2021/0026589 | A1 | 1/2021 | Morita et al. | |
| 2021/0090211 | A1 | 3/2021 | Takeda et al. | |
| 2021/0148157 | A1* | 5/2021 | Muniz | G07C 9/00309 |
| 2022/0070412 | A1 | 3/2022 | Aikawa et al. | |
| 2022/0086346 | A1 | 3/2022 | Shiro et al. | |
| 2022/0094850 | A1 | 3/2022 | Morita et al. | |
| 2022/0103751 | A1 | 3/2022 | Annaka et al. | |
| 2022/0103763 | A1 | 3/2022 | Annaka et al. | |
| 2022/0311970 | A1 | 9/2022 | Morita et al. | |
| 2025/0024003 | A1* | 1/2025 | Aikawa | H04N 7/142 |

* cited by examiner

SPHERICAL IMAGE CE

FIG. 14A

| DATA ID | DATA NAME | IMAGING DATE AND TIME INFORMATION | IMAGING OPERATOR INFORMATION | IMAGE CAPTURING APPARATUS INFORMATION | IMAGING OPERATOR'S POINT-OF-VIEW INFORMATION | | | IMAGING-TIME VIRTUAL ROOM ID | STORAGE LOCATION INFORMATION OF DATA |
|---|---|---|---|---|---|---|---|---|---|
| | | | | | RADIUS VECTOR | POLAR ANGLE | AZIMUTH ANGLE | | |
| 111 | BUILDING X UNDER CONSTRUCTION | 2021/10/12 9:00 | User111 | T111 | 10 | 20 | 30 | AAA | http://··· |
| 222 | GROUP PHOTOGRAPH AT EVENT Y | 2021/10/12 10:00 | User222 | T222 | 10 | 30 | 40 | BBB | http://··· |
| 333 | SURGERY Z | 2021/10/15 11:00 | User333 | T333 | 20 | 30 | 60 | CCC | http://··· |
| 444 | ··· | ··· | ··· | ··· | ··· | ··· | ··· | ··· | ··· |
| 555 | ··· | ··· | ··· | ··· | ··· | ··· | ··· | ··· | ··· |

FIG. 14B

| DATA ID | DATA NAME | IMAGING DATE AND TIME INFORMATION | IMAGING OPERATOR INFORMATION | IMAGE CAPTURING APPARATUS INFORMATION | IMAGING OPERATOR'S POINT-OF-VIEW INFORMATION | | | IMAGING-TIME VIRTUAL ROOM ID | STORAGE LOCATION INFORMATION OF DATA |
|---|---|---|---|---|---|---|---|---|---|
| | | | | | RADIUS VECTOR | POLAR ANGLE | AZIMUTH ANGLE | | |
| 111 | BUILDING X (1) | 2021/10/12 9:00 | User111 | T111 | 10 | 20 | 30 | AAA | http://··· |
| 222 | BUILDING X (2) | 2021/10/12 10:00 | User222 | T222 | 20 | 30 | 40 | AAA | http://··· |
| 333 | SURGERY Z | 2021/10/15 11:00 | User333 | T333 | 20 | 30 | 60 | BBB | http://··· |
| 444 | ··· | ··· | ··· | ··· | ··· | ··· | ··· | ··· | ··· |
| 555 | ··· | ··· | ··· | ··· | ··· | ··· | ··· | ··· | ··· |

IMAGE CAPTURING APPARATUS, TRANSMISSION METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2023-113459, filed on Jul. 11, 2023, in the Japan Patent Office, the entire disclosure of which is hereby incorporated by reference herein.

BACKGROUND

Technical Field

The present disclosure relates to an image capturing apparatus, a transmission method, and a recording medium.

Related Art

The background communication system transmits at least images and audio from one site to one or more other sites in real time to allow users at remote sites to perform remote communication using the images and audio. An example of such an image is a wide-view image having a wide viewing angle and captured in a wide imaging range as an imaging range including even an area that is difficult for a normal angle of view to cover. Examples of the wide-view image include a 360-degree image that is a captured image of an entire 360-degree view. The 360-degree image is also referred to as a spherical image, an omnidirectional image, or an "all-around" image. A user operates a communication terminal to change a virtual point of view for an image that is part of a wide-view image displayed on a display screen of the communication terminal. As a result, the user can view an area that is part of the wide-view image from any virtual point of view.

SUMMARY

Example embodiments include an image capturing apparatus including circuitry that: performs an image capturing process to repeatedly generate image frames included in a moving image captured by an imaging device; transmits the image frames repeatedly generated to a communication terminal at a site different from a site at which the image capturing apparatus is located; accepts a lock instruction to lock an image frame to be transmitted to the communication terminal among the image frames; and repeatedly transmits the image frame for which the lock instruction is received to the communication terminal in response to the acceptance of the lock instruction.

Example embodiments include a transmission method including: repeatedly generating image frames included in a moving image captured by an imaging device; transmitting the repeatedly generated image frames to a communication terminal at a site different from a site at which the image capturing apparatus is located; accepting a lock instruction to lock an image frame to be transmitted to the communication terminal among the image frames; and repeatedly transmitting the image frame for which the lock instruction is received to the communication terminal in response to the acceptance of the lock instruction.

Example embodiments include a non-transitory recording medium storing a plurality of instructions which, when executed by one or more processors, causes the one or more processors to perform a transmission method including: repeatedly generating image frames included in a moving image captured by an imaging device; transmitting the repeatedly generated image frames to a communication terminal at a site different from a site at which the image capturing apparatus is located; accepting a lock instruction to lock an image frame to be transmitted to the communication terminal among the image frames; and repeatedly transmitting the image frame for which the lock instruction is received to the communication terminal in response to the acceptance of the lock instruction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 14A and 14B are tables illustrating image management information stored in an image management information storage unit according to an embodiment of the present disclosure;

FIGS. 28A and 28B are illustrations of examples of an image frame displayed on the communication terminal while a lock flag is on;

Figure 1:
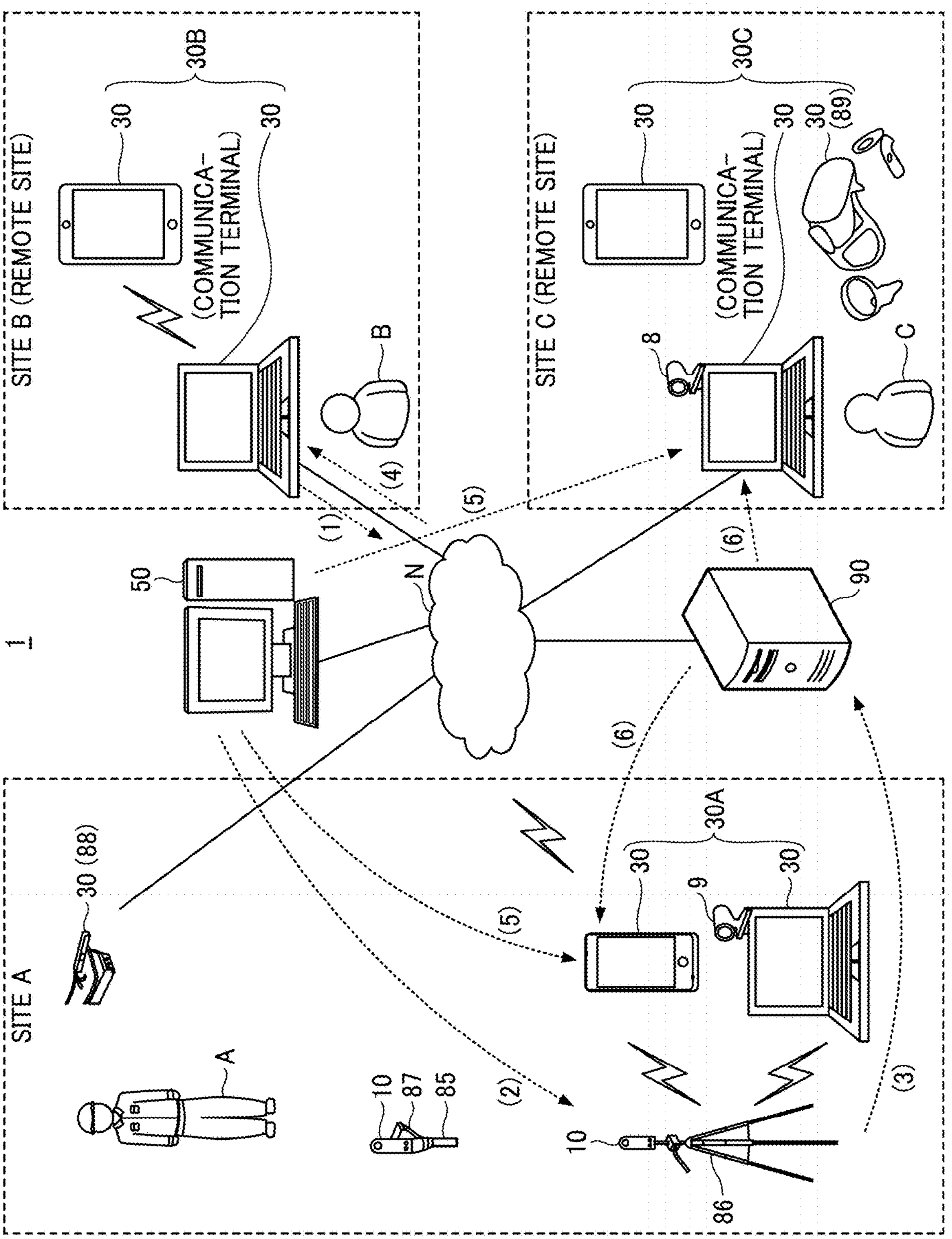
FIG. 1 is a diagram illustrating an example of remote communication using a wide-view image.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing system and a transmission method performed by the information processing system according to an embodiment of the present disclosure will be described hereinafter.

Example of Remote Communication

FIG. 1 is a diagram illustrating an example of remote communication using a wide-view image. In FIG. 1, communication takes place across three sites, namely, a site A, a site B, and a site C, via an information processing system 50. Three sites are merely an example, and communication may be performed across two sites or four or more sites. Remote communication refers to communication that takes place between individuals who are located in physically distant locations by using information technology (IT) tools through images and/or audio.

In one example, the site A is a construction site. The sites B and C are any sites across which a wide-view image can be communicated. In one example, the sites B and C are offices. An image capturing apparatus 10 is placed at the site A. In one example, the image capturing apparatus 10 captures a wide-angle image called a spherical image and an image with a wide angle of view ranging from, for example, 180 degrees to 360 degrees in the horizontal direction. Such an image with a wide angle of view is hereinafter simply referred to as a "wide-view image". Communication terminals 30A to 30C for viewing a wide-view image are placed at the sites A to C, respectively. Any communication terminal or communication terminals among the communication terminals 30A to 30C are hereinafter referred to as a "communication terminal 30" or "communication terminals 30".

In the construction site, workers are involved in various constructions at various places. In one embodiment, a user A at the site A, a user B at the site B, and a user C at the site C monitor any construction and/or work of interest by changing a point of view as appropriate for a wide-view image that is a captured image of the entire construction site. The term "point of view" refers to the center position or range of the entire wide-view image. The center position or range of the entire wide-view image is to be displayed on a display or other means of the communication terminals 30A and 30C.

In one example, the image capturing apparatus 10 is attached to a tripod 86. In another example, the image capturing apparatus 10 is attached to an arm 85 through a gimbal 87. A relay device is installed at the construction site. In FIG. 1, the communication terminal 30A also functions as the relay device. The communication terminal 30A receives a wide-view image from the image capturing apparatus 10 via a wire or wirelessly and transmits the received wide-view image to the information processing system 50. The communication terminal 30A may also function as a terminal for viewing the wide-view image. In one example, a camera 9 connected to (or incorporated in) the communication terminal 30A captures an image having a normal angle of view (or a spherical image), and the captured image is transmitted to the information processing system 50. In another example, smart glasses 88 worn by the user A capture an image having a normal angle of view (or a spherical image), and the captured image is transmitted to the information processing system 50. The user A may be a worker. The smart glasses 88 are an information terminal having a display on which information acquired via the Internet is displayed with a field of view maintained. The smart glasses 88 may be placed at any site.

The communication terminal 30B, such as a personal computer (PC) or a smartphone, is placed at the site B. The communication terminal 30B is any device for communicating with the information processing system 50 via a communication network N. Other examples of the communication terminal 30B include display devices such as a tablet terminal, a personal digital assistant (PDA), an electronic whiteboard, and a projector. A camera may be incorporated in or connected to the communication terminal 30B.

The communication terminal 30C, such as a PC, a smartphone, or virtual reality (VR) goggles 89, is placed at the site C. In FIG. 1, a camera 8 is incorporated in or connected to the communication terminal 30C. The VR goggles 89 are an information terminal for displaying a computer-based artificial world or a spherical image in accordance with the direction of movement of the neck or the body of the user wearing the VR goggles 89. The camera 8 may be for a wide angle of view or a normal angle of view. The communication terminal 30C is any device for communicating with the information processing system 50 via the communication network N. Other examples of the communication terminal 30C include display devices such as a tablet terminal, a PDA, an electronic whiteboard, and a projector. The VR goggles 89 may be placed in any site.

In this embodiment, the image capturing apparatus 10 and the communication terminals 30 are managed using a communication group called a virtual room. The image capturing apparatus 10 is associated with the virtual room. Each of the communication terminals 30 (the user who operates each of the communication terminals 30) enters the virtual room to receive a wide-view image transmitted from the image capturing apparatus 10. As a result, the user can view the wide-view image. The smart glasses 88 and the VR goggles 89 can also be associated with the virtual room. The cameras 8 and 9 enter the virtual room together with the communication terminals 30.

The users A to C at the sites A to C can each change the point of view for the wide-view image, as desired. Thus, the users A to C may view the wide-view image in real time from different points of view. It may be difficult for the users A to C to mutually understand each other. In this embodiment, accordingly, the point of view of the communication terminal 30 at the site A is shared by the communication terminals 30 at the other sites, namely, the sites B and C. An overview of the sharing of the point of view will be described. In the following description, in one example, the point of view of the user B at the site B is shared by the users A and C at the sites A and C.

(1) The communication terminals 30A to 30C share a wide-view image captured by the image capturing apparatus 10. In response to the user B making a request to capture a wide-view image while viewing the wide-view image from any point of view on the communication terminal 30B, the communication terminal 30B transmits point-of-view information and the request to the information processing system 50.

(2) In response to the request, the information processing system 50 designates point-of-view information and transmits an image capturing request to the image capturing apparatus 10 to capture an image (either a still image or a moving image).

(3) The image capturing apparatus 10 captures a wide-view image in response to the image capturing request, and stores the wide-view image and the point-of-view information in a uniform resource locator (URL) transmitted from the information processing system 50. In FIG. 1, the image capturing apparatus 10 stores the wide-view image and the point-of-view information in a storage 90. In one embodiment, the wide-view image stored in the storage 90 is downloaded and displayed by any of the communication terminals 30.

(4) The information processing system 50 transmits the URL to the communication terminal 30B.

(5) The information processing system 50 further transmits the URL to the communication terminals 30A and 30C, which are in the same virtual room as that associated with the image capturing apparatus 10 and the communication terminal 30B, automatically or in response to a request from the user B.

(6) The communication terminals 30A and 30C connect to the URL and receive the point-of-view information and the wide-view image. Each of the communication terminals 30A and 30C sets and displays the point of view identified by the point-of-view information such that the point of view matches the center of an image field. In one embodiment, the point of view is not made to completely match the center of the image field. In another embodiment, the point of view may be set and displayed so as to be included in a range near the center of the image field.

The same applies when the point of view of the user A at the site A is shared by the users B and C at the sites B and C and when the point of view of the user C at the site C is shared by the users A and B at the sites A and B.

As described above, in a communication system 1 according to this embodiment, even after a wide-view image is distributed, point-of-view information is shared at the respective sites. This facilitates understanding among users at the respective sites.

In (3), the image capturing apparatus 10 may transmit the wide-view image itself to the information processing system 50. In (4), the information processing system 50 may transmit the wide-view image to the communication terminals 30A to 30C.

In the example illustrated in FIG. 1, the image capturing apparatus 10 is placed at a construction site. This embodiment is also applicable to VR education, event distribution, remote customer services, telemedicine services, and other situations. In VR education, the image capturing apparatus 10 is placed at a site such as a study room or a laboratory. Students can view such as a blackboard, an instrument, a sample, an experimental result, from remote sites while changing the points of view as appropriate. In event distribution, the image capturing apparatus 10 is placed in a venue of an event to be held on-site. Event participants such as an audience can view the details in the venue online from remote sites while changing the points of view as appropriate. The details in the venue include images of event performers, event participants, and event presenters, images of objects involved in the event, such as products and exhibits, images of materials involved in the event, and images of the venue. The event may be held indoor or outdoor, and examples of the venue of the event include venues such as sports stadiums, concert halls, and theaters. In remote customer services, for example, in customer services for a travel agency, the image capturing apparatus 10 is placed at each of travel destination sites. A customer can plan their itinerary from a remote site while changing the point of view as appropriate. In telemedicine services, in one example, the image capturing apparatus 10 is placed in a medical setting such as an operating room. Medical people such as doctors, medical students, and persons related to medical instruments can view the performance of a doctor(s) and a nurse(s) during on-site medical treatment, the arrangement of medical instruments, the state of a patient, vitals, and the like from remote sites while changing the points of view as appropriate.

The site at which an image is captured is not limited to any of the sites described above. An image may be captured in any space that a user (or viewer) at a viewing site desires to remotely grasp. Examples of such a space include a school, a factory, a warehouse, a building site, a server room, and a store.

The term "tenant" refers to an entity such as a company or an organization that has a contract with a service provider to receive an image distribution service. In this embodiment, the service provider is the information processing system 50. In one example, a user belongs to the tenant. In another example, a user may personally subscribe to the service. A user, an image capturing apparatus, a virtual room, and the like are registered in a tenant.

The term "site" refers to a location where activity takes place. In this embodiment, a conference room will be described as an example of a site. The conference room is a room to be used mainly for a conference. A conference is an event where people gather to discuss something and is also referred to as a meeting, a session, a gathering, or an assembly.

The term "device" refers to an apparatus different from the communication terminal 30 for general purposes such as a PC or a smartphone. In one example, the device is an image capturing apparatus or an apparatus for viewing a wide-view image. In this embodiment, examples of the device include the image capturing apparatus 10, the smart glasses 88, and the VR goggles 89.

The term "point-of-view information" refers to parameter information that specifies which predetermined area in a wide-view image to be displayed on the display is to be displayed on the display. In this embodiment, in one example, the point-of-view information includes a radius vector, a polar angle, and an azimuth angle of the center of the wide-view image to be displayed on the display. In another example, other parameter information such as the coordinates of diagonal vertices may be used to specify a predetermined area in the wide-view image.

The term "wide-view image" refers to an image having a wide viewing angle and captured in a wide imaging range. The term "wide-view image" is used to include a 360-degree image that is a captured image of an entire 360-degree view. The 360-degree image is also referred to as a spherical image, an omnidirectional image, or an "all-around" image.

Remote communication refers to communication that takes place between individuals who are located in physically distant locations by using IT tools through images and/or audio.

The term "VR education" refers to an educational tool that uses VR technology to encourage children to explore academic interests. The VR technology creates a simulated world and immerses users in the world that the users are seeing as if the users were physically present in the world. The term "remote customer service" refers to a business where a staff member at a remote location provides product guidance to customers (or users) by using a video conference through a tablet or a display.

The term "image" refers to a visual representation of an event on a medium. The term "image data" refers to data of images that can be handled by a computer. The term "video" refers to an image displayed on a display device. In particular, the "video" refers to a subdivision of the images, such as a moving image.

An image having a normal angle of view is not a wide-view image. In this embodiment, such an image is referred to as a non-wide-view image, that is, a planar image.

The term "communication group" refers to a group of users who share a wide-view image, that is, a group of users to whom a wide-view image is to be distributed. The communication group will be described with the term "virtual room" in the sense that in a typical space, the users in the same room can share a wide-view image. The term "virtual" means being implemented by information processing via a network.

Users at respective sites perform remote communication across remote locations. The remote communication is a meeting, which is an online meeting, accessible from remote locations, or sites. The meeting means a gathering of people for consultation, or discussion. Examples of the meeting include, but are not limited to, serving a customer, a meeting, a conference, a gathering, an assembly, a study session, a class, a seminar, and a presentation. The remote communication is not necessarily bidirectional communication. Thus, the virtual room may be referred to as a virtual conference room.

Example Configuration of Communication System

Figure 2:
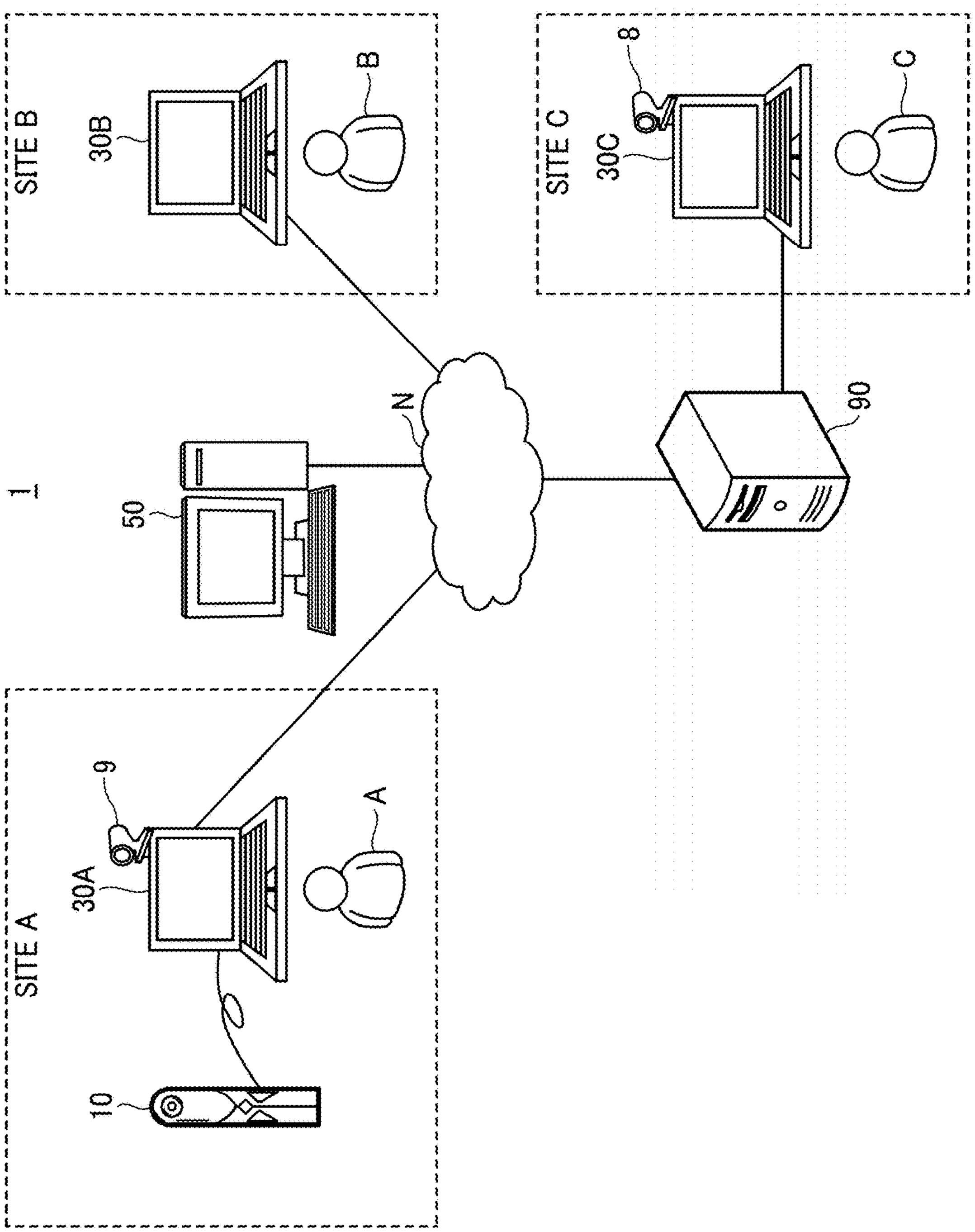
FIG. 2 is a diagram illustrating an example schematic configuration of a communication system.

FIG. 2 is a diagram illustrating an example schematic configuration of the communication system 1. The communication system 1 is a system for transmitting and receiving a wide-view image captured by the image capturing apparatus 10 or an image having a normal angle of view bidirectionally among a plurality of sites. In the communication system 1, an image distributed from one of the sites is displayed at the other sites and is viewable by users at the other sites. In one example, a spherical image captured by the image capturing apparatus 10 is distributed as the wide-view image. In the communication system 1, for example, a wide-view image captured at a predetermined site is remotely viewable at another site.

In the communication system 1, as illustrated in FIG. 2, the image capturing apparatus 10 and the communication terminal 30A placed at the site A, the information processing system 50, and the communication terminals 30B and 30C placed at a plurality of sites, namely, the sites B and C, respectively, are communicably connected to each other.

In a case where the image capturing apparatus 10 is directly connectable to the communication network N, the communication terminal 30A serving as a relay device (e.g., a router) is not used. In this case, the image capturing apparatus 10 is connected to the communication network N without intervention of the communication terminal 30A. In a case where the communication terminal 30A is placed at the site A, the communication terminal 30A also functions as a relay device, and the user A can view a wide-view image in a manner similar to that of the communication terminals 30B and 30C. The image capturing apparatus 10 may additionally be placed at a site other than the site A, or a plurality of image capturing apparatuses 10 may be placed at the site A.

In one embodiment, each communication terminal 30 and the information processing system 50 communicate with each other via the communication network N. The communication network N includes the Internet, a mobile communication network, and a local area network (LAN), for example. The communication network N may include a wired communication network and a wireless communication network. The wireless communication network may be based on a wireless communication standard such as third generation (3G), fourth generation (4G), fifth generation (5G), Wireless Fidelity (Wi-Fi®), Worldwide Interoperability for Microwave Access (WiMAX), or Long Term Evolution (LTE).

The image capturing apparatus 10 is a special digital camera configured to capture an image of an object and/or surroundings such as scenery to obtain two hemispherical images, from which a spherical image is generated, as described below. The wide-view image obtained by the image capturing apparatus 10 may be a moving image or a still image, or may include both of a moving image and a still image. In one example, the captured image may be an image with accompanying audio. In another example, the captured image may be video serving as a moving image including a plurality of images.

The communication terminal 30 is a computer such as a PC to be operated by a user at each site. The communication terminal 30 displays an image captured at the site where the communication terminal 30 is placed, and a wide-view image (still image and/or moving image) and an image having a normal angle of view, which are distributed from other sites. For example, the communication terminal 30 acquires a wide-view image, which is captured by the image capturing apparatus 10, via the communication network N. The communication terminal 30 has installed therein software for executing image processing, such as Open Graphics Library for Embedded Systems (OpenGL ES), and can display an image based on point-of-view information that specifies a partial area in the wide-view image. OpenGL ES is an example of software for executing image processing. Any other software may be used. In one example, the communication terminal 30 does not have installed therein software for executing image processing, and executes image processing by using software received from the outside or receives a result of image processing executed by external software to display an image. That is, the communication terminal 30 can display a predetermined area, which is part of the wide-view image.

In one embodiment, the communication terminal 30 changes the point of view for the display range of the wide-view image, as desired, in response to the user's operation. The communication terminal 30 shifts the virtual point of view in response to a user operation input (such as key input, dragging, or scrolling) on a touch panel, a direction button, a mouse, a keyboard, a touch pad, for example, to change and display a visual field range (predetermined area) based on point-of-view information corresponding to a point of view obtained by shifting the virtual point of view. In one example, the communication terminal 30 is a communication terminal to be worn by the user, such as VR goggles. In response to a change in the movement of the user wearing the communication terminal 30, position information of the communication terminal 30 is changed. In response to detection of the change in the position information, the virtual point of view is shifted in accordance with the detected position information to change a visual field range (predetermined area), based on point-of-view information corresponding to the shifted point of view, and the changed visual field range (predetermined area) is displayed.

The communication terminal 30A acquires a wide-view image from the image capturing apparatus 10 via a wired cable such as a Universal Serial Bus (USB) cable and distributes the acquired wide-view image to the communication terminal 30 at another site via the information processing system 50. The connection between the image capturing apparatus 10 and the communication terminal 30A may be either a wired connection using a wired cable or a wireless connection using short-range wireless communication, for example. A plurality of communication terminals 30A may be placed at the site A.

In one example, the user A at the site A wears the smart glasses 88, and the smart glasses 88 are connected to the communication network N. In one embodiment, an image captured by the smart glasses 88 is transmitted to the information processing system 50 via the communication network N, and the information processing system 50 distributes the image to the communication terminal 30 at each site.

The communication terminal 30B is placed at the site B where the user B is located, and the communication terminal 30C is placed at the site C where the user C is located. A plurality of communication terminals 30B may be placed at the site B, and a plurality of communication terminals 30C may be placed at the site C. The users B and C may carry the communication terminals 30B and 30C, respectively.

Each of the communication terminals 30A to 30C at the sites A to C may be internally or externally provided with the camera 8 or 9. Each of the communication terminals 30A to 30C may distribute an image of the corresponding one of the sites A to C, which is captured by the camera 8 or 9 thereof, to the other sites. Any device may be placed at each of the sites A to C.

The arrangement of the terminals and apparatuses (i.e., the communication terminals 30 and the image capturing apparatus 10) and the users A to C illustrated in FIG. 2 is an example. Any other arrangement may be used. Examples of the communication terminal 30 are not limited to a PC, but include a tablet terminal, a smartphone, a wearable terminal, a projector, an interactive white board (IWB), and a telepresence robot. The IWB is an electronic whiteboard with mutual communication capability. The communication terminal 30 is any computer on which a web browser or an application dedicated to an image distribution service operates.

In one example, the image capturing apparatus 10 includes a display and displays an image distributed from another site on the display.

The information processing system 50 includes one or more information processing apparatuses. The information processing system 50 manages and controls communication among the image capturing apparatus 10 and the communication terminals 30 at the respective sites and manages a wide-view image to be transmitted and received. The information processing system 50 provides a platform on which a function of providing an image distribution service for distributing a wide-view image is available. The platform may be made available to a person, a company, or any other service provider that desires to provide an image distribution service, under contract. A service provider that provides an image distribution service to a user by using a platform is hereinafter referred to as a platform contractor to distinguish the service provider from a tenant who receives the image distribution service.

The information processing system 50 may publish an application programming interface (API) as a platform, and the platform contractor may use the API to provide various image distribution services. The platform contractor mainly develops software such as an application for calling the API or the screen to be displayed on the communication terminal 30. That is, the functions to be provided by the API, such as image distribution, do not have to be developed from scratch.

The information processing system 50 may be implemented by a single computer or a plurality of computers such that the components (functions or means) of the information processing system 50 are assigned to the plurality of computers as appropriate. All or some of the functions of the information processing system 50 may be implemented by a server computer residing in a cloud environment or a server computer residing in an on-premise environment.

The storage 90 is a storage device separate from the information processing system 50. In one embodiment, the storage 90 is an external storage. The external storage may be a cloud or on-premise storage. In another embodiment, the storage 90 is a storage included in the information processing system 50.

Example Hardware Configuration

Next, the hardware configurations of each apparatus or terminal included in the communication system 1 according to this embodiment will be described with reference to FIGS. 3 and 4. In the hardware configurations illustrated in FIGS. 3 and 4, certain hardware elements may be added or deleted as appropriate.

Hardware Configuration of Image Capturing Apparatus

First, the hardware configuration of the image capturing apparatus 10 will be described with reference to FIG. 3. FIG. 3 is a diagram illustrating an example hardware configuration of the image capturing apparatus 10. In the following description, the image capturing apparatus 10 is a spherical (omnidirectional) image capturing apparatus including two imaging elements. In some embodiments, the image capturing apparatus 10 includes any number of imaging elements, provided that the image capturing apparatus 10 includes at least two imaging elements. In one example, the image capturing apparatus 10 is not dedicated to omnidirectional image capturing, and an external omnidirectional image capturing unit is attached to a general-purpose digital camera or a smartphone to implement functions that are substantially the same as those of the image capturing apparatus 10.

Figure 3:
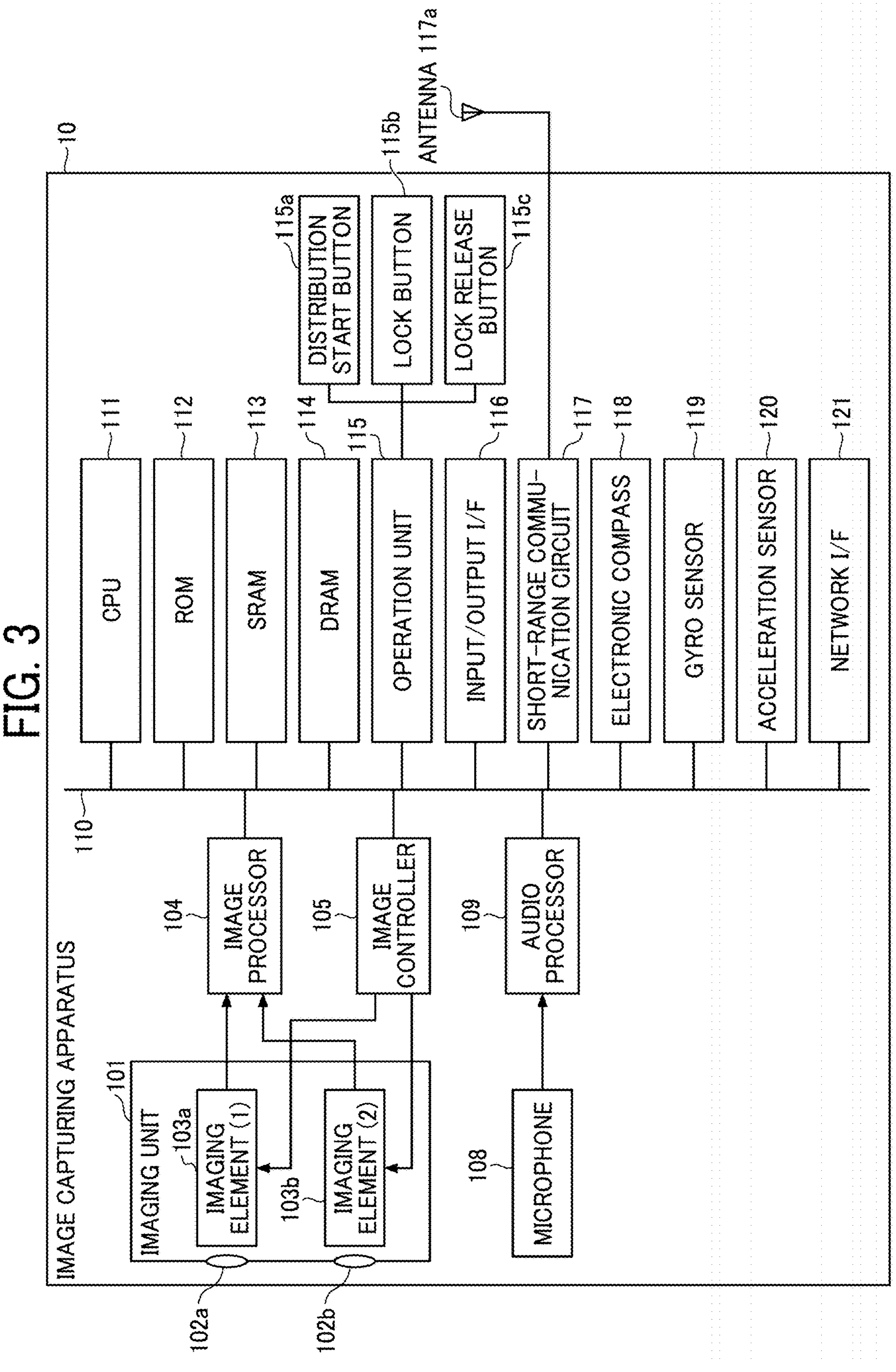
FIG. 3 is a diagram illustrating an example hardware configuration of an image capturing apparatus.

As illustrated in FIG. 3, the image capturing apparatus 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input/output interface (I/F) 116, a short-range communication circuit 117, an antenna **117*a* for the short-range communication circuit 117, an electronic compass 118, a gyro sensor 119, an acceleration sensor 120, and a network I/F 121**.

The imaging unit 101 (imaging device) includes two wide-angle lenses (so-called fish-eye lenses) **102*a* and 102*b* (collectively referred to as lens 102 unless distinguished), each having an angle of view of equal to or greater than 180 degrees so as to form a hemispherical image. The imaging unit 101 further includes two imaging elements 103*a* and 103*b* corresponding to the lenses 102*a* and 102*b* respectively. Each of the imaging elements 103*a* and 103*b* includes an image sensor such as a complementary metal oxide semiconductor (CMOS) sensor or a charge-coupled device (CCD) sensor, a timing generation circuit, and a group of registers. The image sensor converts an optical image formed by the lens 102*a* or 102*b* into an electric signal and outputs image data. The timing generation circuit generates horizontal or vertical synchronization signals, pixel clocks, and the like for the image sensor. In the group of registers, various commands, parameters, and the like for an operation of the imaging element 103*a* or 103*b* are set. As a non-limiting example, the imaging unit 101 includes two wide-angle lenses. The imaging unit 101** may include one wide-angle lens or three or more wide-angle lenses.

Each of the imaging elements **103*a* and 103*b* of the imaging unit 101 is connected to the image processor 104 via a parallel I/F bus. Further, each of the imaging elements 103*a* and 103*b* of the imaging unit 101 is connected to the imaging controller 105 via a serial I/F bus such as an inter-integrated circuit (I2C) bus. The image processor 104, the imaging controller 105, and the audio processor 109 are connected to the CPU 111 via a bus 110. The ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110**.

The image processor 104 acquires respective items of image data output from the imaging elements **103*a* and 103*b* via the parallel I/F buses and performs predetermined processing on the items of image data. Thereafter, the image processor 104** combines the items of image data to generate data of an equirectangular projection image described below.

The imaging controller 105 usually functions as a master device while each of the imaging elements **103*a* and 103*b* usually functions as a slave device. The imaging controller 105 sets commands and the like in the group of registers of each of the imaging elements 103*a* and 103*b* via the I2C bus. The imaging controller 105 receives various commands from the CPU 111. The imaging controller 105 further acquires status data and the like of the group of registers of each of the imaging elements 103***a* and 103*b* via the I2C bus. The imaging controller 105 sends the obtained status data and the like to the CPU 111.

The imaging controller 105 instructs the imaging elements 103*a* and 103*b* to output the image data at the time when a shutter button of the operation unit 115 is pressed. In one example, the image capturing apparatus 10 displays a preview image or a moving image (movie) on a display. Examples of the display include a display of a smartphone or any other external terminal that performs short-range communication with the image capturing apparatus 10 through the short-range communication circuit 117. In the case of displaying a movie, image data are continuously output from the imaging elements 103*a* and 103*b* at a predetermined frame rate (expressed in frames per minute).

As described below, the imaging controller 105 operates in cooperation with the CPU 111 to synchronize the time when the imaging element 103*a* outputs image data and the time when the imaging element 103*b* outputs the image data. In this embodiment, the image capturing apparatus 10 does not include a display unit (or display). In some embodiments, the image capturing apparatus 10 may include a display unit. The microphone 108 converts sound to audio data (signal). The audio processor 109 acquires the audio data output from the microphone 108 via an I/F bus and performs predetermined processing on the audio data.

The CPU 111 controls the overall operation of the image capturing apparatus 10 and performs predetermined processing. The ROM 112 stores various programs to be executed by the CPU 111. Each of the SRAM 113 and the DRAM 114 operates as a work memory to store programs to be executed by the CPU 111 or data being currently processed. More specifically, in one example, the DRAM 114 stores image data currently processed by the image processor 104 and data of the equirectangular projection image on which processing has been performed.

The operation unit 115 collectively refers to various operation keys, a power switch, a shutter button, a touch panel having both the display and operation functions, and so on. The user operates the operation unit 115 to input various image capturing modes or image capturing conditions, for example. The operation unit 115 includes a distribution start button 115*a*, a lock button 115*b*, and a lock release button 115*c*. The distribution start button 115*a* is a button for causing the image capturing apparatus 10 to start distribution of image data and audio data to different sites. The lock button 115*b* is a button for repeatedly distributing the same image frame. The lock release button 115*c* is a button for releasing the pressing of the lock button 115*b* to sequentially distribute image frames updated by capturing images. In one embodiment, the lock release button 115*c* and the lock button 115*b* are implemented by a single alternate action button.

The input/output I/F 116 collectively refers to an interface circuit such as a USB I/F that allows the image capturing apparatus 10 to communicate with an external medium such as a Secure Digital (SD) card or an external personal computer. The input/output I/F 116 may be either wired or wireless. The data of the equirectangular projection image, which is stored in the DRAM 114, is stored in the external medium via the input/output I/F 116 or transmitted to an external terminal (apparatus) via the input/output I/F 116, as desired.

The short-range communication circuit 117 communicates with the external terminal (apparatus) via the antenna 117*a* of the image capturing apparatus 10 by short-range wireless communication technology such as near field communication (NFC), Bluetooth®, or Wi-Fi®. In one embodiment, the short-range communication circuit 117 transmits the data of the equirectangular projection image to the external terminal (apparatus).

The electronic compass 118 calculates an orientation of the image capturing apparatus 10 from the Earth's magnetism and outputs orientation information. The orientation information is an example of related information (metadata) in compliance with exchangeable image file format (Exif). The orientation information is used for image processing such as image correction of a captured image. The related information also includes data of a date and time when the image was captured, and data of a data size of image data. The gyro sensor 119 detects a change in tilt (roll, pitch, and yaw) of the image capturing apparatus 10 with movement of the image capturing apparatus 10. The change in tilt is one example of related information (metadata) in compliance with Exif. This information is used for image processing such as image correction of a captured image. The acceleration sensor 120 detects acceleration in three axial directions. The image capturing apparatus 10 calculates the position of the image capturing apparatus 10 (e.g., the tilt of the image capturing apparatus 10 relative to the direction of gravity), based on the acceleration detected by the acceleration sensor 120. The gyro sensor 119 and the acceleration sensor 120 of the image capturing apparatus 10 improve the accuracy of image correction.

The network I/F 121 is an interface for performing data communication using the communication network N, such as the Internet, via a router.

Hardware Configuration of Communication Terminal

Figure 4:
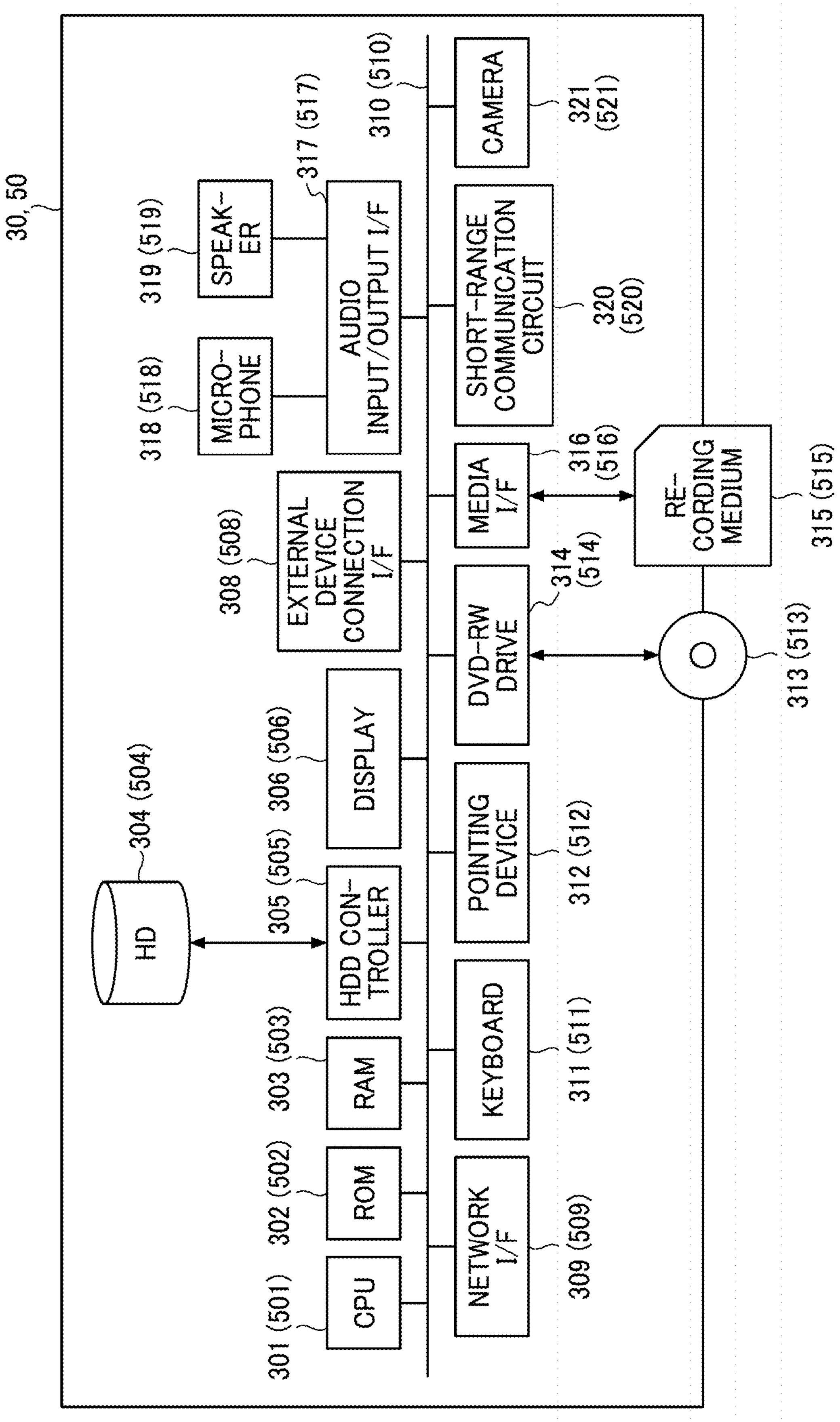
FIG. 4 is a diagram illustrating an example hardware configuration of a communication terminal and an information processing system.

FIG. 4 is a diagram illustrating an example hardware configuration of the communication terminal 30 and the information processing system 50. First, the communication terminal 30 will be described. Each hardware element of the communication terminal 30 is denoted by a reference numeral in 300 series. The communication terminal 30 is implemented by one or more computers. As illustrated in FIG. 4, the communication terminal 30 includes a CPU 301, a ROM 302, a RAM 303, a hard disk drive (HDD) 304, an HDD controller 305, a display 306, an external device connection I/F 308, a network I/F 309, a bus line 310, a keyboard 311, a pointing device 312, a digital versatile disc rewritable (DVD-RW) drive 314, a media I/F 316, an audio input/output I/F 317, a microphone 318, a speaker 319, a short-range communication circuit 320, and a camera 321.

The CPU 301 controls the overall operation of the communication terminal 30. The ROM 302 stores a program used for driving the CPU 301, such as an initial program loader (IPL). The RAM 303 is used as a work area for the CPU 301. The HDD 304 stores various types of data such as a program. The HDD controller 305 controls reading or writing of various types of data from or to the HDD 304 under control of the CPU 301. The display 306 displays various types of information such as a cursor, a menu, a window, characters, and an image. The display 306 is an example of a display unit. In one example, the display 306 is a touch panel display provided with an input means. The external device connection I/F 308 is an interface for connecting to various external devices. The external devices include, but are not limited to, a USB memory and a printer. The network I/F 309 is an interface for performing data communication using the communication network N. The bus line 310 is an address bus or a data bus for electrically connecting the hardware elements illustrated in FIG. 4, such as the CPU 301, to each other.

The keyboard 311 is an example of an input means including a plurality of keys for inputting characters, numerical values, various instructions, and the like. The pointing device 312 is an example of an input means used for selecting or executing various instructions, selecting a target for processing, or moving a cursor being displayed. The input means are not limited to the keyboard 311 and the pointing device 312 and may include a touch panel and a voice input device. The DVD-RW drive 314 controls reading or writing of various types of data from or to a DVD-RW 313, which is an example of a removable recording medium. A DVD-R, a Blu-ray Disc™, or any other recording medium may be used instead of the DVD-RW 313. The media I/F 316 controls reading or writing (storing) of data from or to a recording medium 315 such as a flash memory.

The microphone 318 is an example of a built-in sound collecting means for receiving input sounds. The audio input/output I/F 317 is a circuit for controlling input and output of audio signals between the microphone 318 and the speaker 319 under control of the CPU 301. The short-range communication circuit 320 communicates with the external terminal (apparatus) by short-range wireless communication technology such as NFC, Bluetooth®, or Wi-Fi®. The camera 321 is an example of a built-in image capturing means for capturing an image of an object to obtain image data. In one example, the microphone 318, the speaker 319, and the camera 321 are devices external to the communication terminal 30 in alternative to built-in devices.

Hardware Configuration of Information Processing System

As illustrated in FIG. 4, each hardware element of the information processing system 50 is denoted by a reference numeral in 500 series in parentheses. The information processing system 50 is implemented by one or more computers and has substantially the same configuration as that of the communication terminal 30 illustrated in FIG. 4, and thus the description of the hardware elements of the information processing system 50 will be omitted.

Each of the programs described above may be recorded as a file in a format installable or executable on a computer-readable recording medium for distribution. Examples of the recording medium include a compact disc recordable (CD-R), a digital versatile disc (DVD), a BLU-RAY DISC, an SD card, and a USB memory. The recording medium may be provided in the form of a program product to domestic or foreign users. For example, the communication terminal 30 executes a program to perform processing to display an image.

Wide-View Image and Point-of-View Information

A method for generating a wide-view image (spherical image) will be described hereinafter with reference to FIGS. 5A to 12.

Figure 5C:
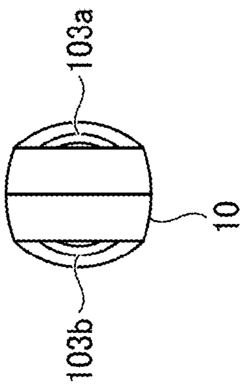
FIGS. 5A, 5B, and 5C are a left side view, a front view, and a plan view of the image capturing apparatus according to an embodiment of the present disclosure, respectively.
Figure 5B:
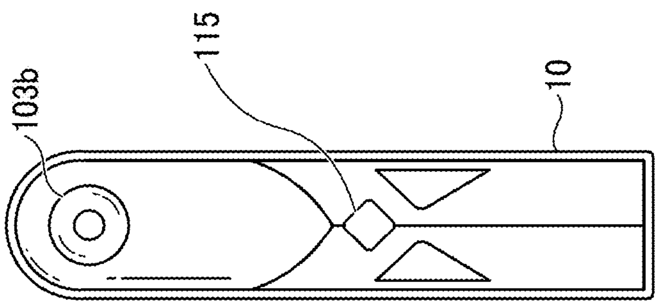
Figure 5A:
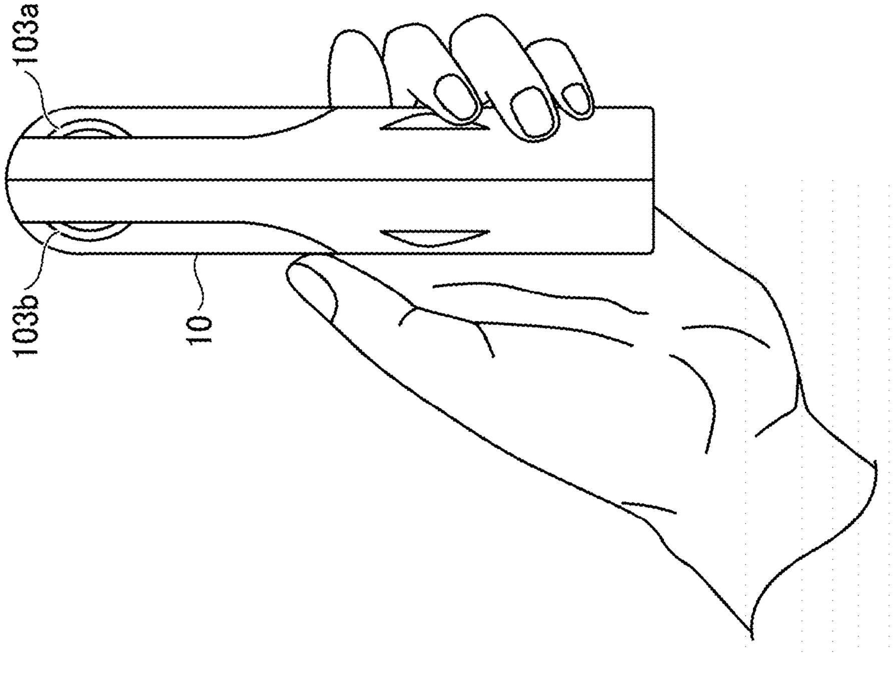

First, the external appearance of the image capturing apparatus 10 will be described with reference to FIGS. 5A to 5C. The image capturing apparatus 10 is a digital camera for capturing images from which a 360-degree spherical image is generated. FIG. 5A is a left side view of the image capturing apparatus 10. FIG. 5B is a front view of the image capturing apparatus 10. FIG. 5C is a plan view of the image capturing apparatus 10. The illustrated external view of the image capturing apparatus 10 is merely an example. The image capturing apparatus 10 may have any other external appearance.

As illustrated in FIG. 5A, the image capturing apparatus 10 has a size such that a person can hold the image capturing apparatus 10 with one hand. The illustrated shape of the image capturing apparatus 10 is an example. The image capturing apparatus 10 may have any other shape. As illustrated in FIGS. 5A, 5B, and 5C, the imaging element 103*a* and the imaging element 103*b* are disposed in an upper portion of the image capturing apparatus 10 such that the imaging element 103*a* is disposed on the front side and the imaging element 103*b* is disposed on the back side. The imaging elements (image sensors) 103*a* and 103*b* are used in combination with optical members (e.g., the lenses 102*a* and 102*b* described above), each being configured to capture a hemispherical image having an angle of view of equal to or greater than 180 degrees. As illustrated in FIG. 5B, the operation unit 115, such as the shutter button, is disposed on the back surface of the image capturing apparatus 10. As described above, the image capturing apparatus 10 may include one imaging element or three or more imaging elements.

Figure 6:
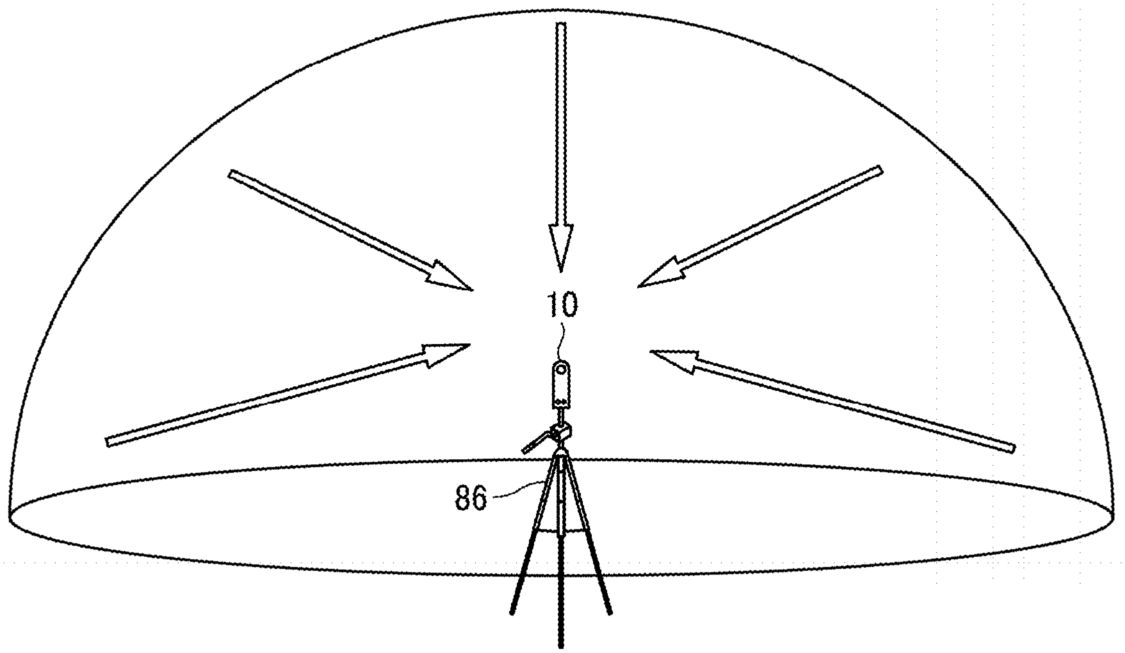
FIG. 6 is an illustration for explaining how a user uses the image capturing apparatus, according to an embodiment of the present disclosure.

Next, a situation in which the image capturing apparatus 10 is used will be described with reference to FIG. 6. FIG. 6 is an illustration for explaining how a user uses the image capturing apparatus 10. As illustrated in FIG. 6, for example, the image capturing apparatus 10 is used for capturing an image of an object surrounding the image capturing apparatus 10. Each of the imaging elements 103*a* and 103*b* illustrated in FIGS. 5A to 5C captures an image of an object surrounding the image capturing apparatus 10. As a result, two hemispherical images are obtained.

Figure 7A:
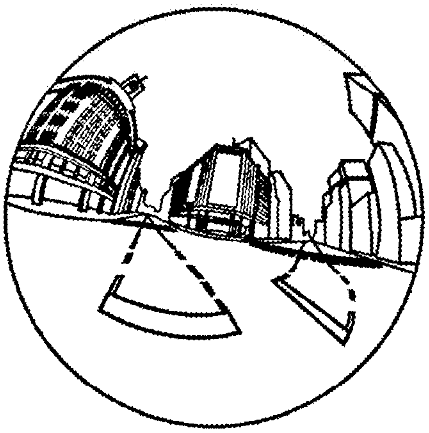
FIGS. 7A, 7B, and 7C are views illustrating a hemispherical image (front side) captured by the image capturing apparatus, a hemispherical image (back side) captured by the image capturing apparatus, and an image in equirectangular projection, respectively, according to an embodiment of the present disclosure.
Figure 7B:
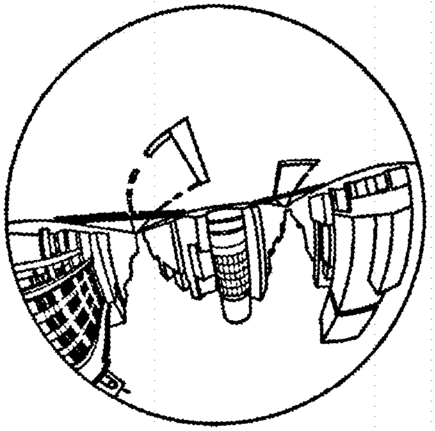
Figure 7C:
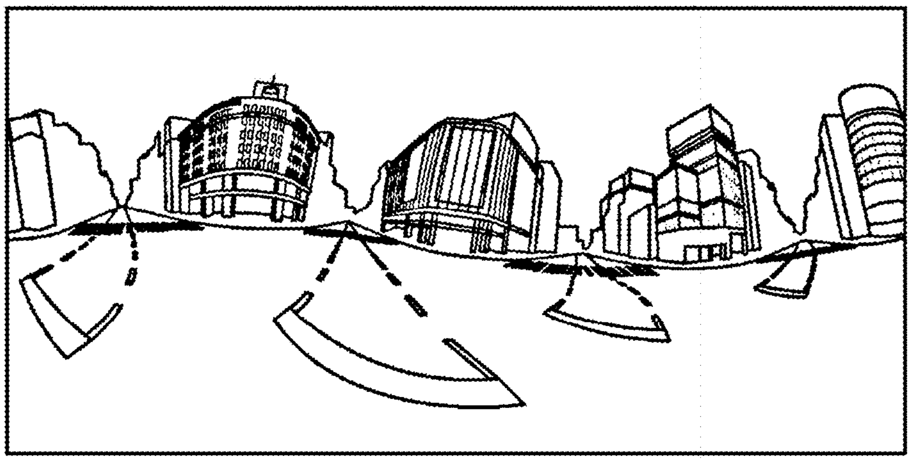
Figure 8A:
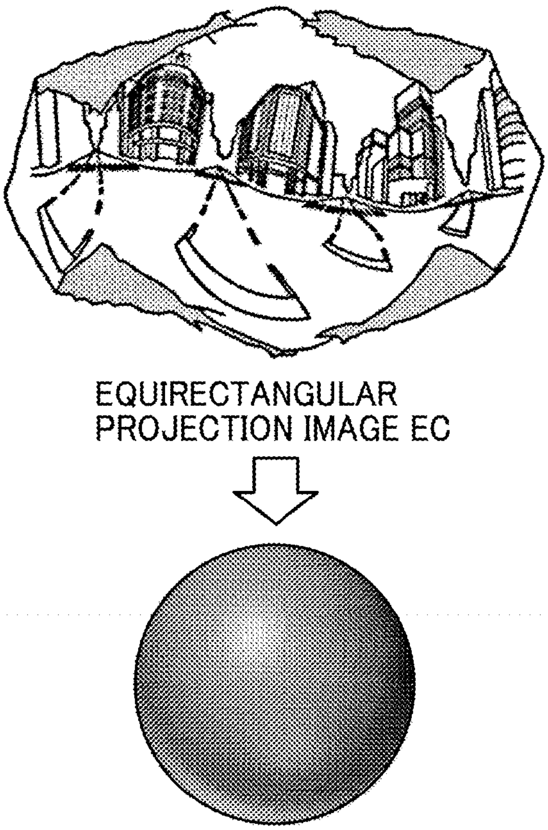
FIG. 8A is a conceptual diagram illustrating an example of how the image in equirectangular projection is mapped to a surface of a sphere, according to an embodiment of the present disclosure.
Figure 8B:
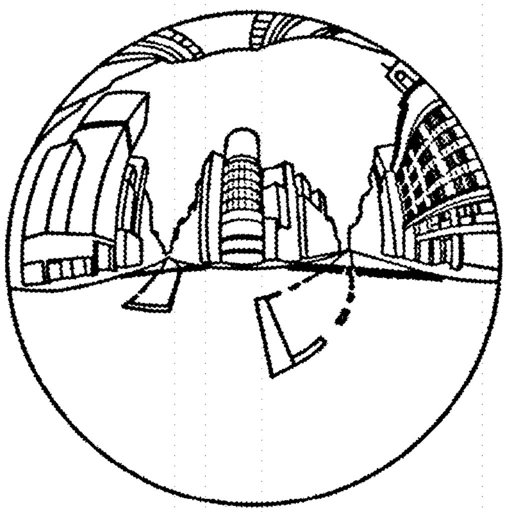
FIG. 8B is a view illustrating a spherical image, according to an embodiment of the present disclosure.

Next, an overview of a process for generating a spherical image from images captured by the image capturing apparatus 10 will be described with reference to FIGS. 7A to 7C and FIGS. 8A and 8B. FIG. 7A illustrates a hemispherical image (front side) captured by the image capturing apparatus 10. FIG. 7B illustrates a hemispherical image (back side) captured by the image capturing apparatus 10. FIG. 7C illustrates an image in equirectangular projection (hereinafter referred to as an "equirectangular projection image" or an "equidistant cylindrical projection image"). FIG. 8A conceptually illustrates how the equirectangular projection image is mapped to a surface of a sphere. FIG. 8B illustrates a spherical image.

As illustrated in FIG. 7A, an image obtained by the imaging element 103*a* is a curved hemispherical image (front side) captured through the lens 102*a* described above. As illustrated in FIG. 7B, an image captured by the imaging element 103*b* is a curved hemispherical image (back side) captured through the lens 102*b* described above. The image capturing apparatus 10 combines the hemispherical image (front side) and the hemispherical image (back side), which are flipped by 180 degrees, to create an equirectangular projection image EC as illustrated in FIG. 7C.

The image capturing apparatus 10 uses software such as OpenGL ES to map the equirectangular projection image EC to a sphere so as to cover the surface of the sphere as illustrated in FIG. 8A. As a result, the image capturing apparatus 10 generates a spherical image (or spherical panoramic image) CE as illustrated in FIG. 8B. That is, the spherical image CE is represented as the equirectangular projection image EC, which corresponds to a surface facing the center of the sphere. OpenGL ES is a graphics library used for visualizing two-dimensional (2D) data and three-dimensional (3D) data. OpenGL ES is an example of software for executing image processing. Any other software may be used to create the spherical image CE. The spherical image CE may be either a still image or a moving image.

As described above, since the spherical image CE is an image mapped to a sphere so as to cover the surface of the sphere, part of the image may look distorted when viewed by a user, providing a strange feeling. Accordingly, the image capturing apparatus 10 displays an image of a predetermined area T, which is part of the spherical image CE, as a planar image having fewer curves to make the user feel comfortable. The predetermined area is, for example, a part of the spherical image CE that is viewable by the user. In this disclosure, the image of the predetermined area, which is viewable, may be referred to as a "predetermined-area image" or "viewable-area image" Q. That is, the term "predetermined-area image" and "viewable-area image" may be used interchangeably. The display of the predetermined-area image will be described with reference to FIGS. 9, 10A, and 10B.

Figure 9:
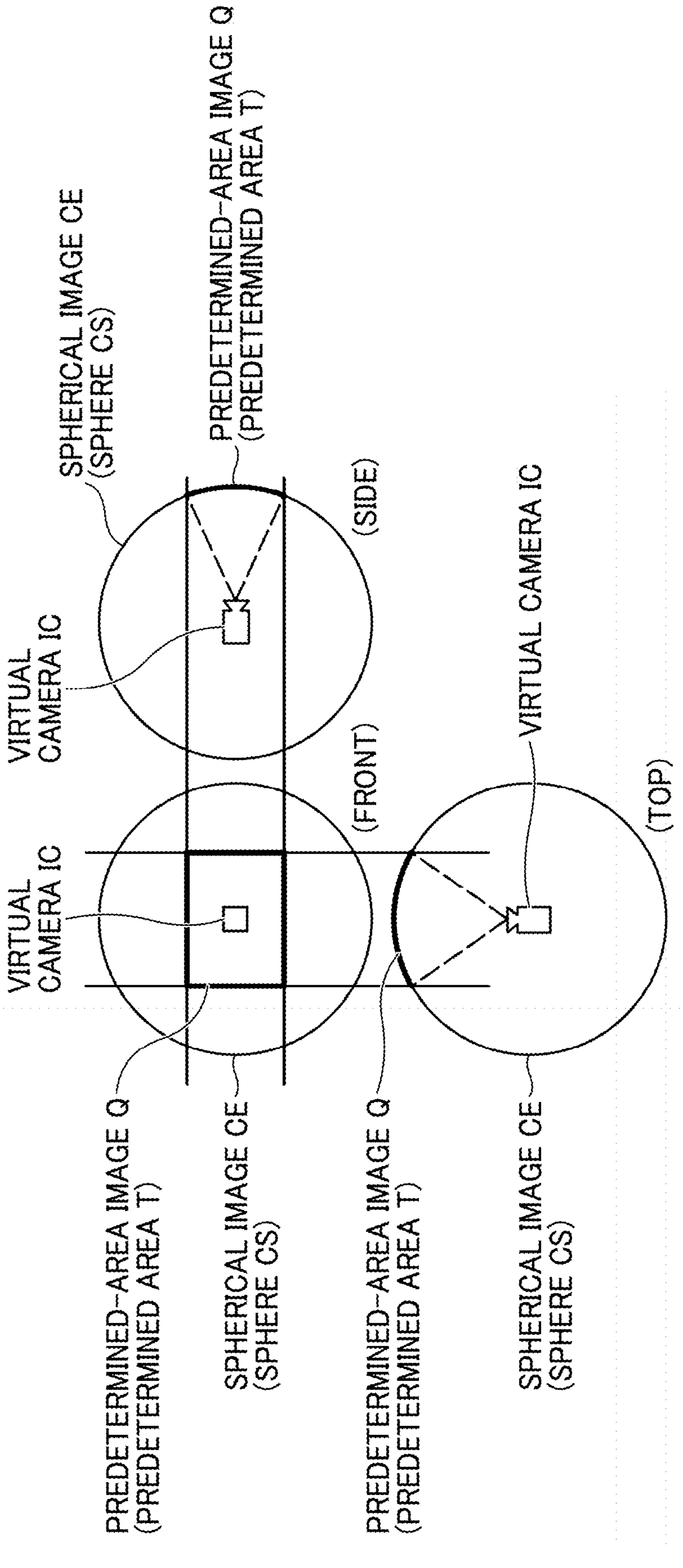
FIG. 9 is a view illustrating positions of a virtual camera and a predetermined area in a case where the spherical image is of a three-dimensional sphere according to an embodiment of the present disclosure.
Figure 10A:
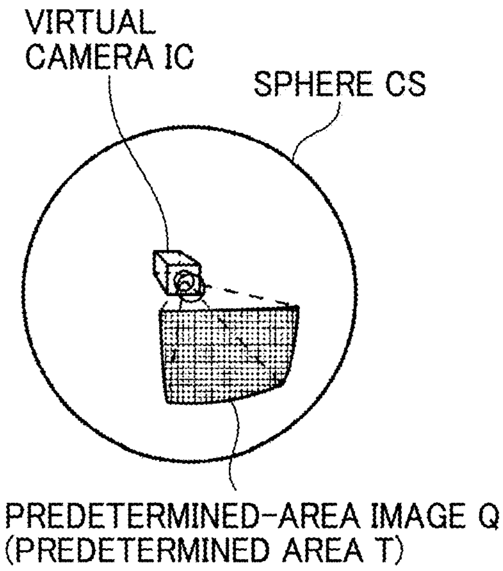
FIG. 10A is a perspective view of the virtual camera and the predetermined area illustrated in FIG. 9 according to an embodiment of the present disclosure.
Figure 10B:
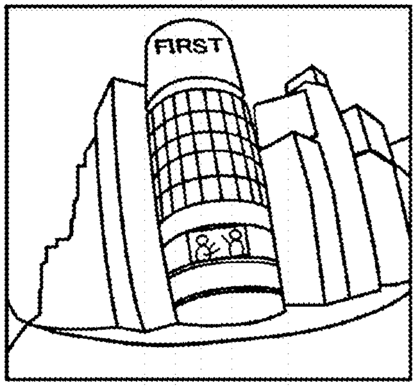
FIG. 10B is a view illustrating an image of the predetermined area displayed on a display according to an embodiment of the present disclosure.

FIG. 9 illustrates the position of a virtual camera IC and the position of the predetermined area T in a case where the spherical image CE is of a three-dimensional sphere CS. The virtual camera IC corresponds to a position of a point of view (viewpoint) of a user who is viewing the spherical image CE represented as a surface area of the three-dimensional solid sphere CS. FIG. 10A is a perspective view of the virtual camera IC and the predetermined area T illustrated in FIG. 9, and FIG. 10B illustrates the predetermined-area image displayed on a display. In FIG. 10A, the spherical image CE illustrated in FIG. 9 is represented by the three-dimensional sphere CS. Assuming that the spherical image CE generated in the way described above is a surface area of the sphere CS, the virtual camera IC is inside the spherical image CE as illustrated in FIG. 9. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. Zooming in or out of the predetermined area T may be implemented by bringing the virtual camera IC closer to or farther away from the spherical image CE. The predetermined-area image Q is the image of the predetermined area T in the spherical image CE. The predetermined area T is defined by an angle of view α of the virtual camera IC and a distance f from the virtual camera IC to the spherical image CE (see FIG. 11).

The predetermined-area image Q illustrated in FIG. 10A is displayed on a predetermined display as an image of the imaging area of the virtual camera IC, as illustrated in FIG. 10B. The image illustrated in FIG. 10B is a predetermined-area image represented by predetermined-area information that is set by default. A description will be made using the imaging direction (ea, aa) and the angle of view (α) of the virtual camera IC. In another example, the predetermined area T is not defined by the angle of view α and the distance f, and the imaging area of the virtual camera IC, which is the predetermined area T, is identified by position coordinates (X, Y, Z).

Figure 11:
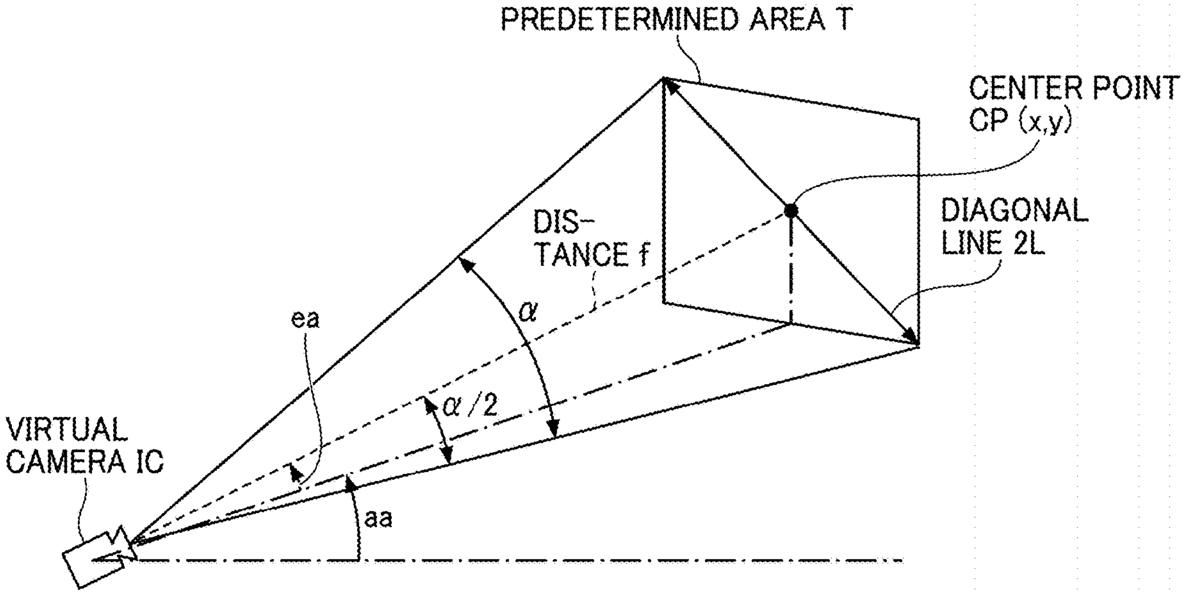
FIG. 11 is a view illustrating a relationship between predetermined-area information and the image of the predetermined area according to an embodiment of the present disclosure.

Next, a relationship between the predetermined-area information and the image of the predetermined area T will be described with reference to FIG. 11. FIG. 11 illustrates a relationship between the predetermined-area information and the image of the predetermined area T. As illustrated in FIG. 11, "ea" denotes an elevation angle, "aa" denotes an azimuth angle, and "α" denotes an angle of view of the virtual camera IC. The position of the virtual camera IC is adjusted such that the point of gaze of the virtual camera IC, indicated by the imaging direction (ea, aa), matches a center point CP (x, y) of the predetermined area T serving as the imaging area of the virtual camera IC. As illustrated in FIG. 11, the center point CP (x, y) of the predetermined area T, whose diagonal angle of view is represented by the angle of view α of the virtual camera IC and is denoted by α, is used as a parameter (x, y) of the predetermined-area information. The predetermined-area image Q is the image of the predetermined area T in the spherical image CE. The distance f is a distance from the virtual camera IC to the center point CP (x, y) of the predetermined area T. The distance between the center point CP (x, y) and a given vertex of the predetermined area T is denoted by "L" (2L is a diagonal line). In FIG. 11, a trigonometric function generally expressed by Equation (1) below holds.

$$L/f = \tan(\alpha/2) \tag{1}$$

The image capturing apparatus 10 described above is an example of an image capturing apparatus for acquiring a wide-view image. The spherical image CE is an example of a wide-view image. The wide-view image is generally an image taken with a wide-angle lens such as a lens that can take an image of a range wider than a range that the human eye can perceive.

Figure 12:
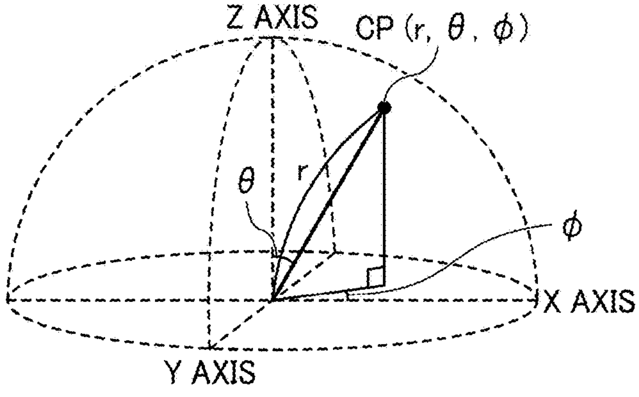
FIG. 12 is a view illustrating a point in a three-dimensional Euclidean space defined in spherical coordinates, according to an embodiment of the present disclosure.

FIG. 12 illustrates the relationship illustrated in FIG. 11 using a point in a three-dimensional Euclidean space defined in spherical coordinates. The center point CP illustrated in FIG. 11 is represented by a spherical polar coordinate system to obtain position coordinates (r, θ, φ). The position coordinates (r, θ, φ) represent a radius vector, a polar angle, and an azimuth angle, respectively. The radius vector r is a distance from the origin of the three-dimensional virtual space including the spherical image CE to the center point CP. Accordingly, the radius vector r is equal to the distance f illustrated in FIG. 11. FIG. 12 illustrates the relationship illustrated in FIG. 11. In the following description, the position coordinates (r, θ, φ) of the virtual camera IC are used as an example of point-of-view information. As described above, the point-of-view information is any parameter information that can define the predetermined area T (the predetermined-area image Q) displayed on the predetermined display illustrated in FIG. 10A as the image of the imaging area of the virtual camera IC. The point-of-view information includes the coordinates of the diagonal vertices of the predetermined area T. In one example, the point-of-view information includes information indicating the angle of view α of the virtual camera IC and information indicating the center point CP (x, y), which have been described with reference to FIG. 11. Examples of the point-of-view information include position coordinate information in the form of spherical coordinates, position coordinate information in the form of orthogonal coordinates, and a difference value between the predetermined-area information that is set by default and the coordinates. Other examples of the point-of-view information include information other than coordinate information, such as an angle and a distance, as illustrated in FIG. 11. In FIGS. 11 and 12, the center point CP of the predetermined area T is used as a reference. In another example, the predetermined area T may be defined by parameter information with any one of the vertices of the predetermined area T as a reference. In the foregoing description of the point-of-view information, as a non-limiting example, the wide-view image is a spherical image. In another wide-view image, information that defines the predetermined area T in the other wide-view image is point-of-view information.

Functions

Figure 13:
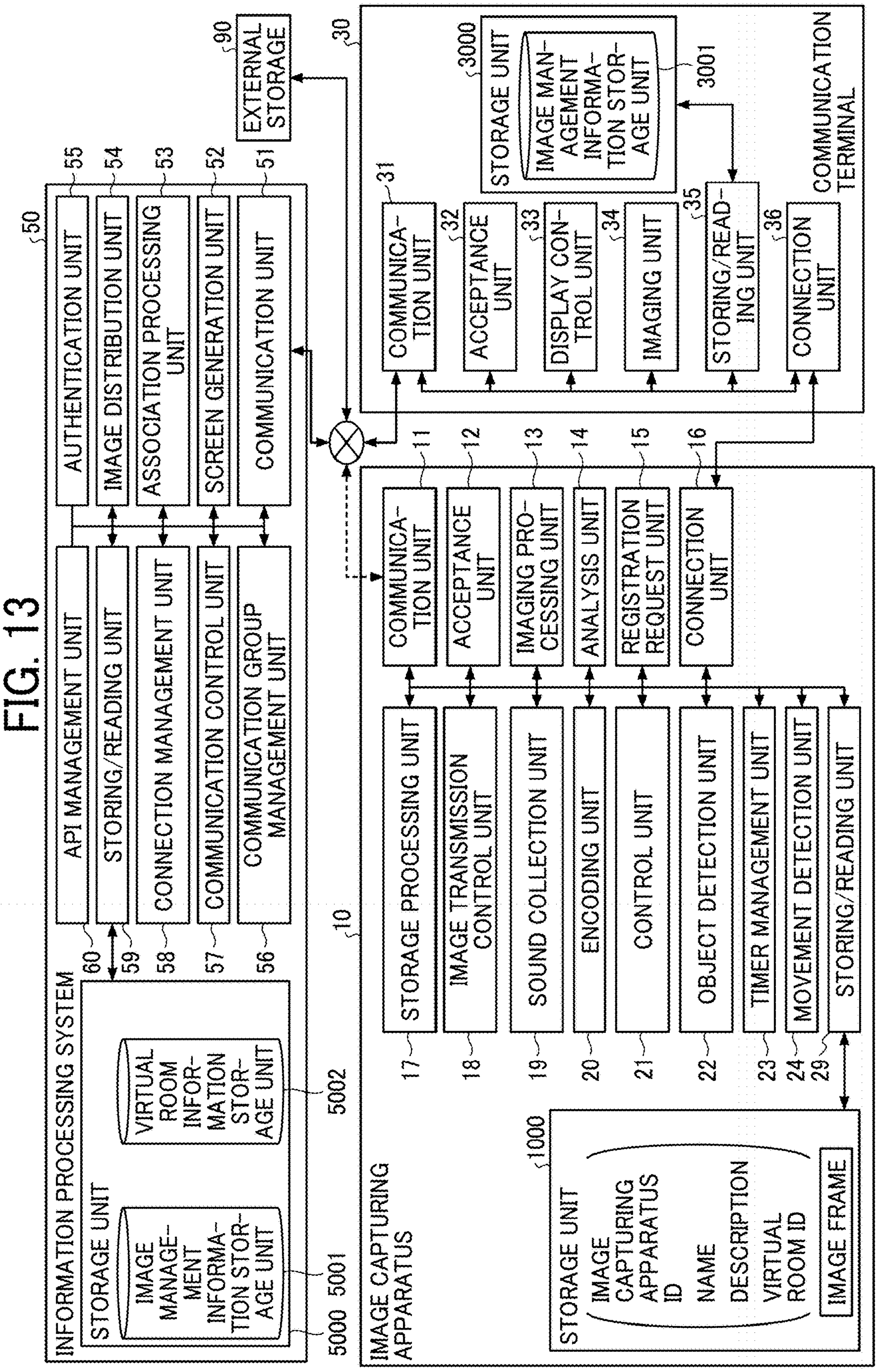
FIG. 13 is a diagram illustrating an example functional configuration of the communication system.

Next, the functional configuration of the communication system 1 according to this embodiment will be described with reference to FIG. 13. FIG. 13 is a diagram illustrating an example functional configuration of the communication system 1 according to this embodiment. FIG. 13 illustrates functions, related to processes or operations described below, of the terminals, the apparatus, and the server illustrated in FIG. 1.

Functional Configuration of Image Capturing Apparatus

First, the functional configuration of the image capturing apparatus 10 will be described with reference to FIG. 13. The image capturing apparatus 10 includes a communication unit 11, an acceptance unit 12, an imaging processing unit 13, an analysis unit 14, a registration request unit 15, a connection unit 16, a storage processing unit 17, an image transmission control unit 18, a sound collection unit 19, an encoding unit 20, a control unit 21, an object detection unit 22, a timer management unit 23, a movement detection unit 24, and a storing/reading unit 29. Each of these units is a function or means that is implemented by or caused to function by any one or more of the hardware elements illustrated in FIG. 3 operating in accordance with instructions from the CPU 111 according to a program loaded onto the SRAM 113 or the DRAM 114. The image capturing apparatus 10 further includes a storage unit 1000, which is implemented by, for example, the ROM 112 illustrated in FIG. 3.

The communication unit 11 is a function of connecting to the communication network N by using wireless communication technology such as Wi-Fi® to transmit and receive various types of data or information to and from another apparatus. In this embodiment, the connection unit 16 transmits a wide-view image acquired by the imaging processing unit 13 to the information processing system 50. In some embodiments, the communication unit 11 may transmit the wide-view image to the information processing system 50.

The acceptance unit 12 is a function of accepting an operation input to the image capturing apparatus 10 from the user. The acceptance unit 12 accepts the operation of turning on or off the power, turning on or off the shutter button (start or stop of transmission of the wide-view image), or any other operation.

The imaging processing unit 13 captures an image of an object or surroundings such as scenery and acquires a captured image. The captured image acquired by the imaging processing unit 13 may be either or both of a moving image and a still image. In another example, the captured image may be an image with accompanying audio. Further, for example, the imaging processing unit 13 captures an image of a two-dimensional code displayed on the display 306 of the communication terminal 30.

The analysis unit 14 analyzes the two-dimensional code, of which the image is captured by the imaging processing unit 13, to extract information included in the two-dimensional code. The extracted information includes a URL for registering the image capturing apparatus 10 in the tenant, a temporary ID, and a password.

The registration request unit 15 transmits a request to the information processing system 50 to register the image capturing apparatus 10 in the tenant in the information processing system 50, by using the information included in the two-dimensional code read by the analysis unit 14.

The connection unit 16 is a function of receiving a supply of power from the communication terminal 30A and performing data communication. The connection unit 16 is implemented by, for example, the short-range communication circuit 117.

The storage processing unit 17 performs a process of storing a wide-view image captured in response to an image capturing request from any site in a URL (e.g., a URL that specifies the storage 90) transmitted from the information processing system 50.

The image transmission control unit 18 is a function of controlling transmission of the wide-view image to the information processing system 50. For example, the image transmission control unit 18 transmits a captured image acquired by the imaging processing unit 13 to the information processing system 50 periodically or in response to a user operation when the captured image is a still image, or at a predetermined frame rate (expressed in frames per second or FPS) when the captured image is a moving image. The image transmission control unit 18 also performs switching between the communication unit 11 and the connection unit 16.

The sound collection unit 19 collects surrounding sounds and performs pulse code modulation (PCM) sampling thereon to generate audio data.

The encoding unit 20 encodes image data by using a coding format such as H.264, H.265, AV1, Versatile Video Coding (VVC), Xvid, Divx, or MPEG-4.

The acceptance unit 12 accepts an input to the image capturing apparatus 10 from the user. In one example, the acceptance unit 12 accepts input sent from the user who uses the image capturing apparatus 10. In another example, the acceptance unit 12 also accepts input sent from the user who uses the communication terminal 30.

The control unit 21 stores an image frame to prevent or reduce camera shake, controls a lock flag, and controls transmission of the image frame in accordance with the state of the lock flag, for example. The details will be described below.

The object detection unit 22 analyzes the image data and detects a predetermined object included in the image data. The object (predetermined object) to be detected by the object detection unit 22 is set in advance.

The timer management unit 23 measures, with a timer, the time that has elapsed since a lock flag, which will be described below, was set to on, and detects an elapse of a certain amount of time.

The movement detection unit 24 detects, based on signals from the acceleration sensor 120 and the like, whether the image capturing apparatus 10 is moving or has stopped, that is, whether the user A is moving.

The storing/reading unit 29 is a function of storing various types of data in the storage unit 1000 or reading various types of data from the storage unit 1000. The storage unit 1000 stores, for example, image data acquired by the imaging processing unit 13, and an image capturing apparatus ID. In one embodiment, the image data stored in the storage unit 1000 is deleted when a predetermined amount of time has elapsed since the image data was acquired by the imaging processing unit 13. In another embodiment, the data transmitted to the information processing system 50 is deleted.

The image capturing apparatus 10 has installed therein an application (also referred to as a plug-in) for supporting the communication system 1. The application is not used when the image capturing apparatus 10 is a commercially available image capturing apparatus, but otherwise is used to associate the image capturing apparatus 10 with the virtual room or to receive external control. Some of the functions illustrated in FIG. 13, such as the registration request unit 15, are implemented by the application.

Functional Configuration of Communication Terminal

Next, the functional configuration of the communication terminal 30 will be described with reference to FIG. 13. The communication terminal 30 includes a communication unit 31, an acceptance unit 32, a display control unit 33, an imaging unit 34, a storing/reading unit 35, and a connection unit 36. Each of these units is a function or means that is implemented by or caused to function by any one or more of the hardware elements illustrated in FIG. 4 operating in accordance with instructions from the CPU 301 according to a program (either the web browser or a dedicated application) loaded onto the RAM 303. The communication terminal 30 further includes a storage unit 3000. The storage unit 3000 is implemented by the ROM 302 or the recording medium 315 illustrated in FIG. 4.

The communication unit 31 is a function of connecting to the communication network N and transmitting and receiving various types of data or information to and from another apparatus. The communication unit 31 is implemented by, for example, the network I/F 309.

The acceptance unit 32 is a function of accepting various selections or operation inputs to the communication terminal 30. The display control unit 33 is a function of displaying a wide-view image, an image having a normal angle of view, and various screens on the display 306 of the communication terminal 30. For example, the display control unit 33 causes the display 306 to display a two-dimensional code transmitted from the information processing system 50. In one example, the two-dimensional code is QR Code®, a DataMatrix (DataCode) code, a MaxiCode code, or a PDF417 code. In another example, the two-dimensional code is a barcode.

The connection unit 36 is a function of supplying power to the image capturing apparatus 10 and performing data communication. The connection unit 36 is implemented by, for example, the short-range communication circuit 320.

The storing/reading unit 35 is a function of storing various types of data in the storage unit 3000 or reading various types of data from the storage unit 3000 in accordance with instructions from the CPU 301 illustrated in FIG. 4. The storage unit 3000 includes an image management information storage unit 3001. The image management information storage unit 3001 will be described in the description of the information processing system 50.

Functional Configuration of Information Processing System

Next, the functional configuration of the information processing system 50 will be described. The information processing system 50 includes a communication unit 51, a screen generation unit 52, an association processing unit 53, an image distribution unit 54, an authentication unit 55, a communication group management unit 56, a communication control unit 57, a connection management unit 58, a storing/reading unit 59, and an API management unit 60. Each of these units is a function or means that is implemented by or caused to function by any one or more of the hardware elements illustrated in FIG. 4 operating in accordance with instructions from the CPU 501 according to a program loaded onto the RAM 503. The information processing system 50 further includes a storage unit 5000. The storage unit 5000 is implemented by the ROM 502, the HDD 504, or the recording medium 515 illustrated in FIG. 4.

The communication unit 51 has a function of transmitting and receiving various types of data or information to and from another apparatus via the communication network N.

The screen generation unit 52 generates screen information to be displayed on the communication terminal 30. The screen information is created by Hypertext Markup Language (HTML), Extensible Markup Language (XML), Cascade Style Sheet (CSS), JavaScript®, or any other language for a web application to be executed by the communication terminal 30. For a native application to be executed by the communication terminal 30, the screen information is held by the communication terminal 30, and the information to be displayed is transmitted in XML. The screen generation unit 52 generates screen information of a screen on which a wide-view image to be distributed by the image distribution unit 54 is arranged.

The association processing unit 53 performs control related to sharing of the point-of-view information of the wide-view image. In response to receipt of an image capturing request together with the point-of-view information from the communication terminal 30, the association processing unit 53 performs a process of associating the point-of-view information with a wide-view image acquired from the image capturing apparatus 10 in response to the image capturing request. The association processing unit 53 stores the associated wide-view image and point-of-view information in an image management information storage unit 5001. Further, the association processing unit 53 transmits a URL, which is information indicating a storage location where the associated wide-view image and point-of-view information are to be stored, to the communication terminal 30. In one example, the information processing system 50 does not simultaneously receive the point-of-view information and the image capturing request from the communication terminal 30. The information processing system 50 separately receives the point-of-view information and the image capturing request and performs association processing. The URL is an example of information indicating the storage location. The information indicating the storage location may be in any other format such as a uniform resource identifier (URI).

The image distribution unit 54 distributes, to the communication terminal 30 operated by a user who is in the virtual room, a wide-view image transmitted from the image capturing apparatus 10 associated with the same virtual room. An image having a normal angle of view captured by a camera included in the communication terminal 30 or the camera 8 or 9 connected to the communication terminal 30 is also distributed in a similar manner.

The authentication unit 55 is a function of authenticating an entity from which an authentication request is received by the communication unit 51. For example, the authentication unit 55 determines whether authentication information (a user ID and a password) included in the authentication request received by the communication unit 51 matches authentication information held in advance to perform user authentication. The authentication information may be a card number of an integrated circuit (IC) card, biometric authentication information such as a face, a fingerprint, or a voiceprint. The authentication unit 55 may perform authentication using an external authentication system or an authentication method such as Open Authorization (Oauth).

The communication group management unit 56 manages, for example, the entry of the communication terminal 30 or the user into the virtual room, and association between the virtual room and a device. Upon successful authentication of the user by the authentication unit 55, the communication group management unit 56 registers the user ID and the Internet protocol (IP) address of the communication terminal 30 in a virtual room information storage unit 5002 or associates the image capturing apparatus 10 with the virtual room.

The communication control unit 57 manages the start, establishment, and end of communication with the image capturing apparatus 10 associated with each virtual room. The communication control unit 57 also manages the start, establishment, and end of communication for distributing a wide-view image and/or audio in response to the communication terminal 30 entering or leaving the virtual room.

The connection management unit 58 manages communication (connection) established with the information processing system 50 by the communication terminal 30 and the image capturing apparatus 10 in association with the virtual room.

The API management unit 60 manages an API to be used by a platform contractor to provide an image distribution service of a wide-view image. In the use of the API, the platform contractor develops software for calling the API. The software to be developed may operate on a server or may operate on a client such as a communication terminal. Any of the functions of the information processing system 50, such as the image distribution unit 54, the association processing unit 53, and the communication control unit 57, can be provided as an API. Any function added to the information processing system 50 later may be provided as an API. To determine whether to provide a function as an API, a communication terminal operated by the platform provider accesses the information processing system 50 and receives the public settings of the API. As a result, the API management unit 60 can control the API based on the public settings. The API management unit 60 may perform an authentication process for checking whether software operating on a requesting entity that makes a request to call the API is software developed by an authorized platform contractor. In one embodiment, the authentication process is performed by comparing information stored in a platform contractor information storage unit with information transmitted from the software operating on the requesting entity. In a specific example of the authentication process, the information processing system 50 receives, from the software operating on the requesting entity, an application ID issued to the software developed by the platform contractor in advance by the API management unit 60. If the API management unit 60 determines that the application ID matches an application ID stored in the platform contractor information storage unit, the API management unit 60 performs control to give permission to provide an API since the software developed by the platform contractor is determined as being valid. If the software developed by the platform contractor is not determined as being valid, the API management unit 60 performs control not to give permission to provide an API. The application ID is an example of authentication information for determining validity. The API management unit 60 may use authentication information issued in advance by the API management unit 60 of the information processing system 50 or by an external system to check the validity of the requesting entity. Examples of such authentication information as issued in advance include an access token, a ticket, a security key, a password, and a personal identification (PIN) code. In this embodiment, while the mode of using a function of the information processing system 50 as an API is not described, the same process flow is performed, except that software such as an application developed by a platform contractor uses a function of the information processing system 50 through a determination made by the API management unit 60.

The storing/reading unit 59 is a function of storing various types of data in the storage unit 5000 or reading various types of data from the storage unit 5000. The storage unit 5000 includes the image management information storage unit 5001 and the virtual room information storage unit 5002.

Image Management Information Storage Unit 5001

FIG. 14A is a table illustrating image management information stored in the image management information storage unit 5001. The image management information storage unit 5001 stores image management information as illustrated in FIG. 14A or 14B. The image management information is information for managing wide-view images captured in response to image capturing requests. In response to a user transmitting an image capturing request from the communication terminal 30, image management information for one record is generated. The items contained in the image management information will be described.

The item "data ID" is identification information that identifies a wide-view image. The information processing system 50 numbers each data ID. ID is an abbreviation for identification and means an identifier or identification information. ID is any one or a combination of two or more of a name, a symbol, a character string, and a numerical value that are used for uniquely identifying a specific object from among a plurality of objects.

The item "data name" is the name of a wide-view image set by the user of the communication terminal 30. Each data name may be set by the user or automatically.

The item "imaging date and time information" is information that specifies the imaging date and time of a wide-view image. Examples of the imaging date and time include the date and time when the user input an image capturing request to the communication terminal 30, and the date and time when the image capturing apparatus 10 captured a wide-view image. The imaging date and time information may be a time stamp of a wide-view image.

The item "imaging operator information" is identification information (or a user name) of a user (imaging operator) who has input an image capturing request to the communication terminal 30. Since a user inputs an image capturing request to the communication terminal 30 after entering the virtual room, a user registered in the imaging operator information is identified by authentication to the information processing system 50 or the virtual room. The imaging operator information is transmitted to the information processing system 50 together with an image capturing request.

The item "image capturing apparatus information" is identification information (image capturing apparatus ID) of the image capturing apparatus 10 that has captured a wide-view image. The information processing system 50 numbers each image capturing apparatus ID and shares the image capturing apparatus ID with the image capturing apparatus 10. The image capturing apparatus ID may be information unique to the image capturing apparatus 10, such as a media access control (MAC) address or a serial number. The image capturing apparatus ID is transmitted to the information processing system 50 together with the associated wide-view image.

The item "imaging operator's point-of-view information" is point-of-view information including a radius vector, a polar angle, and an azimuth angle. The point-of-view information indicates the coordinates of the center of the wide-view image being displayed on the communication terminal 30. The point-of-view information is transmitted from the communication terminal 30 that makes an image capturing request. In one embodiment, the point-of-view information includes information designating the width and height of the display range, in addition to the radius vector, the polar angle, and the azimuth angle. In another embodiment, the point-of-view information does not include the radius vector, the polar angle, and the azimuth angle, and includes the width and height of the display range.

The item "imaging-time virtual room ID" is identification information of a virtual room associated with the image capturing apparatus 10.

The item "storage location information of data" is a URL, a file path, or any other location where a wide-view image is stored.

FIG. 14B is also a table illustrating image management information. In FIG. 14B, wide-view images having the same imaging-time virtual room ID are stored. The image management information may be classified in units of virtual rooms.

Entry of Communication Terminal Into Virtual Room

Next, a process in which the user B enters the virtual room will be described with reference to FIGS. 15A, 15B, and 16. In the illustrated example, the image capturing apparatus 10 has already been associated with the virtual room, and the communication terminal 30A has transmitted a wide-view image and an image having a normal angle of view to the information processing system 50. The association of the image capturing apparatus 10 with the virtual room and other operations will be described with reference to FIG. 18 and the subsequent figures. In the following description, no distinction is made between the entry of the user B into the virtual room and the entry of the communication terminal 30B, which is operated by the user B, into the virtual room.

Figure 15A:
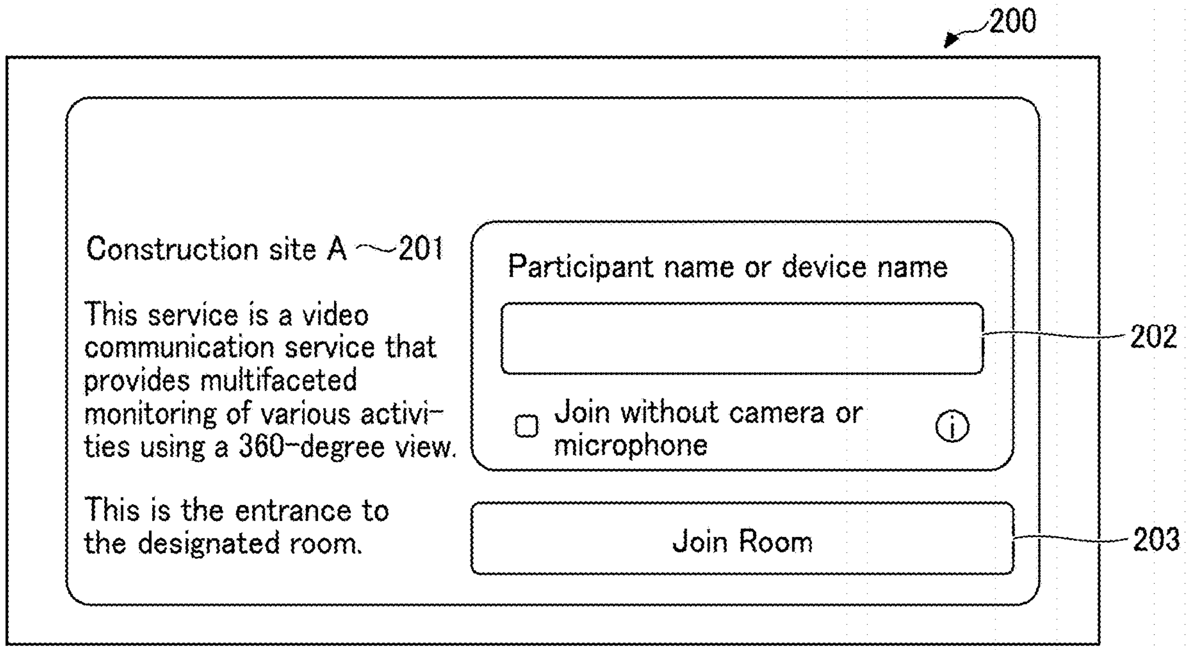
FIG. 15A is a view illustrating an example of a room entry screen.
Figure 15B:
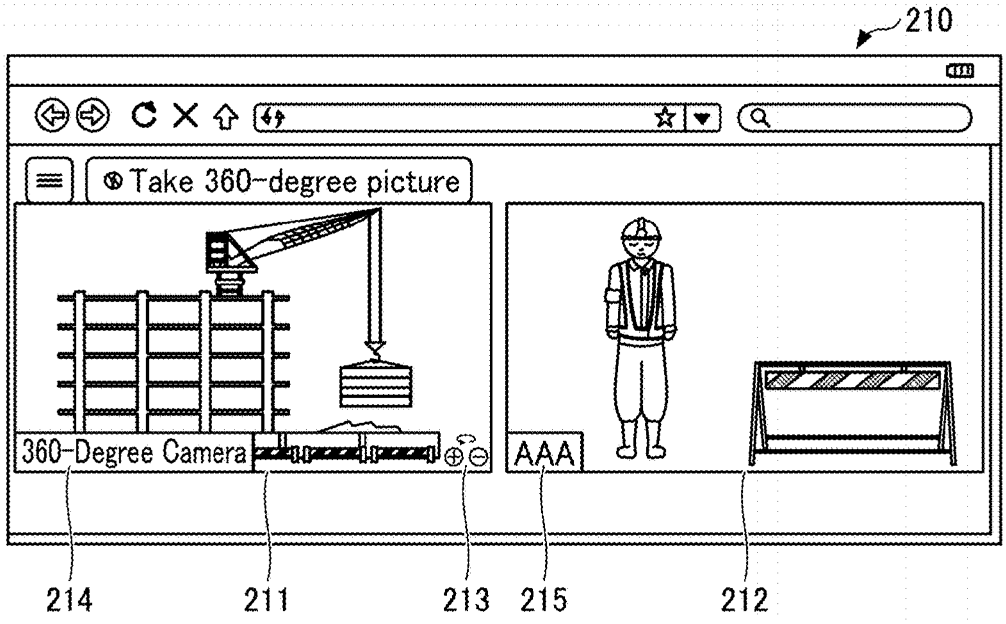
FIG. 15B is a view illustrating an example of an image viewing screen displayed on the communication terminal in response to a user entering a virtual room.

FIGS. 15A and 15B illustrate examples of a screen displayed on the communication terminal 30B when the user B is to enter the virtual room. FIG. 15A illustrates an example of a room entry screen 200. Prior to the display of the room entry screen 200, the user B logs into the information processing system 50. Upon the login of the user B, the tenant to which the user B belongs is identified. Virtual rooms are associated with the tenant. A list of virtual rooms associated with the tenant is displayed on the communication terminal 30B (see FIG. 17), and the user B selects a virtual room that the user B is to enter from the list. FIG. 15A illustrates the room entry screen 200 for the virtual room selected by the user B.

Alternatively, the creator of the virtual room may request the information processing system 50 to issue a URL corresponding to the virtual room, and the URL may be transmitted to the user B via email or any other means. In response to the user B clicking on the URL displayed on the communication terminal 30B, the communication terminal 30B displays the room entry screen 200 illustrated in FIG. 15A.

The room entry screen 200 includes a virtual room name 201, a participant name input field 202, and a room entry button 203. The virtual room name 201 is the same as that stored in the virtual room information storage unit 5002. The participant name input field 202 may include a name such as a nickname of the user B. Upon the login of the user B, the user name of the user B is identified. The identified user name may be automatically displayed. The room entry button 203 is a button for the user B to send a request to enter the virtual room.

At the time of entry into the virtual room, authentication for entering the virtual room may be requested separately from the login to the tenant.

FIG. 15B illustrates an image viewing screen 210 displayed on the communication terminal 30B upon the user B entering the virtual room. The image viewing screen 210 illustrated in FIG. 15B indicates that the image capturing apparatus 10 has already started distributing a wide-view image and that the communication terminal 30A has already started distributing an image having a normal angle of view. The image viewing screen 210 includes a first image field 211 and a second image field 212. The first image field 211 displays the wide-view image, and the second image field 212 displays the image having a normal angle of view. In one example, images are transmitted from three or more sites. The image viewing screen 210 is divided into a number of portions corresponding to the number of sites from which images are transmitted.

The first image field 211 displays a wide-view image mark 213. The wide-view image mark 213 is set by the screen generation unit 52 of the information processing system 50 upon determination that the image to be displayed in the first image field 211 is a wide-view image. The determination may be made by the communication terminal 30B, and the communication terminal 30B may display the wide-view image mark 213. The wide-view image mark 213 allows the user B to know that the point of view can be changed. The first image field 211 also displays a device name 214. The device name 214 is transmitted from the image capturing apparatus 10 together with the wide-view image. The device name 214 is set by the user A (see FIG. 19), as described below.

The second image field 212 displays a participant name 215. The participant name 215 is a user name. The participant name of a user who has already entered the virtual room is displayed in the participant name input field 202. In the illustrated example, since the user A has already entered the virtual room, "AAA", which is entered by the user A in the participant name input field 202, is displayed as the participant name 215.

Figure 16:
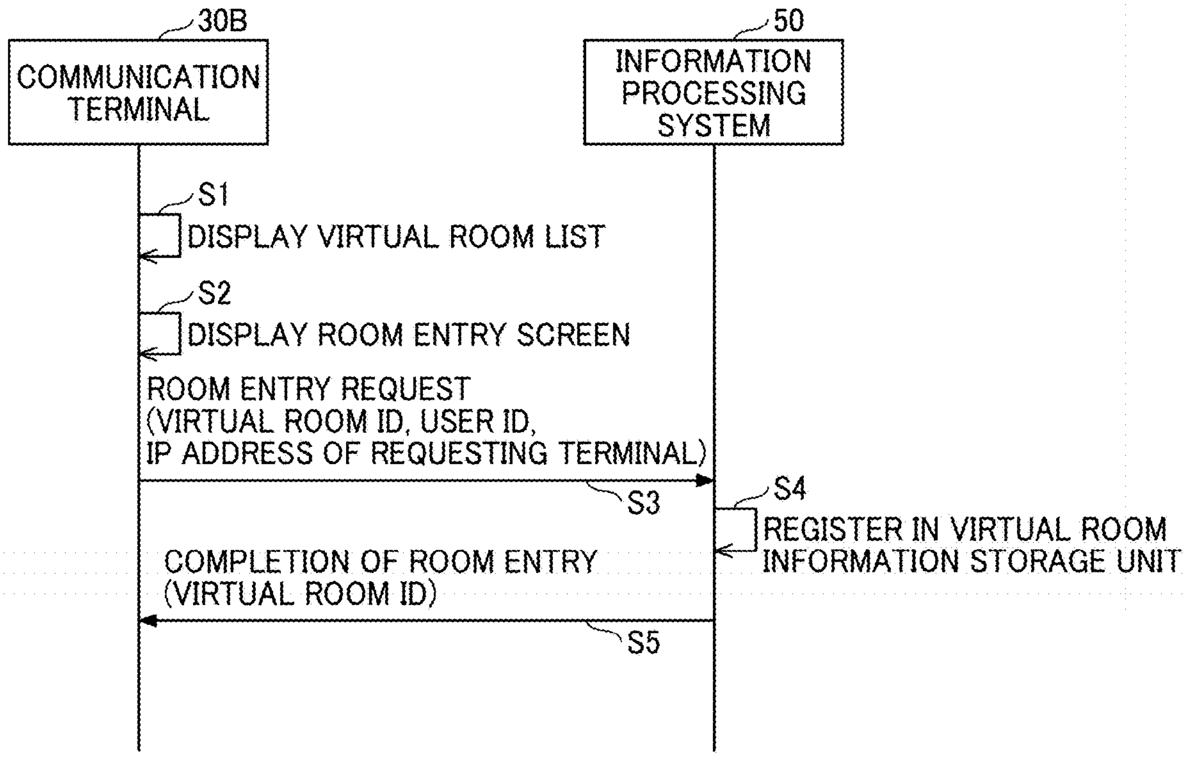
FIG. 16 is a sequence diagram illustrating an example process in which the user (or the communication terminal) enters the virtual room.

FIG. 16 is a sequence diagram illustrating a process in which the user B (or the communication terminal 30B) enters the virtual room.

S1: First, the user B at the site B performs an operation of displaying a virtual room list screen. In response to the acceptance unit 32 accepting the operation of displaying the virtual room list screen, the display control unit 33 of the communication terminal 30B causes the display 306 to display a selection screen.

S2: In response to the user B selecting a selection button for one of the virtual rooms, the acceptance unit 32 of the communication terminal 30B accepts the selection of the virtual room. The display control unit 33 of the communication terminal 30B causes the display 306 to display the room entry screen 200.

S3: The user B completes the items and then presses the room entry button 203. In response to the acceptance unit 32 accepting the pressing of the room entry button 203, the communication unit 31 of the communication terminal 30B transmits a request to the information processing system 50 to enter the virtual room. The request for entering the virtual room includes a virtual room ID indicating the virtual room selected in step S2, the user ID of the user B, who is a login user, and the IP address of the communication terminal 30B from which the request is transmitted.

S4: The communication unit 51 of the information processing system 50 receives the request for entering the virtual room. The communication group management unit 56 registers the IP address and the user ID of the login user in the virtual room information identified by the virtual room ID in the virtual room information storage unit 5002.

S5: The communication unit 51 of the information processing system 50 transmits, to the communication terminal 30B, a notification of the completion of the entry to the virtual room. Thus, the communication unit 31 of the communication terminal 30B receives the notification of the completion of the entry to the virtual room.

Association of Image Capturing Apparatus With Room

Figure 17:
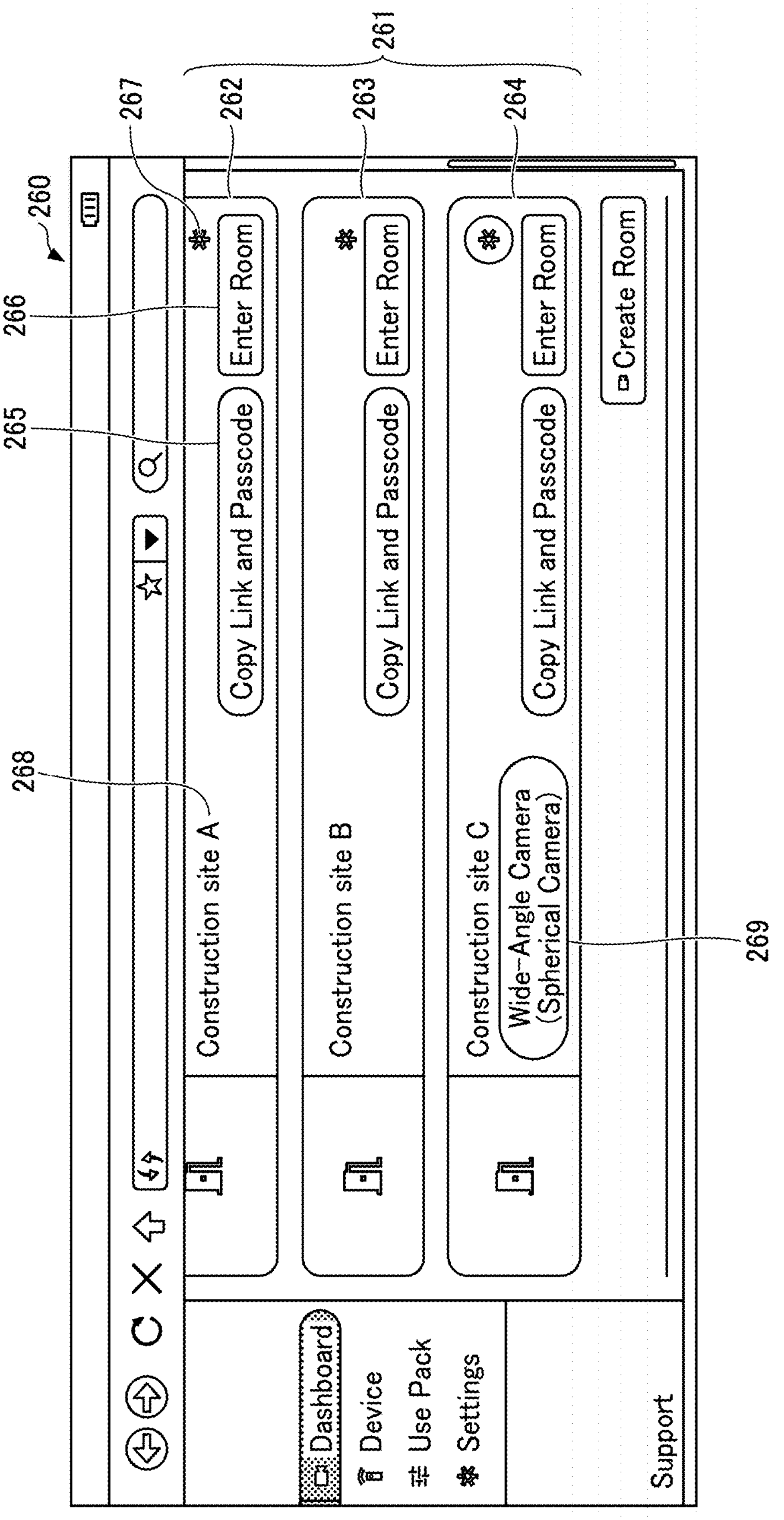
FIG. 17 is a view illustrating an example of a first virtual room association screen for associating an image capturing apparatus with a virtual room.

FIG. 17 illustrates an example of a first virtual room association screen 260 for associating the image capturing apparatus 10 with a virtual room. The same screen configuration may be used for the VR goggles 89 and the smart glasses 88. The first virtual room association screen 260 includes a virtual room list 261. The virtual room list 261 displays individual virtual room fields 262 to 264, based on virtual rooms created in the tenant. Each of the individual virtual room fields 262 to 264 includes a link issuance button 265, a room entry button 266, a settings button 267, and a virtual room name 268. The link issuance button 265 is a button for issuing a link (a URL for invitation) to the corresponding virtual room and a passcode. The room entry button 266 is a button for the user A to enter the virtual room. The settings button 267 is a button for associating the image capturing apparatus 10 with the virtual room. The virtual room name 268 is the same as that stored in the virtual room information storage unit 5002. The user A presses the settings button 267. In response to the pressing of the settings button 267, the communication terminal 30A displays a second virtual room association screen 270 illustrated in FIG. 18.

If a device has already been associated with the virtual room, a name 269 of the device is displayed in the individual virtual room field (in FIG. 17, the individual virtual room field 264).

Figure 18:
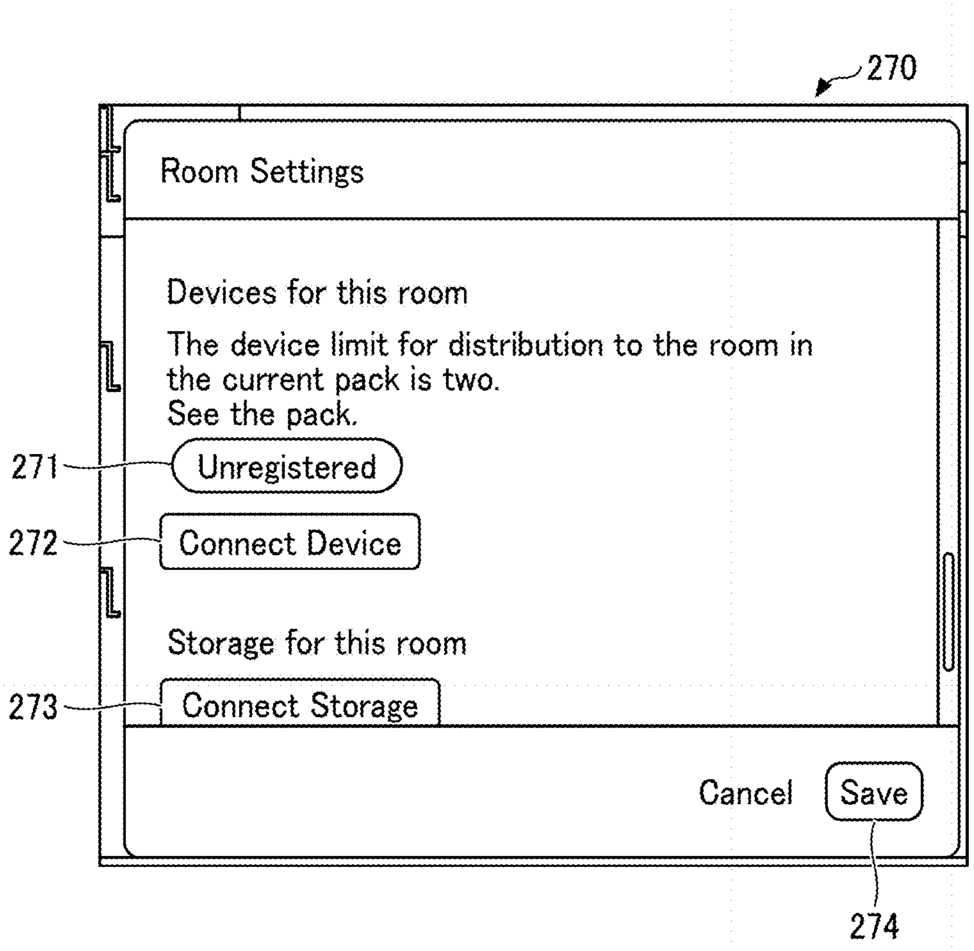
FIG. 18 is a view illustrating an example of a second virtual room association screen.

FIG. 18 illustrates an example of the second virtual room association screen 270. The second virtual room association screen 270 is displayed as a pop-up on the first virtual room association screen 260. In one example, the screen transition from the first virtual room association screen 260 to the second virtual room association screen 270 is not made through the information processing system 50. In another example, the screen transition from the first virtual room association screen 260 to the second virtual room association screen 270 is made through the information processing system 50.

The second virtual room association screen 270 includes a name 271 of the image capturing apparatus 10 that is currently (or has already been) associated with the virtual room, a connection button 272, and a storage button 273. In FIG. 18, the name 271 is set unregistered because the image capturing apparatus 10 is not registered yet. The connection button 272 is a button for displaying a list of devices registered in the tenant. The storage button 273 is a button for displaying a list of storages 90 to store a wide-view image captured by the image capturing apparatus 10 associated with the virtual room. In response to the pressing of the connection button 272, the communication terminal 30A displays a third virtual room association screen.

The communication terminal 30A transmits a virtual room ID to the information processing system 50 and acquires the name (or ID) of a device registered in the tenant for which the virtual room is generated and the name (or ID) of a device associated with the virtual room.

Figure 19:
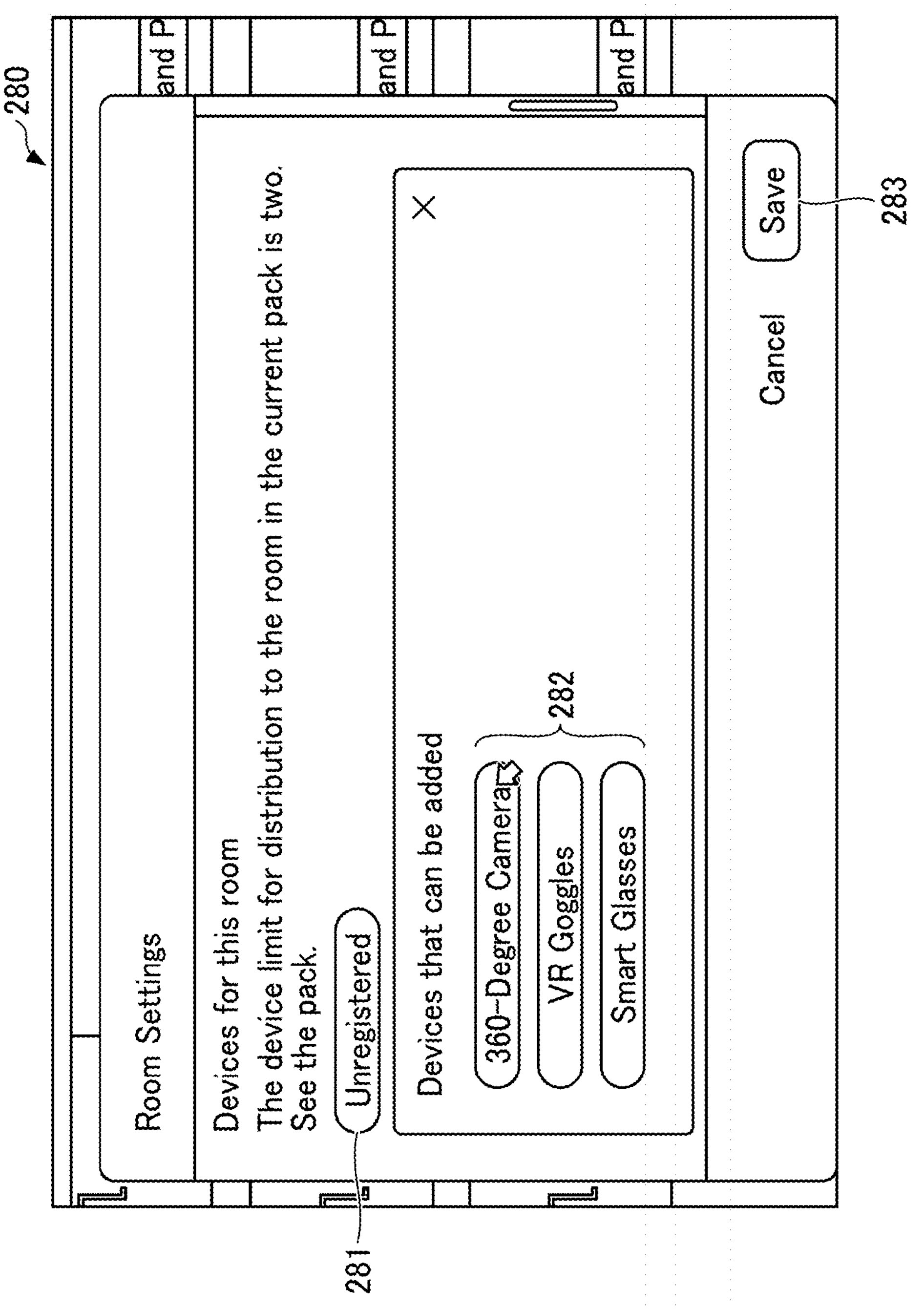
FIG. 19 is a view illustrating an example of a third virtual room association screen.

FIG. 19 illustrates an example of a third virtual room association screen 280. The third virtual room association screen 280 includes a name 281 of the image capturing apparatus 10 that is currently (or has already been) associated with the virtual room, a list of devices 282 that can be added, and a "Save" button 283. The user A selects a device to be associated with the virtual room from the list of devices 282 that can be added and then presses the "Save" button 283. As a result, the selected device is associated with the virtual room. That is, the corresponding image capturing apparatus ID is registered in the virtual room information storage unit 5002.

Wide-View Image Transmission Start Process for Image Capturing Apparatus

In the way described above, a device such as the image capturing apparatus 10 is associated with the virtual room. The user A operates the device to start transmitting an image.

For the VR goggles 89 and the smart glasses 88, the user A operates the device main body to turn on or off the transmission of an image. This is because no application dedicated to the communication system 1 is currently operating on the VR goggles 89 or the smart glasses 88. If an application dedicated to the communication system 1 operates on the VR goggles 89 and the smart glasses 88, the user A can also remotely turn on or off the transmission of an image.

For the image capturing apparatus 10, when the application is enabled, the user A can turn on or off the transmission of the wide-view image from the menu of the application after entering the virtual room.

Figure 20A:
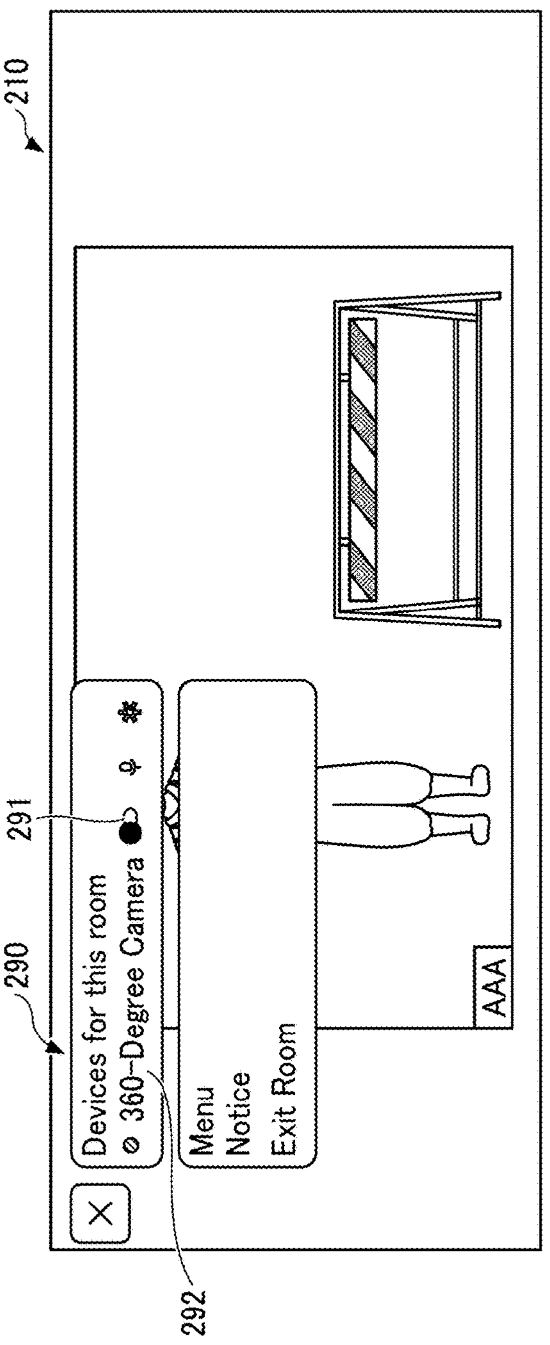
FIGS. 20A and 20B are views illustrating examples of a wide-view image transmission start/stop dialog displayed on the communication terminal.
Figure 20B:
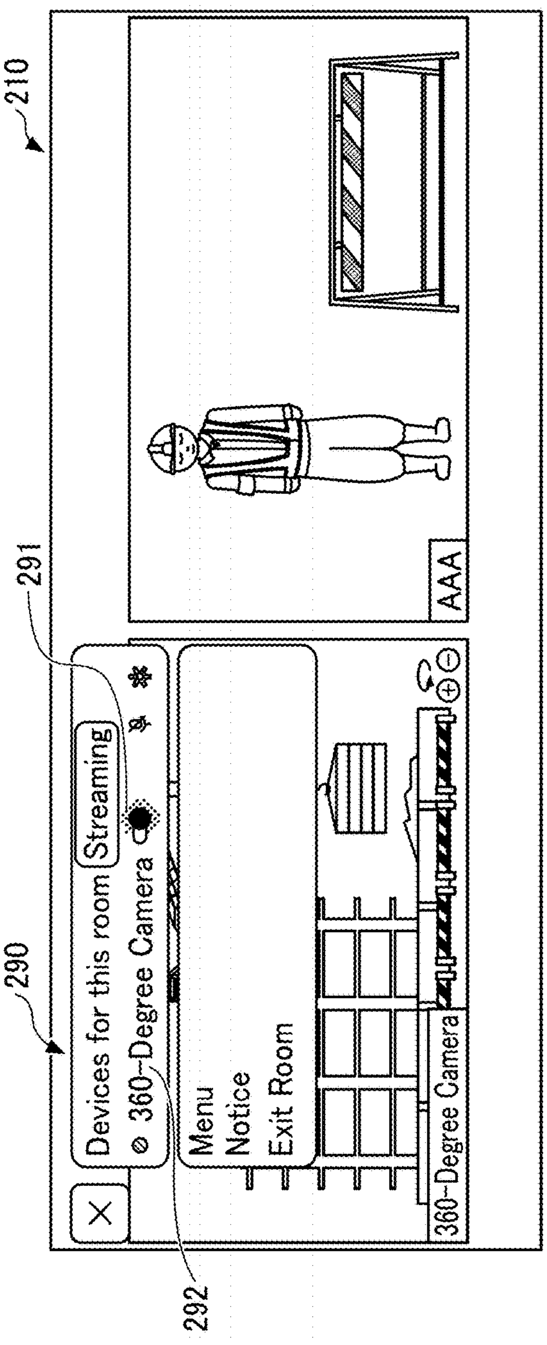

FIGS. 20A and 20B illustrate examples of a wide-view image transmission start/stop dialog 290 displayed on the communication terminal 30A. The wide-view image transmission start/stop dialog 290 is displayed as a pop-up on the image viewing screen 210. In the illustrated example, the user A has operated the communication terminal 30A and entered a virtual room associated with the image capturing apparatus 10. The wide-view image transmission start/stop dialog 290 displays a name 292 of the image capturing apparatus 10 associated with the virtual room. A toggle button 291 is displayed near the name 292. In one embodiment, the user A operates the toggle button 291 to turn on or off the transmission of the wide-view image captured by the image capturing apparatus 10. The turning on or off of the transmission using a toggle button is an example. The transmission of the wide-view image may be turned on or off in accordance with an input of a user operation. In one example, the user A turns on or off the transmission of the wide-view image by selecting a radio button or a predetermined icon or operating the menu. In another example, the transmission of the wide-view image is started automatically, without the user's operation, after the image capturing apparatus 10 enters the room. In another example, a predetermined condition such as the date and time, the number of users who have entered the room, or the participation of a specific user is determined in advance, and the transmission of the wide-view image is started in response to a determination that the predetermined condition is satisfied.

The communication terminal 30A transmits the state of the toggle button 291 to the information processing system 50. The information processing system 50 transmits a transmission start request or a transmission stop request corresponding to the state of the toggle button 291 to the image capturing apparatus 10.

FIG. 20A illustrates an off state of the toggle button 291. In FIG. 20A, thus, the wide-view image is not displayed. By contrast, the image having a normal angle of view captured by the camera 9 of the communication terminal 30A is displayed in the image viewing screen 210 in FIG. 20A since the image having a normal angle of view has already been shared at the time of entry of the communication terminal 30A into the virtual room.

FIG. 20B illustrates an on state of the toggle button 291. In response to turning on of the toggle button 291, the information processing system 50 transmits a transmission start request to the image capturing apparatus 10. Accordingly, the image capturing apparatus 10 starts transmitting the wide-view image. Since two images are shared in one virtual room, the image viewing screen 210 is divided into two areas.

Procedure for Registering Image Capturing Apparatus in Virtual Room

Figure 21:
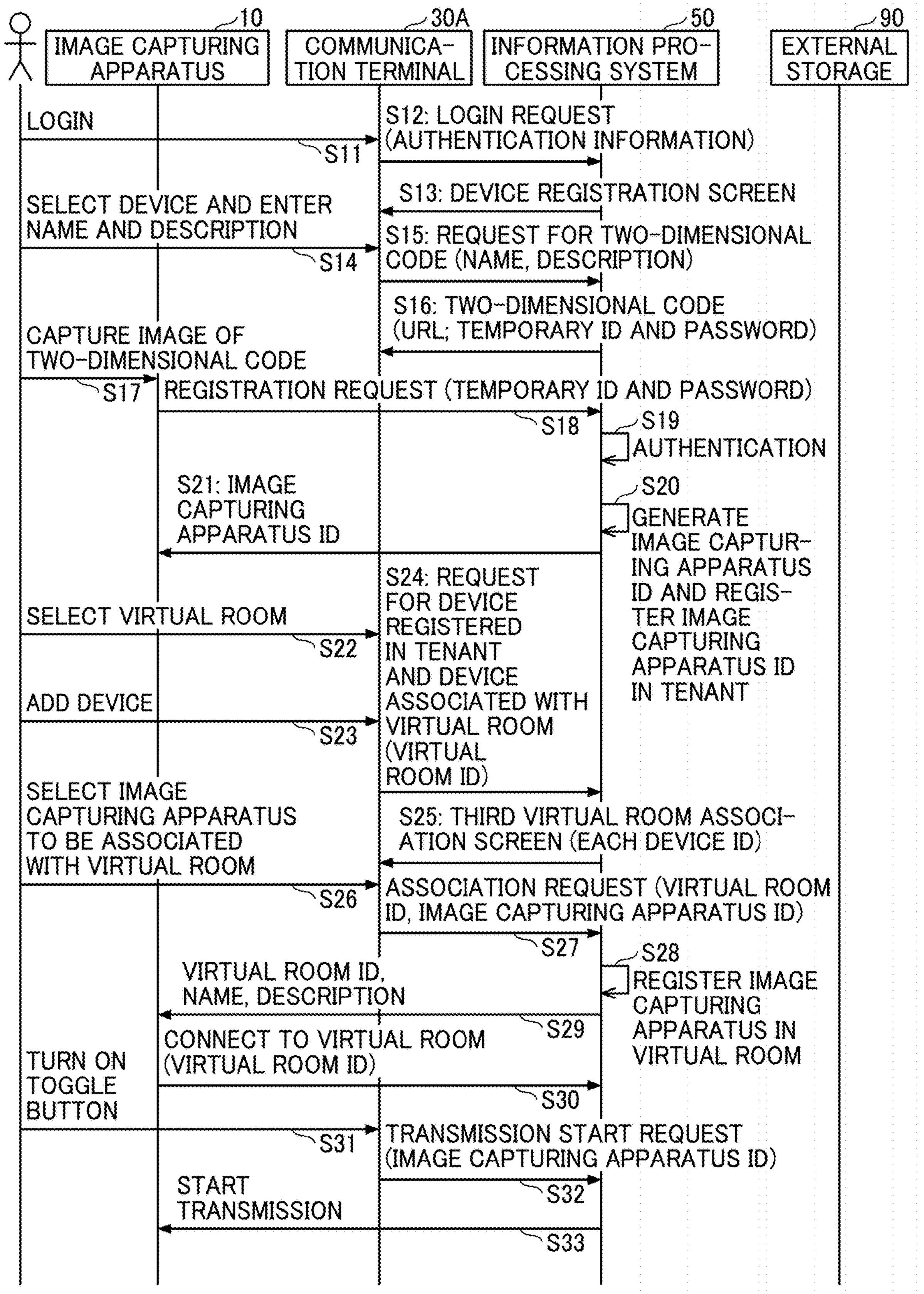
FIG. 21 is a sequence diagram illustrating an example procedure in which the user registers the image capturing apparatus in a virtual room.

Next, a procedure for registering the image capturing apparatus 10 in the virtual room illustrated in the screen transitions will be described with reference to FIG. 21. FIG. 21 is a sequence diagram illustrating an example procedure in which the user A registers the image capturing apparatus 10 in the virtual room.

S11: First, the user A connects the communication terminal 30A to the information processing system 50 and enters authentication information (such as a user ID and a password) to send a login request to log into the tenant to which the user A belongs. The acceptance unit 32 of the communication terminal 30A accepts the operation.

S12: The communication unit 31 of the communication terminal 30A designates the authentication information and transmits the login request to the information processing system 50. In the information processing system 50, the communication unit 51 receives the login request, and the authentication unit 55 performs authentication. It is assumed that the authentication is successful.

S13: In the information processing system 50, the screen generation unit 52 generates a device registration screen in response to the user operation, and the communication unit 51 transmits screen information of the device registration screen to the communication terminal 30A.

S14: In the communication terminal 30A, the communication unit 31 receives the screen information of the device registration screen, and the display control unit 33 displays the device registration screen. The user A selects the type of the device (in the illustrated example, the image capturing apparatus 10). Then, the user A enters the name and description of the image capturing apparatus 10. The acceptance unit 32 accepts the entered information.

S15: The communication unit 31 of the communication terminal 30A designates the name and description entered by the user A and transmits a request for a two-dimensional code to the information processing system 50.

S16: The communication unit 51 of the information processing system 50 receives the request for a two-dimensional code. The communication group management unit 56 generates a URL (connection destination for registration) in association with the name and the description, and generates a two-dimensional code including the URL, a temporary ID, and a password. The communication unit 51 of the information processing system 50 transmits the two-dimensional code to the communication terminal 30A. In the communication terminal 30A, the communication unit 31 receives the two-dimensional code, and the display control unit 33 displays the two-dimensional code.

S17: The user A operates the image capturing apparatus 10 to be associated with the virtual room to capture an image of the two-dimensional code. The acceptance unit 12 of the image capturing apparatus 10 accepts the operation.

S18: In the image capturing apparatus 10, the imaging processing unit 13 performs an operation of capturing an image including the two-dimensional code to generate image data, and the analysis unit 14 analyzes the image data to extract the URL, the temporary ID, and the password. Accordingly, the registration request unit 15 connects to the URL via the connection unit 16, designates the temporary ID and the password, and transmits a request for registering the image capturing apparatus 10 to the information processing system 50.

S19: In the information processing system 50, the communication unit 51 receives the temporary ID and the password, and the authentication unit 55 determines whether the received temporary ID and password match the temporary ID and password associated with the connected URL. It is assumed that the temporary IDs match and the passwords match.

S20: Since a request for registering the image capturing apparatus 10 has been made, the communication group management unit 56 of the information processing system 50 generates an image capturing apparatus ID and registers the image capturing apparatus ID in the tenant to which the user A has logged in. The image capturing apparatus ID is associated with a name and a description.

S21: The communication unit 51 of the information processing system 50 transmits the image capturing apparatus ID to the image capturing apparatus 10. The connection unit 16 of the image capturing apparatus 10 receives the image capturing apparatus ID and stores the image capturing apparatus ID in the storage unit 1000.

S22: The communication terminal 30A is notified of the completion of the registration, and, accordingly, the user A starts associating the image capturing apparatus 10 with the virtual room. The user A selects, from the first virtual room association screen 260 displayed on the communication terminal 30A, a virtual room with which the user A desires to associate the image capturing apparatus 10 registered in the tenant. The acceptance unit 32 of the communication terminal 30A accepts the selection of the virtual room.

S23: The user A displays the second virtual room association screen 270 on the communication terminal 30A and presses an "add device" button. The acceptance unit 32 of the communication terminal 30A accepts the pressing of the "add device" button.

S24: The communication unit 31 of the communication terminal 30A transmits to the information processing system 50 a request for devices registered in the tenant and devices associated with the virtual room ID selected in step S22.

S25: In the information processing system 50, the communication unit 51 receives the request for the devices registered in the tenant and the devices associated with the virtual room ID, and the screen generation unit 52 generates the third virtual room association screen 280 including the device IDs of the devices registered in the tenant and the devices associated with the virtual room ID. The communication unit 51 of the information processing system 50 transmits screen information of the third virtual room association screen 280 to the communication terminal 30A.

S26: In the communication terminal 30A, the communication unit 31 receives the screen information of the third virtual room association screen 280, and the display control unit 33 causes the third virtual room association screen 280 to be displayed. The user A selects the image capturing apparatus 10 to be associated with the virtual room. The acceptance unit 32 of the communication terminal 30A accepts the selection of the image capturing apparatus 10, and the image capturing apparatus ID is identified.

S27: The communication unit 31 of the communication terminal 30A designates the virtual room ID selected in step S22 and the image capturing apparatus ID selected in step S26, and transmits an association request to the information processing system 50.

S28: In the information processing system 50, the communication unit 51 receives the association request, and the communication group management unit 56 registers the image capturing apparatus 10 in the virtual room. That is, the communication group management unit 56 registers the image capturing apparatus ID in the virtual room information storage unit 5002.

S29: Since the image capturing apparatus ID is associated with the virtual room, the communication unit 51 of the information processing system 50 transmits the virtual room ID, the name, and the description to the image capturing apparatus 10. The information processing system 50 may transmit the virtual room ID, the name, and the description to the image capturing apparatus 10 by using a push notification or by using polling, which is performed by the image capturing apparatus 10. The connection unit 16 of the image capturing apparatus 10 receives the virtual room ID, the name, and the description and stores the virtual room ID, the name, and the description in the storage unit 1000. Accordingly, the image capturing apparatus 10 can attach, for example, the image capturing apparatus ID, the virtual room ID, the name, and the description to a wide-view image to be transmitted.

S30: The communication terminal 30A and the information processing system 50 perform the room entry process illustrated in FIG. 16 to allow the communication terminal 30A to enter the virtual room associated with the image capturing apparatus 10.

S31: The communication terminal 30A is notified of the completion of the association, and, in response to the notification, the user A turns on the toggle button 291 for the image capturing apparatus 10 associated with the virtual room on the image viewing screen 210. The acceptance unit 32 of the communication terminal 30A accepts the turn-on operation.

S32: The communication unit 31 of the communication terminal 30A designates the image capturing apparatus ID and transmits, to the information processing system 50, a request for starting transmission of the wide-view image. The user A may directly operate a button of the image capturing apparatus 10 to start transmitting the wide-view image. In response to an operation performed by the user A, the communication unit 31 of the communication terminal 30A may transmit a transmission stop request to the information processing system 50.

S33: The communication unit 51 of the information processing system 50 receives the transmission start request and requests the image capturing apparatus 10 identified by the image capturing apparatus ID to start transmission. The information processing system 50 may use a push notification or use polling, which is performed by the image capturing apparatus 10. In the image capturing apparatus 10, the connection unit 16 receives the transmission start request, and the imaging processing unit 13 starts capturing a wide-view image. The image transmission control unit 18 repeatedly transmits the wide-view image with a determined frame rate (expressed in FPS) or a frame rate (expressed in FPS) corresponding to a band via the connection unit 16. As a result, the communication terminal 30 that has entered the virtual room can display the state of the site A on the image viewing screen 210 in real time.

Distribution of Wide-View Image and Others

Figure 22:
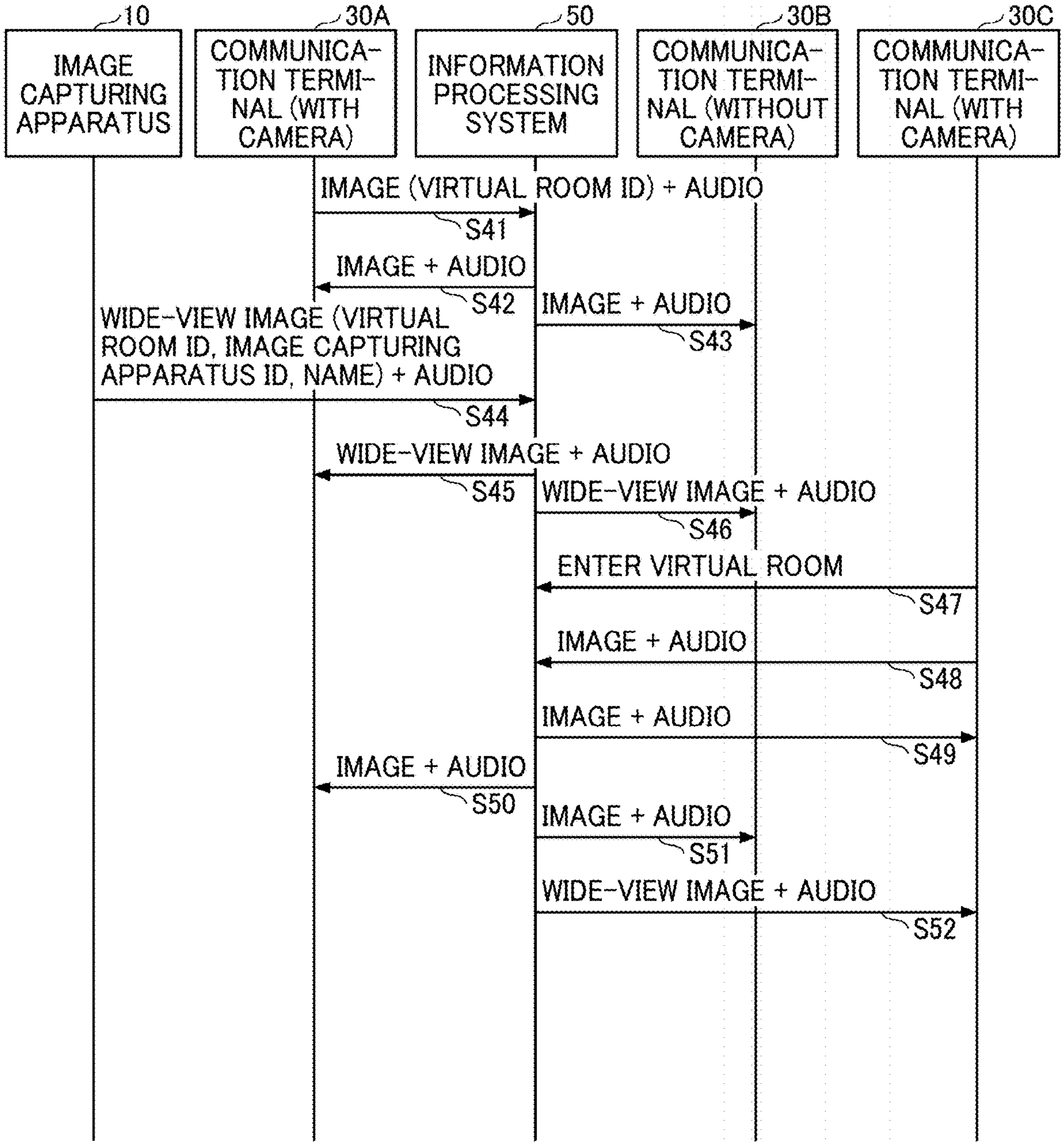
FIG. 22 is a sequence diagram illustrating an example process for sharing a wide-view image.

A process for sharing a wide-view image or an image having a normal angle of view will be described with reference to FIG. 22. FIG. 22 is a sequence diagram illustrating an example process for sharing a wide-view image. In FIG. 22, the communication terminals 30A and 30B have entered the virtual room. The communication terminal 30A includes the camera 9 having a normal angle of view, and an image captured by the camera 9 is shared with the communication terminal 30B. An image captured by the smart glasses 88 associated with the virtual room, instead of the camera 9 of the communication terminal 30A, may be shared.

S41: In the communication terminal 30A, the imaging unit 34 repeatedly captures an image to obtain captured images, and the communication unit 31 designates the virtual room ID of the virtual room that the communication unit 31 is in and repeatedly transmits the images and audio to the information processing system 50.

S42 and S43: In the information processing system 50, in response to the communication unit 51 receiving the images and the audio, the image distribution unit 54 acquires the IP addresses of the communication terminals 30A and 30B, which are in the virtual room, from the virtual room information storage unit 5002, and transmits the images and the audio via the communication unit 51. In FIG. 22, an image having a normal angle of view is received by the communication unit 31 of the communication terminal 30A from the information processing system 50 and is displayed. In another example, an image having a normal angle of view is not received from the information processing system 50, but an image having a normal angle of view is captured by the imaging unit 34 and is displayed.

S44: In the image capturing apparatus 10, in response to a transmission start request made by turning on the toggle button 291, the imaging processing unit 13 repeatedly captures a wide-view image to obtain captured wide-view images, and the image transmission control unit 18 designates the virtual room ID, the image capturing apparatus ID, the name, and the description and repeatedly transmits the wide-view images and audio to the information processing system 50 via the connection unit 16.

S45 and S46: In the information processing system 50, in response to the communication unit 51 receiving the wide-view images and the audio, the image distribution unit 54 acquires the IP addresses of the communication terminals 30A and 30B, which are in the virtual room, from the virtual room information storage unit 5002, and transmits the wide-view images and the audio via the communication unit 51.

S47: The communication terminal 30C including the camera 9 newly enters the virtual room.

S48: The communication unit 31 of the communication terminal 30C transmits an image having a normal angle of view and audio to the information processing system 50.

S49 to S51: In the information processing system 50, the communication unit 51 receives the image having a normal angle of view and the audio from the communication terminal 30C, and the image distribution unit 54 acquires the IP addresses of the communication terminals 30A to 30C, which are in the virtual room, from the virtual room information storage unit 5002, and transmits the image having a normal angle of view and the audio.

S52: The communication unit 51 of the information processing system 50 also transmits the wide-view images and the audio to the communication terminal 30C, which is in the same virtual room.

As described above, the users A and B, who are in the same virtual room, can share the wide-view images captured by the image capturing apparatus 10 associated with the virtual room. The order of transmission of the images illustrated in FIG. 22 is an example. In another example, the wide-view images may be shared first, or the images having a normal angle of view may be shared first.

A supplementary description will be given of the smart glasses 88 and the VR goggles 89. The smart glasses 88 have a camera having a normal angle of view and a display function. The camera of the smart glasses 88 captures an image having a normal angle of view, and the captured image having a normal angle of view is distributed in a manner similar to that for the cameras 8 and 9. The display function of the smart glasses 88 is implemented by a flat screen, like that of an ordinary display. Thus, part of a wide-view image is displayed from a point of view designated by the user. The VR goggles 89 have a display function. In one example, the VR goggles 89 may also include a camera having a normal angle of view. The display function of the VR goggles 89 projects a wide-view image with a point of view determined by the orientation of the head of the user wearing the VR goggles 89. Thus, part of the wide-view image is displayed from a point of view corresponding to the orientation of the head of the user. While viewing a wide-view image with the smart glasses 88 or the VR goggles 89, the user can transmit, to the information processing system 50, an image capturing request that designates point-of-view information of the wide-view image being viewed.

Possible Occurrence of Blur in Images

Figure 23:
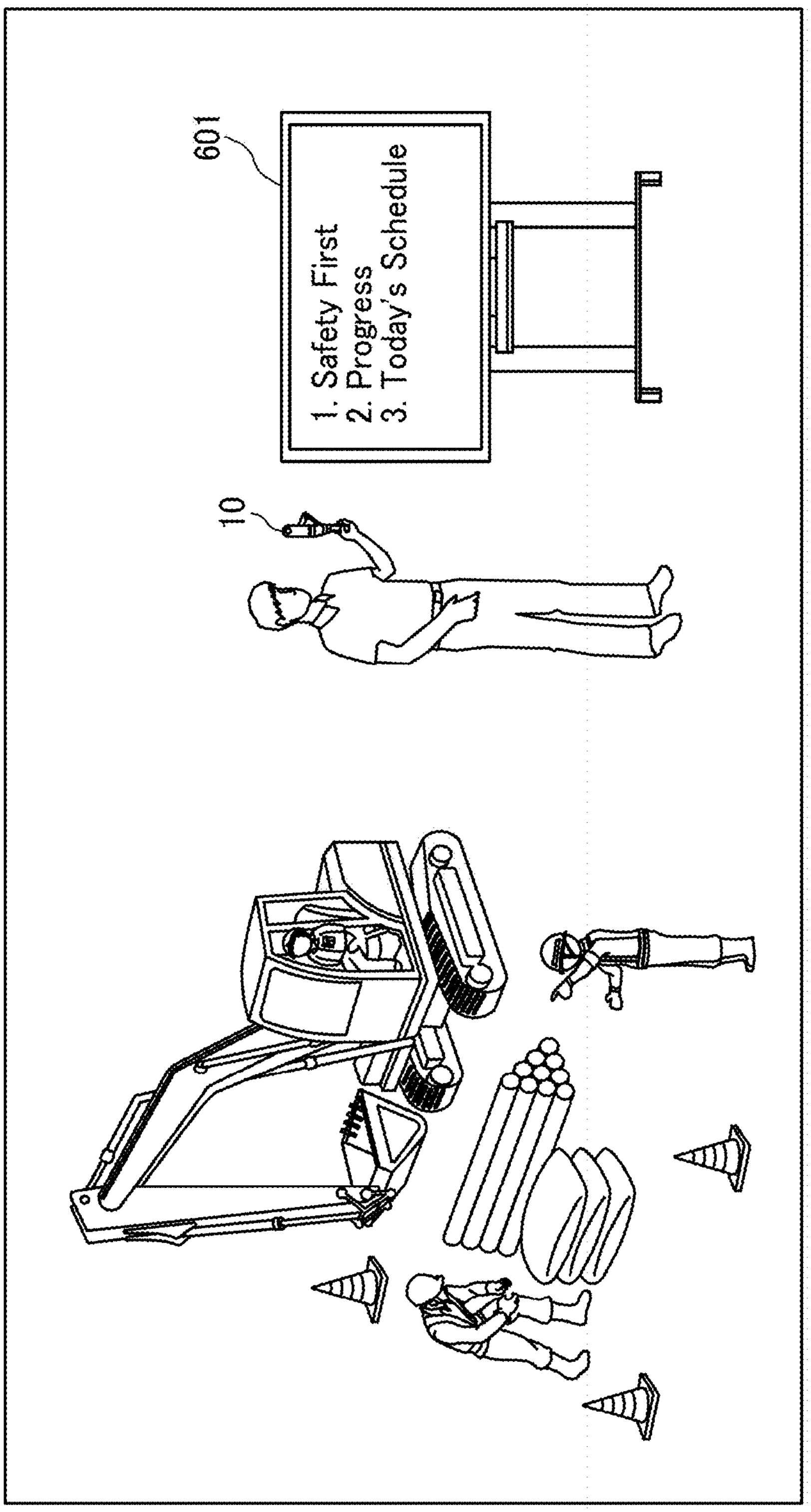
FIG. 23 is a schematic view of a situation in which the user captures images of the surroundings by using the image capturing apparatus for streaming or distribution of the images according to an embodiment of the present disclosure.

FIG. 23 is a schematic view of a situation in which the user A captures images of the surroundings by using the image capturing apparatus 10 for streaming or distribution of the images. In FIG. 23, the images are captured in a construction site, by way of example but not limitation. The user A moves while capturing images of the construction site with the power turned on. The distribution start button 115*a* of the operation unit 115, described above, is turned on, and the image capturing apparatus 10 transmits image data of the images captured during movement of the user A to the communication terminals 30B and 30C. The user A stops in front of an electronic whiteboard 601 and directs the image capturing apparatus 10 toward the electronic whiteboard 601 to obtain a wide-view image to make the content displayed on the electronic whiteboard 601 viewable to the users B and C. To obtain the wide-view image, it is desirable that no obstacle be present between the electronic whiteboard 601 and the image capturing apparatus 10.

The user A captures an image of the electronic whiteboard 601 when the user is in stationary state; however, a slight vibration or movement of the image capturing apparatus 10 may be produced. During this time, the image capturing apparatus 10 encodes image frames by using a predetermined coding format such as H.264. In a typical coding format, a predicted image is generated for an image at a certain moment from the immediately preceding or following image, and a difference from the actual image at that time is detected and encoded. Accordingly, as the user A moves largely, the difference is also large, resulting in it taking time to stabilize an image such as characters for which high resolution is desired for readability. In addition, in a network environment with a small available bandwidth, the communication speed is low, and it takes time for the image to become clear enough to make the details recognizable.

The users B and C of the communication terminals 30B and 30C, which have received the image data, attempt to read information from an unstable image; however, it is difficult for the users B and C to read the information until the image becomes stable or clear. This phenomenon may be simply referred to as "blur" in this embodiment.

In this embodiment, a technique for reducing the blur caused by encoding or bandwidth limitations will be described. The technique according to this embodiment is also suitably applied to reduce so-called camera shake. Camera shake refers to blurring of the subject in photographed images as a result of movement of the camera due to instability of the hand(s) holding the camera.

In this embodiment, accordingly, as described below, an image frame that is locked is transmitted from the transmitter side to prevent or reduce the occurrence of blur on the receiver side (or viewer side). In one embodiment, the user A locks an intended image frame and distributes the locked image frame without keeping the position locked in place, and the communication terminals 30B and 30C of the users B and C immediately display the intended image frame. As a result, the image recognizability to users may be increased. The term "image frame" refers to each of still images of a moving image captured by the image capturing apparatus 10.

Figure 24:
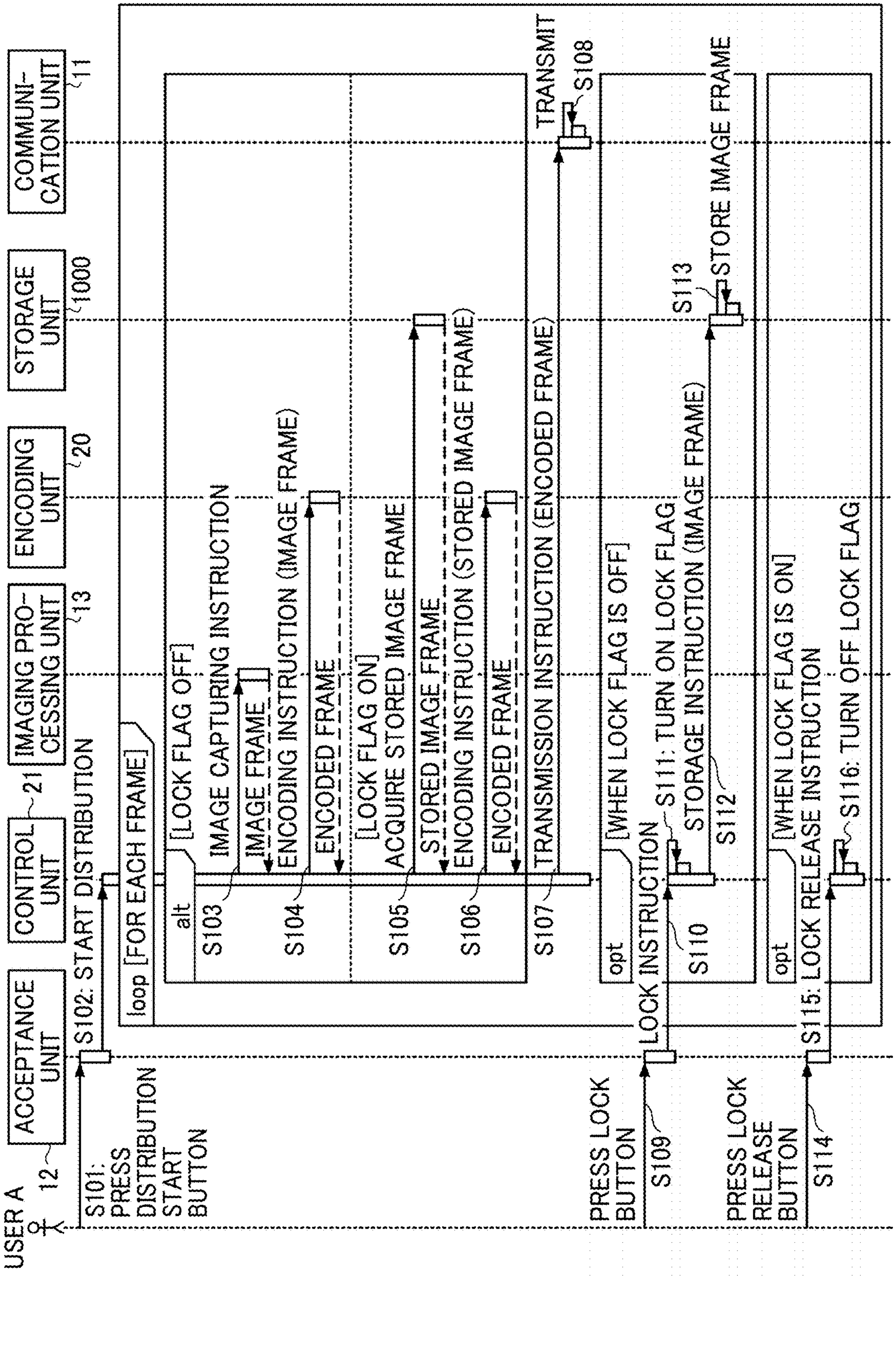
FIG. 24 is a sequence diagram illustrating an example process in which the image capturing apparatus locks an image frame and releases the lock of the image frame in response to button operations on an operation unit of the image capturing apparatus and transmits image data.

Lock of Image Frame and Lock Release of Image Frame by Button Operation on Operation Unit Next, a process in which the image capturing apparatus 10 locks image data or releases the lock of image data in response to the user A operating a button on the operation unit 115 will be described with reference to FIG. 24. FIG. 24 is a sequence diagram illustrating a process in which the image capturing apparatus 10 locks an image frame and releases the lock of the image frame in response to button operations on the operation unit 115 and transmits image data.

S101: The user A who desires to distribute image data and audio data presses the distribution start button 115*a*. The user A may be moving or stationary. The acceptance unit 12 accepts the pressing of the distribution start button 115*a*, and the image capturing apparatus 10 starts distribution of the image data and the audio data. In one embodiment, the user A performs a button operation on the image capturing apparatus 10 by voice. In another embodiment, the image capturing apparatus 10 includes a touch panel, and the user A performs the button operation on the image capturing apparatus 10 by touching a soft key on the touch panel.

S102: The acceptance unit 12 notifies the control unit 21 of the start of distribution. As a result, the control unit 21 starts distribution of the image data and the audio data. In FIG. 24, the description of the audio data is omitted, for simplicity.

During the distribution, the control unit 21 repeats the process below for each frame. A case where a lock flag is on and a case where the lock flag is off will be described separately. The lock flag is a flag for controlling whether to lock the image data. When the lock flag is on, the communication unit 11 repeatedly transmits the same still image (image frame). When the lock flag is off, the communication unit 11 sequentially transmits image frames that are repeatedly updated by capturing images.

S103: In an initial state immediately after the distribution start button 115*a* is pressed, the lock flag is off in one example. In another embodiment, the lock flag is on in the initial state immediately after the distribution start button 115*a* is pressed. The control unit 21 causes the communication unit 11 to transmit an encoded frame. The encoded frame is obtained by the encoding unit 20 encoding an image frame captured by the imaging processing unit 13. The control unit 21 instructs the imaging processing unit 13 to capture an image to acquire an image frame.

S104: The control unit 21 transmits an encoding request and the image frame to the encoding unit 20 to acquire an encoded frame. The encoded frame is a frame encoded using a codec method such as H.264, Xvid, Divx, or MPEG-4.

Next, the case where the lock flag is on will be described.

S105: When the lock flag is on, the control unit 21 acquires an image frame stored in the storage unit 1000.

S106: The control unit 21 transmits an encoding request and the image frame to the encoding unit 20 to acquire an encoded frame. An encoding process similar to that in the case where the lock flag is off is performed.

S107: Both in the case where the lock flag is on and the case where the lock flag is off, the control unit 21 notifies the communication unit 11 of a transmission instruction and the encoded frame. When the lock flag is off, the communication unit 11 transmits encoded frames that are repeatedly generated to the communication terminal 30 in real time. The term "real time" refers to a process being completed within an estimated maximum delay time. When the lock flag is on, the control unit 21 notifies the communication unit 11 of a transmission instruction and the same encoded frame.

S108: As a common process for the case where the lock flag is on and the case where the lock flag is off, the communication unit 11 transmits the encoded frame to the information processing system 50. The processing described above is performed on a frame-by-frame basis to transmit image data.

Immediately after the lock flag is set to on, in one example, the communication unit 11 transmits an encoded frame to the information processing system 50 by forcibly generating an intra frame and transmitting the intra frame. For example, in H.264, an I-frame (intra frame), a P-frame (prediction frame), or a B-frame (bidirectional frame) is transmitted in accordance with, for example, the magnitude of the change in image frame. The I-frame is a frame including information on the whole frame. If the image frame transmitted when the lock flag is set to on is a P-frame or a B-frame, it takes time to transmit the entire image frame to the communication terminals 30B and 30C. Accordingly, immediately after the lock flag is set to on, the communication unit 11 transmits an encoded frame to the information processing system 50 by forcibly generating an intra frame and transmitting the intra frame. This configuration allows the entire image frame to be transmitted to the communication terminals 30B and 30C in a shorter time.

When the lock flag is on, the control unit 21 may transmit the image frame stored in the storage unit 1000, not repeatedly, but once. In this case, advantageously, the image frame received last can be displayed, reducing the load on the image capturing apparatus 10, depending on the specifications of the communication terminals 30B and 30C on the receiver side. However, the image frame, once transmitted, is not transmitted again, and a user who enters the virtual room after the transmission of the image frame fails to receive the image frame while the lock flag is on. For this reason, preferably, the control unit 21 repeatedly transmits the image frame stored in the storage unit 1000.

A process performed in response to the user A pressing the lock button 115*b* and the lock release button 115*c* will be described.

S109: The user A presses the lock button 115*b* to prevent or reduce camera shake. The acceptance unit 12 accepts the pressing of the lock button 115*b*. As a result, the image frame to be transmitted to the communication terminal 30 is locked.

S110: The acceptance unit 12 notifies the control unit 21 of a lock instruction to lock an image frame.

S111: The control unit 21 sets the lock flag to on in response to being notified of the lock instruction.

Figure 28A:
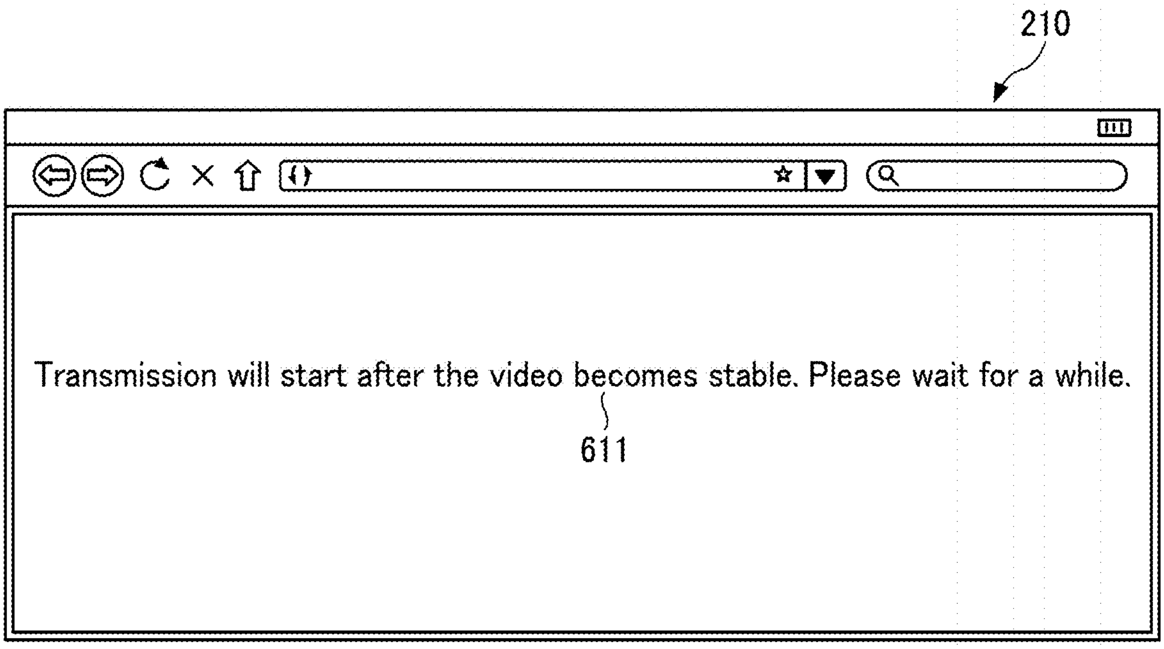
Figure 28B:
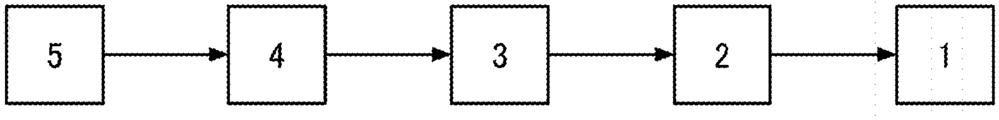

S112 and S113: In response to being notified of the lock instruction, further, the control unit 21 stores, in the storage unit 1000, an image frame that has been captured when the lock flag is on. In one example, the image frame that has been captured is the image frame captured last at the point in time when the lock flag is set to on. In another example, the image frame that has been captured is not the last image frame. An image frame that is actually captured by the imaging processing unit 13 is transmitted to the communication terminal 30 while the lock flag is on. The image frame, which is a still image, allows the users B and C to grasp that the image capturing apparatus 10 is in communication and know minimal information on the site where the image capturing apparatus 10 is located. The image frame to be transmitted to the communication terminal 30 while the lock flag is on is desirably an image frame that is unlikely to be affected by the characteristics of video encoding and the available bandwidth of the network. In one example, the image frame to be transmitted to the communication terminal 30 while the lock flag is on is an image that displays a message. In another example, the image frame is a preset animation. Examples of a displayed image frame are illustrated in FIGS. 28A and 28B.

S114: The user A presses the lock release button 115*c*, estimating that the quality of the image frame becomes stable due to the elapse of time, or in response to an instruction from the users B and C by voice. The acceptance unit 12 accepts the pressing of the lock release button 115*c*. As a result, the image frame to be transmitted to the communication terminals 30B and 30C of the users B and C is no longer locked.

S115: The acceptance unit 12 notifies the control unit 21 of a lock release instruction to release the lock of the image frame.

S116: The control unit 21 sets the lock flag to off in response to being notified of the lock release instruction. The image frame is no longer locked, and normal image distribution resumes.

The acceptance unit 12, the control unit 21, the imaging processing unit 13, the encoding unit 20, the storage unit 1000, and the communication unit 11 illustrated in FIG. 24 are functions of the image capturing apparatus 10. Since, as illustrated in FIG. 1, the image capturing apparatus 10 is connectable to the communication terminal 30A, the functions of the acceptance unit 12, the control unit 21, the imaging processing unit 13, the encoding unit 20, the storage unit 1000, and the communication unit 11 may be shared and held by the image capturing apparatus 10 and the communication terminal 30.

Figure 25:
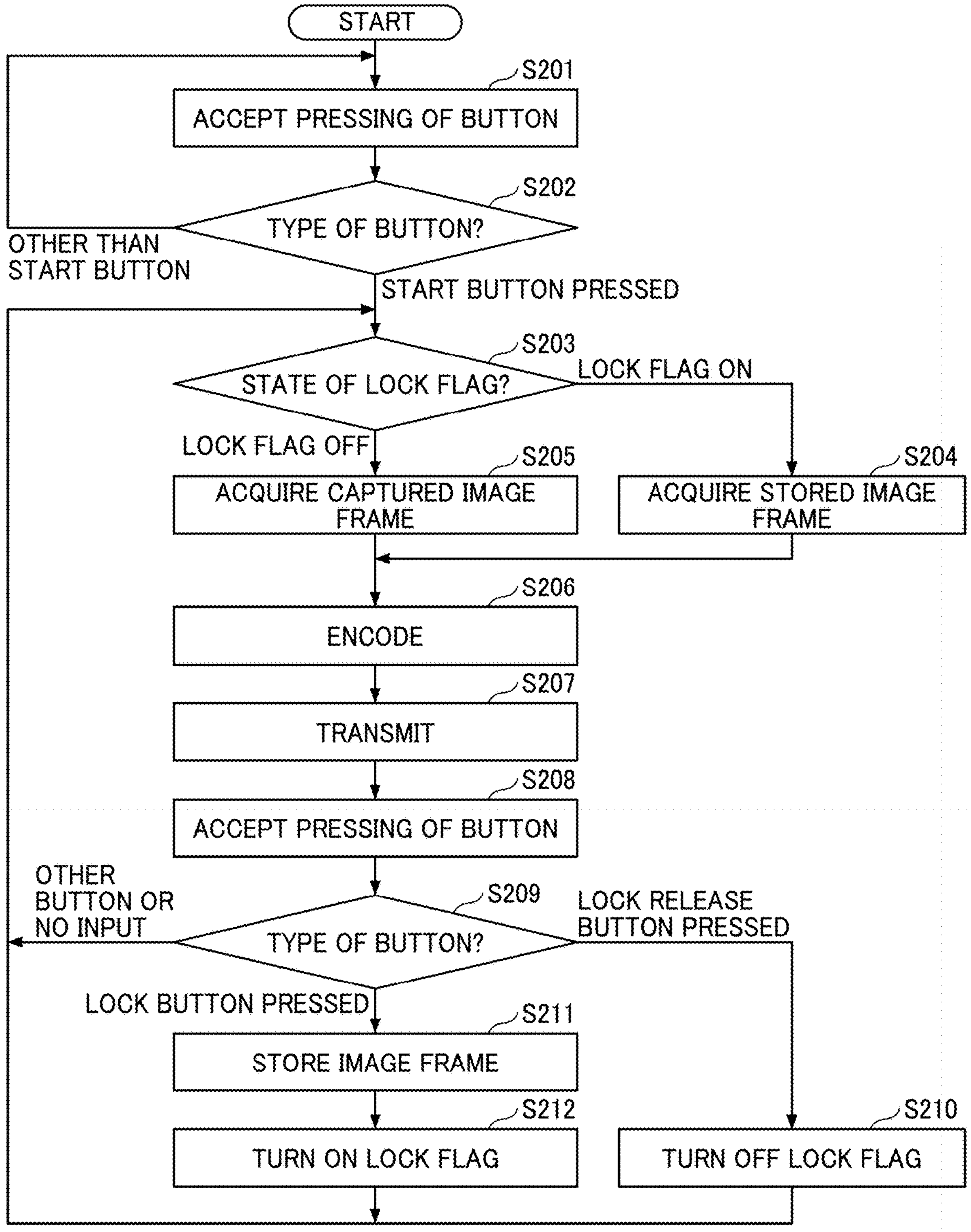
FIG. 25 is a flowchart illustrating an example process in which the image capturing apparatus locks an image frame and releases the lock of the image frame in response to button operations on the operation unit.

FIG. 25 is a flowchart illustrating a process in which the image capturing apparatus 10 locks an image frame and releases the lock of the image frame in response to button operations on the operation unit 115. In FIG. 25, the sequence diagram illustrated in FIG. 24 is illustrated as a flowchart.

The acceptance unit 12 accepts the pressing of a button operated on the operation unit 115 by the user A (S201). The acceptance unit 12 determines the type of the pressed button (S202). If the type of the pressed button is other than the distribution start button 115*a*, the process returns to step S201.

If the type of the pressed button is the distribution start button 115*a*, the control unit 21 determines the state of the lock flag (S203).

If the lock flag is on, the control unit 21 acquires an image frame stored in the storage unit 1000 (S204).

If the lock flag is off, the control unit 21 acquires an image frame from the imaging processing unit 13 (S205).

The control unit 21 encodes the image frame (S206), and the communication unit 11 transmits the encoded frame to the information processing system 50 (S207).

In one example, the acceptance unit 12 accepts another pressing of a button of the operation unit 115 from the user A (S208). The acceptance unit 12 determines the type of the button pressed on the operation unit 115 (S209).

If the type of the pressed button is the lock release button 115*c*, the control unit 21 turns off the lock flag (S210).

If the type of the pressed button is the lock button 115*b*, the control unit 21 stores an image frame that has been captured in the storage unit 1000 (S211), and turns on the lock flag (S212).

If the type of the pressed button is not the lock button 115*b* or the lock release button 115*c*, the process returns to step S203.

As described above, after distribution starts in response to the pressing of the distribution start button 115*a*, when the lock flag is off, the image capturing apparatus 10 repeatedly performs the operation of encoding sequentially updated image frames and transmitting the encoded image frames to distribute image data. During this time, if a button is pressed on the operation unit 115 and the pressed button is the lock button 115*b*, an image frame is stored, and the lock flag is turned on.

When the lock flag is on, the communication unit 11 transmits an image frame stored in the storage unit 1000, instead of sequentially updated image frames, to lock the image frame. During this time, if the lock release button 115*c* is pressed, the lock flag is turned off to release the lock of the image frame.

Selection, by User A, of Image Frame to be Transmitted when Lock Flag is on

An image frame stored in the storage unit 1000 in response to pressing of the lock button 115*b* may include blur, depending on, for example, the timing of the encoding process. It is desirable that the user A select an image frame to be transmitted from among a plurality of image frames to transmit a less blurred image frame from the image capturing apparatus 10 to the communication terminals 30B and 30C.

Figure 26:
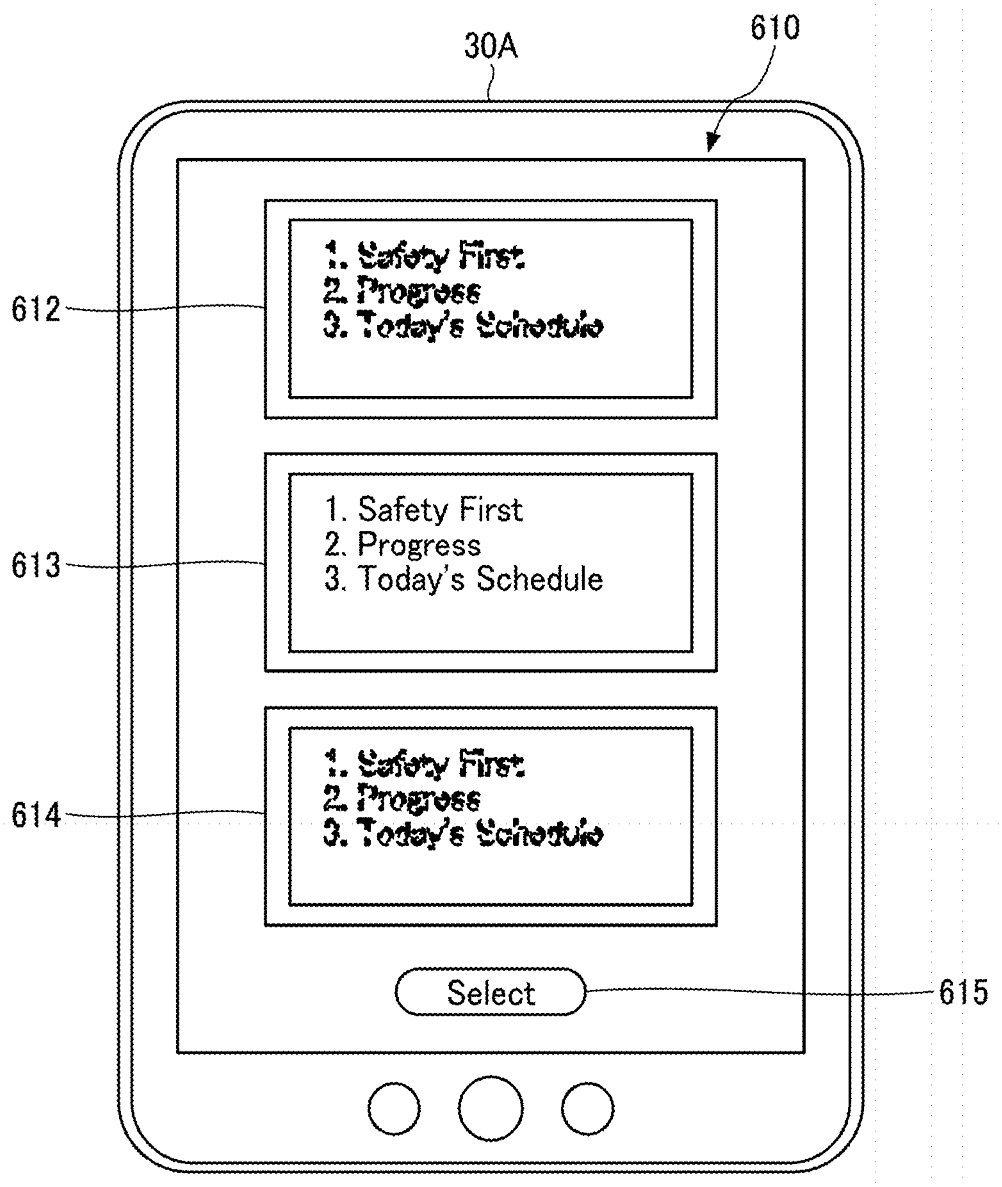
FIG. 26 is a view illustrating an example of an image frame selection screen displayed on the image capturing apparatus or the communication terminal connected to the image capturing apparatus.

FIG. 26 illustrates an image frame selection screen 610 displayed on the image capturing apparatus 10 or the communication terminal 30A connected to the image capturing apparatus 10. The image frame selection screen 610 illustrated in FIG. 26 includes three image frames 612, 613, and 614. The image frames 612 and 614 display unclear characters due to blur. The user A taps a desired image frame (e.g., the image frame 613) to make the tapped image frame selected, and then presses a "Select" button 615. As a result, the selected image frame is set as an image frame to be repeatedly transmitted.

The image frame selection screen 610 is displayed immediately after the control unit 21 stores several image frames in the storage unit 1000 in step S113. In one example, the several image frames are image frames captured at different times. Such image frames captured at different times are expected to include a little blurred image frame.

Lock Release Without Pressing of Lock Release Button 115*c*

After pressing the lock button 115*b*, the user A may forget or delay pressing the lock release button 115*c*. Accordingly, it is preferable that the lock flag be automatically turned off by a timer.

Figure 27:
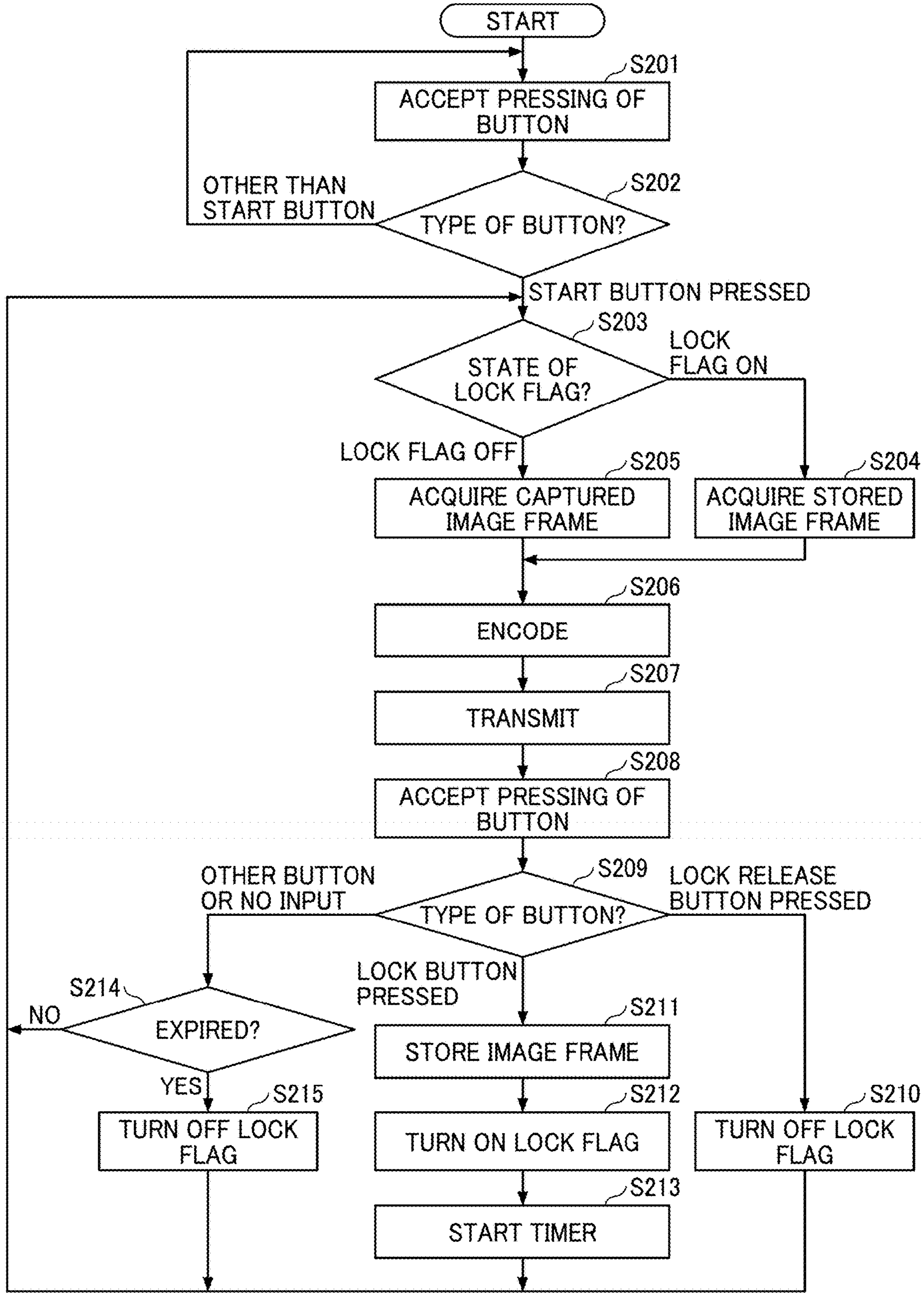
FIG. 27 is a flowchart illustrating an example process in which the image capturing apparatus locks an image frame and releases the lock of the image frame in response to button operations on the operation unit or by using a timer.

FIG. 27 is a flowchart illustrating a process in which the image capturing apparatus 10 locks an image frame and releases the lock of the image frame in response to button operations on the operation unit 115 or by using a timer. In the description of FIG. 27, differences from FIG. 25 will be described. The processing up to step S212 is similar to that in FIG. 25.

When the control unit 21 turns on the lock flag in step S212, the timer management unit 23 starts the timer (S213). When the timer has expired (Yes in S214), the control unit 21 turns off the lock flag (S215).

On the other hand, if neither the lock button 115*b* nor the lock release button 115*c* is pressed, the timer management unit 23 determines whether the timer has expired (S214). If the timer has not expired (No in S214), the process returns to step S203.

The processing described above allows start of distribution of image frames even if the user A forgets or delays pressing the lock release button 115*c*.

Image Frame Displayed on Communication Terminal while Lock Flag is on

In FIGS. 24 and 25, an image frame stored in the storage unit 1000 is transmitted repeatedly or once from the communication terminal 30 while the lock flag is on. In another example, the communication terminal 30 may transmit another image frame while the lock flag is on.

FIGS. 28A and 28B illustrate examples of an image frame displayed on the communication terminal 30B while the lock flag is on. FIG. 28A illustrates an example of a message 611 displayed on the communication terminal 30. The message 611 illustrated in FIG. 28A is displayed in the image viewing screen 210 displayed on the communication terminal 30B, as illustrated in FIG. 15B, in response to the user B entering the virtual room.

The message 611 is, for example, "Transmission will start after the video becomes stable. Please wait for a while". The message 611 allows the users B and C to know that the distribution of image data will start soon. Thus, the users B and C can wait at ease.

FIG. 28B illustrates an example of an animation displayed on the communication terminal 30. As described above, in a case where the lock is automatically released after the elapse (or expiration) of a certain amount of time, an animation may be used to display the remaining time until the lock is released. The animation includes a plurality of still images and indicates a countdown until the lock is released. The control unit 21 switches among the still images illustrated in FIG. 28B, which are prepared in advance, in accordance with the count value of the timer. The image capturing apparatus 10 transmits image frames including the count values of the timer to the communication terminal 30.

The animation allows the users B and C to know the specific time that remains until the distribution of image data starts. For example, the waiting time is five seconds. In this case, five image frames are transmitted a number of times corresponding to the number of frames per second (FPS). Since the differences between the image frames are small, the image capturing apparatus 10 can transmit little blurred image frames.

As described below, the image capturing apparatus 10 may transmit any combination of the stored image frame, the message, and the animation to the communication terminals 30B and 30C of the users B and C. In one example, an image frame including both the image frame and the message is transmitted. In another example, an image frame including both the image frame and the animation is transmitted. In another example, an image frame including the image frame, the message, and the animation is transmitted. In another example, an image frame including both the message and the animation is transmitted.

Lock of Image Frame and Lock Release of Image Frame by Remote Command

Figure 29:
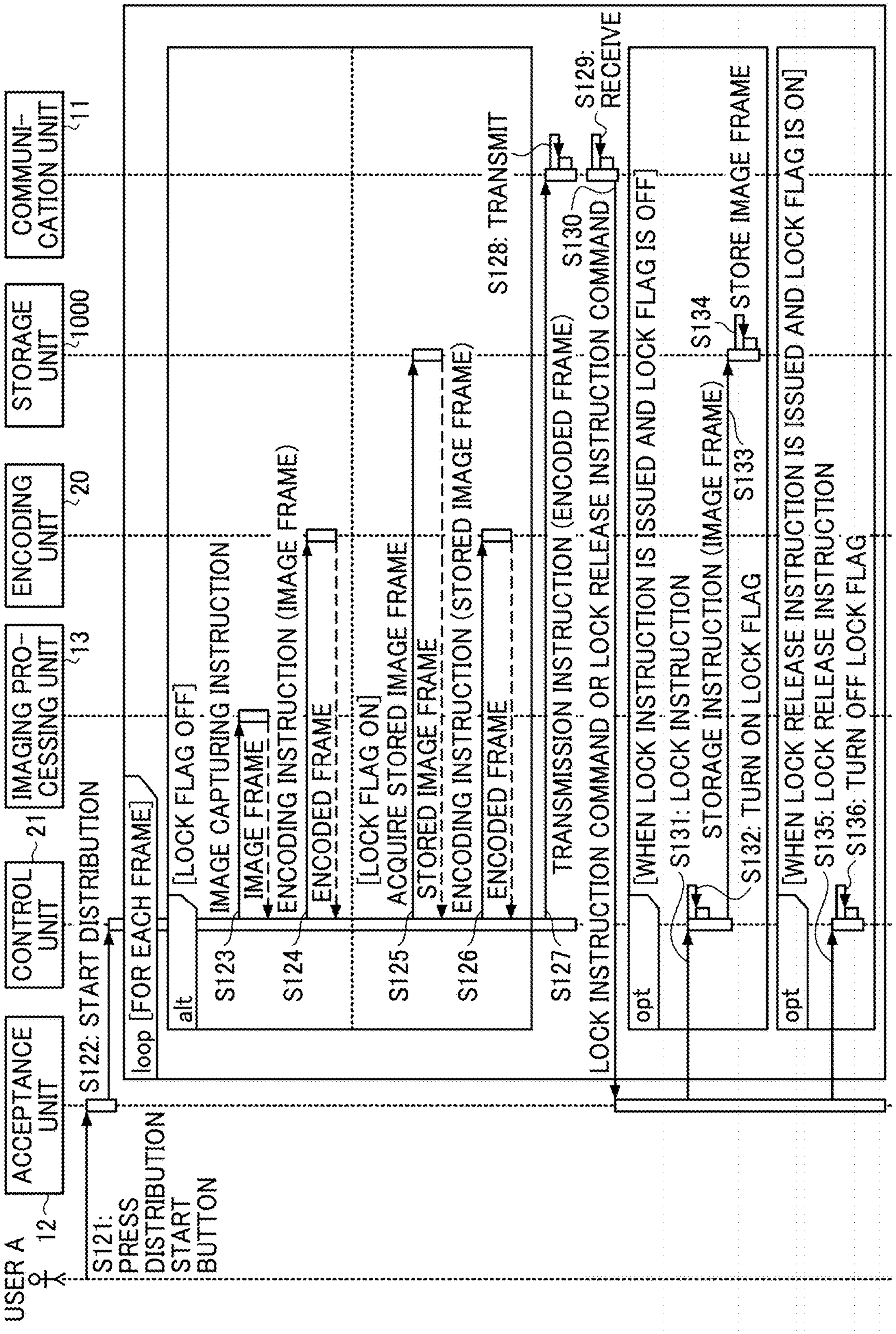
FIG. 29 is a sequence diagram illustrating an example process in which the image capturing apparatus transmits image data in response to the lock of an image frame and the release of the lock of an image frame by a remote command.

Next, a process in which the image capturing apparatus 10 locks image data or releases the lock of image data in a case where the image capturing apparatus 10 accepts the lock of an image frame or the release of the lock of an image frame from a remote location will be described with reference to FIG. 29. FIG. 29 is a sequence diagram illustrating a process in which the image capturing apparatus 10 transmits image data in response to the lock of an image frame and the release of the lock of an image frame by a remote command. The remote command is a command transmitted from the communication terminal 30 at a site different from the site where the image capturing apparatus 10 is located. The remote command may be transmitted from the same site as the site where the image capturing apparatus 10 is located (i.e., the site A). Examples of the remote commands include a lock instruction and a lock release instruction. In the description of FIG. 29, differences from FIG. 24 will be described. In FIG. 29, the processing of steps S121 to S128 is similar to the processing of steps S101 to S108 in FIG. 24.

S129: The user B or C gives a lock instruction using the communication terminal 30B or 30C on the viewer side. The communication unit 11 receives a lock instruction command. When the user B or C gives a lock release instruction using the communication terminal 30B or 30C on the viewer side, the communication unit 11 receives a lock release instruction command.

S130: The communication unit 11 notifies the acceptance unit 12 of the lock instruction command or the lock release instruction command.

S131: When the communication unit 11 receives the lock instruction command, the acceptance unit 12 notifies the control unit 21 of a lock instruction to lock an image frame.

S132: The control unit 21 sets the lock flag to on in response to being notified of the lock instruction.

S133 and S134: In response to being notified of the lock instruction, further, the control unit 21 stores, in the storage unit 1000, an image frame that has been captured when the lock flag is on.

S135: When the communication unit 11 receives the lock release instruction command, the acceptance unit 12 notifies the control unit 21 of a lock release instruction to release lock of the image frame.

S136: The control unit 21 sets the lock flag to off in response to being notified of the lock release instruction. The image frame is no longer locked, and normal image distribution resumes.

As described above, the image capturing apparatus 10 receives a lock instruction or a lock release instruction from a remote site, and it is possible to lock an image frame or release lock of an image frame from the remote site. If image data is blurred, the users B and C at remote locations can lock an image frame and release lock of the image frame.

Preferably, the image capturing apparatus 10 performs exclusive control to prevent the user C from releasing lock of an image frame instructed to be locked by the user B. The control unit 21 stores identification information of the user B who gives the lock instruction or the communication terminal 30B from which the lock instruction is transmitted, and turns off the lock flag in response to a lock release instruction being given from the user B or the communication terminal 30B. In addition, while the control unit 21 controls the lock flag to be on in accordance with the lock instruction given from the user B, the control unit 21 does not accept a lock instruction transmitted from the communication terminal 30C operated by the user C. In one example, the control unit 21 transmits an error message to the communication terminal 30C.

Figure 30:
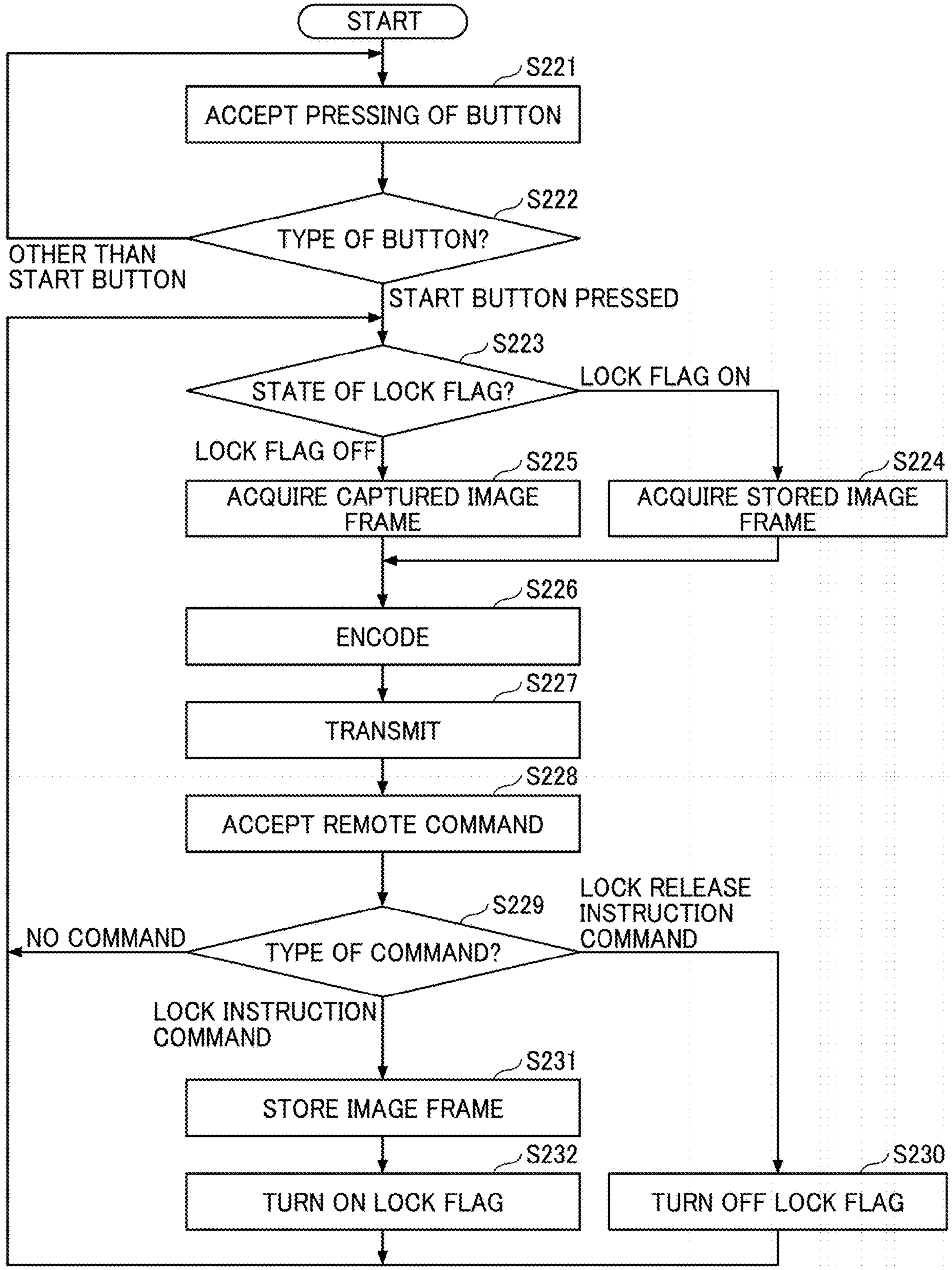
FIG. 30 is a flowchart illustrating an example process in which the image capturing apparatus locks an image frame and releases the lock of the image frame in response to a remote operation.

FIG. 30 is a flowchart illustrating a process in which the image capturing apparatus 10 locks an image frame and releases the lock of the image frame in response to a remote operation. In FIG. 30, the sequence diagram illustrated in FIG. 29 is illustrated as a flowchart. In the description of FIG. 30, differences from FIG. 25 will be described. In FIG. 30, the processing of steps S221 to S227 is similar to the processing of steps S201 to S207 in FIG. 25.

In step S227, the communication unit 11 transmits the encoded frame to the communication terminal 30. Then, the acceptance unit 12 accepts a remote command (a lock instruction or a lock release instruction) from the communication terminal 30 via the communication unit 11 (S228).

The acceptance unit 12 determines the type of the received remote command (S229). If the type of the remote command is a lock release instruction command, the control unit 21 turns off the lock flag (S230).

If the type of the remote command is a lock instruction command, the control unit 21 stores an image frame that has been captured in the storage unit (S231), and turns on the lock flag (S232).

If the type of the remote command is not a lock instruction command or a lock release instruction command, the process returns to step S223.

Even when the lock flag is turned on by a remote command, the lock flag may be automatically turned off by the timer. In this case, processing similar to the processing of steps S213 and S214 illustrated in FIG. 27 is performed.

Lock of Image Frame and Lock Release of Image Frame by Object Detection

Next, a process in which the image capturing apparatus 10 locks image data in response to the image capturing apparatus 10 detecting a predetermined object will be described with reference to FIG. 31. As described above with reference to FIG. 23, in some cases, the user A stops moving to capture an image of a predetermined object such as the electronic whiteboard 601. In other words, the user A stops moving to cause the image capturing apparatus 10 to capture an image of the predetermined object. In such cases, the image capturing apparatus 10 automatically turns on the lock flag in response to the image capturing apparatus 10 detecting the predetermined object, without the user A pressing the lock button 115*b*.

The object varies depending on what image the user A desires to capture. As described above, at the construction site, the electronic whiteboard 601 may be an object. In another example, a piece of heavy construction equipment may be an object. In another embodiment, the user A captures an image of the operating room. In this case, for example, a main unit 356 described below or an organ may be an object. In one example, the object to be detected by the image capturing apparatus 10 is set in advance.

Figure 31:
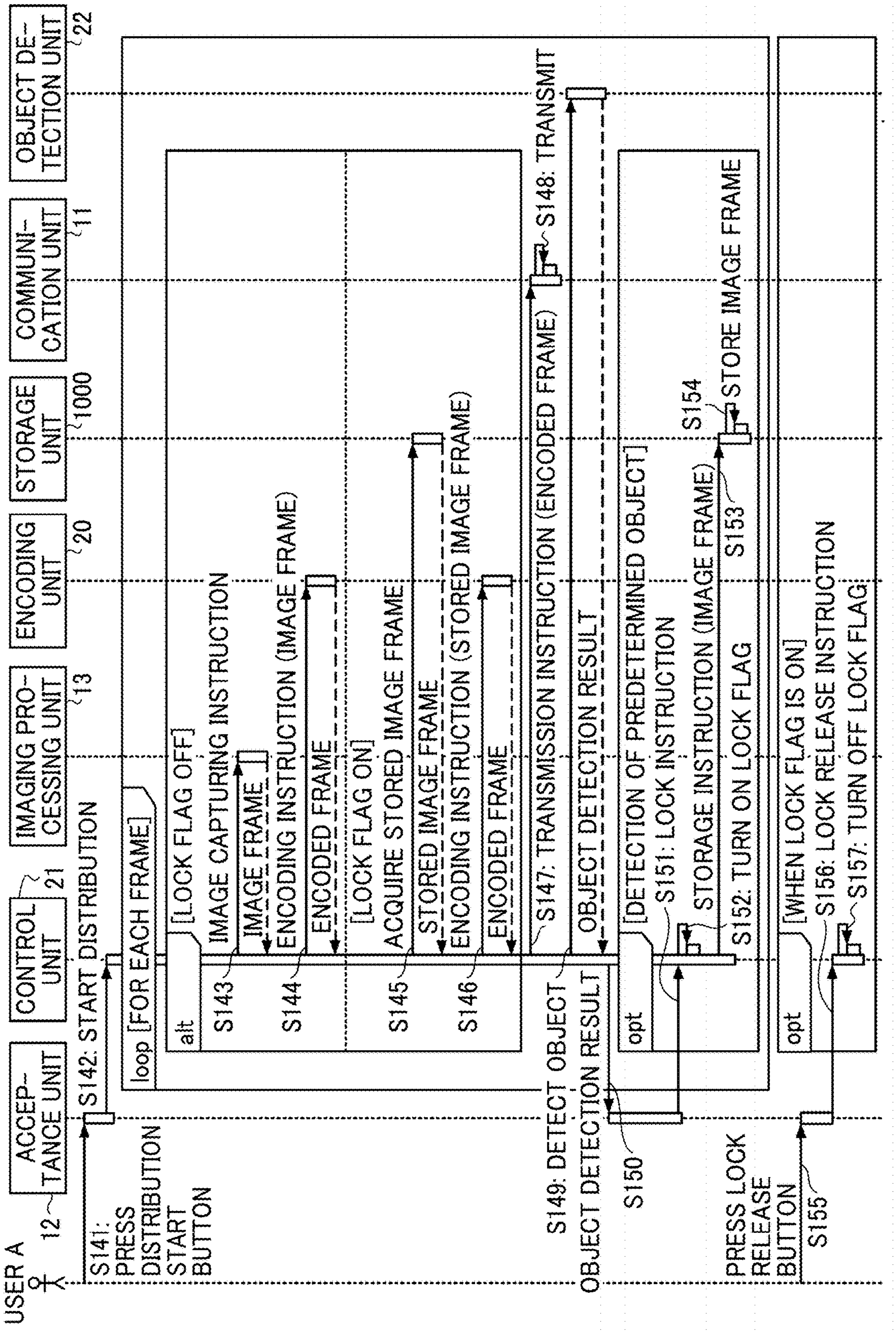
FIG. 31 is a sequence diagram illustrating an example process in which the image capturing apparatus transmits image data in response to an image frame being locked by detection of an object.

FIG. 31 is a sequence diagram illustrating a process in which the image capturing apparatus 10 transmits image data in response to an image frame being locked by detection of an object. In the description of FIG. 31, differences from FIG. 24 will be described. In FIG. 31, the processing of steps S141 to S148 is similar to the processing of steps S101 to S108 in FIG. 24.

S149: The control unit 21 requests the object detection unit 22 to detect an object, and acquires a detection result of the object from the object detection unit 22.

The object to be detected is a predetermined object that has been learned in advance by machine learning. Machine learning is a technique that enables a computer to acquire human-like learning ability. Machine learning refers to a technology in which a computer autonomously generates an algorithm to be used for determination such as data identification from training data loaded in advance and applies the generated algorithm to new data to make a prediction. Any suitable learning method is used in machine learning. For example, any one of supervised learning, unsupervised learning, semi-supervised learning, reinforcement learning, and deep learning, or a combination of two or more of those learning methods may be used.

For example, a convolutional neural network is known as an algorithm for object recognition such as the object detection according to this embodiment. A person in charge prepares in advance identification information of an object to be detected and a large number of items of image data including the object to construct a convolutional neural network. Accordingly, the object detection unit 22 outputs, for an input image frame, identification information of an object included in the image frame.

When the image capturing apparatus 10 is a spherical (omnidirectional) image capturing apparatus, due to the wide angle of view of the image capturing apparatus 10, the object may be included in an image frame captured by the user A with the image capturing apparatus 10 before the user A approaches the object. In this case, the lock flag may be turned on before the user A sufficiently approaches the object, and an image frame may be locked. Accordingly, it is preferable that the object detection unit 22 determine that an object has been detected when a certain number of pixels or more are occupied by the object.

S150: When an object is detected, the control unit 21 notifies the acceptance unit 12 of an object detection result including the detection of the object.

S151: Since the object is detected, the acceptance unit 12 notifies the control unit 21 of a lock instruction to lock an image frame.

S152: The control unit 21 sets the lock flag to on in response to being notified of the lock instruction.

S153 and S154: In response to detection of the object, further, the control unit 21 stores, in the storage unit 1000, an image frame that has been captured when the lock flag is on.

S155: The user A presses the lock release button 115*c*. The acceptance unit 12 accepts the pressing of the lock release button 115*c*. As a result, the image frame to be transmitted to the communication terminal 30 is no longer locked.

S156: The acceptance unit 12 notifies the control unit 21 that the lock of the image frame is released.

S157: The control unit 21 sets the lock flag to off in response to being notified that the lock of the image frame is released. The image frame is no longer locked, and normal image distribution resumes.

As described above, the image capturing apparatus 10 accepts a lock instruction in response to detection of a predetermined object. This configuration allows an image frame to be locked without the lock button 115*b* being pressed by the user A or a remote command being transmitted by the user B or C.

Figure 32:
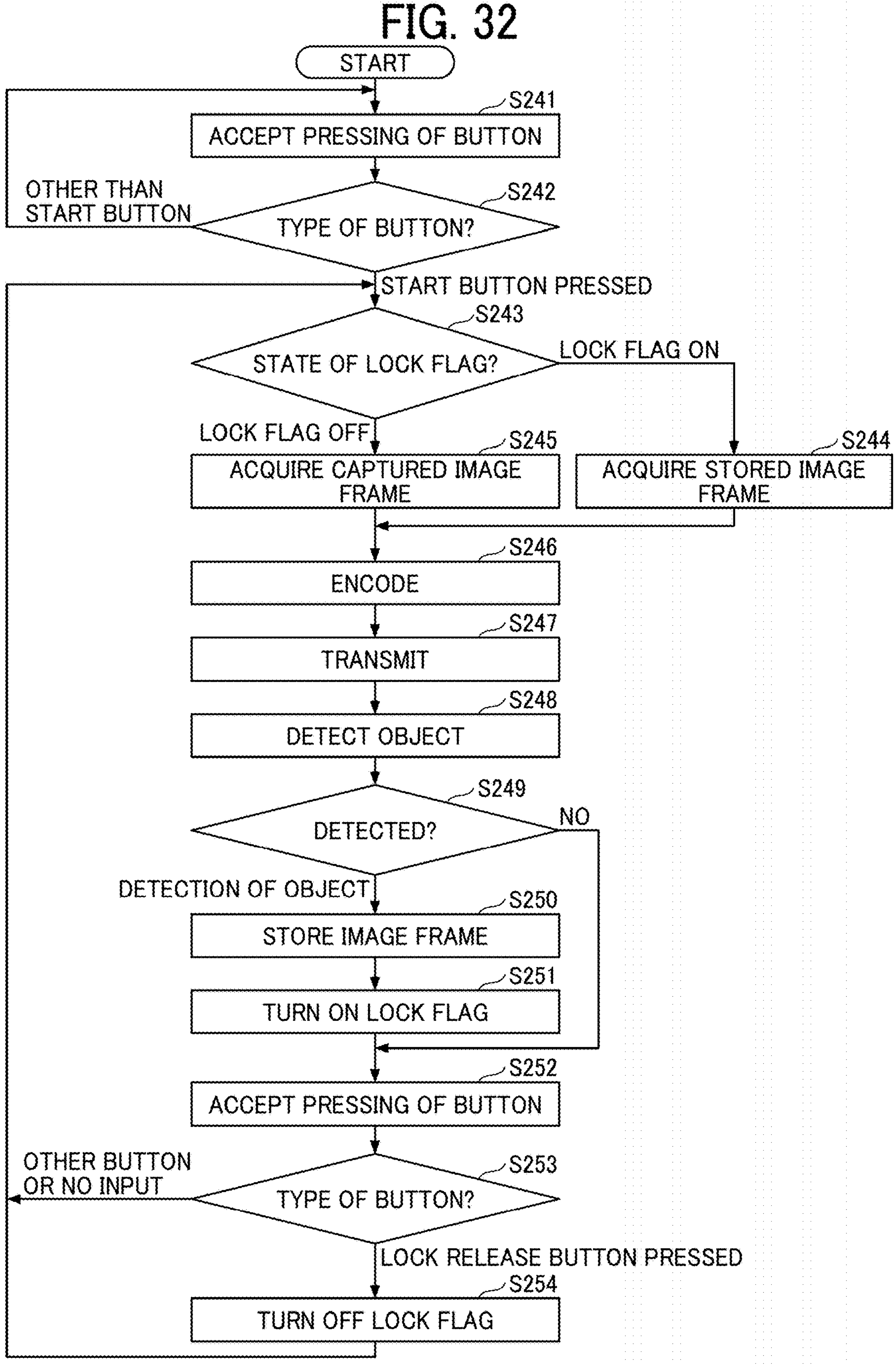
FIG. 32 is a flowchart illustrating an example process in which the image capturing apparatus locks an image frame in response to detection of an object.

FIG. 32 is a flowchart illustrating a process in which the image capturing apparatus 10 locks an image frame in response to detection of an object. In FIG. 32, the sequence diagram illustrated in FIG. 31 is illustrated as a flowchart. In the description of FIG. 32, differences from FIG. 25 will be described. In FIG. 32, the processing of steps S241 to S247 is similar to the processing of steps S201 to S207 in FIG. 25.

In step S247, the communication unit 11 transmits the encoded frame to the communication terminal 30. Then, the object detection unit 22 attempts to detect a predetermined object (S248).

The control unit 21 determines whether the object detection unit 22 has detected the predetermined object (S249). If the predetermined object is detected, the control unit 21 notifies the acceptance unit 12 that the predetermined object is detected, and stores an image frame that has already been captured in the storage unit 1000 in accordance with the lock instruction from the acceptance unit 12 (S250). Then, the control unit 21 turns on the lock flag (S251).

Then, the acceptance unit 12 accepts the pressing of a button operated on the operation unit 115 by the user A (S252). The acceptance unit 12 determines the type of the pressed button (S253). If the type of the pressed button is other than the lock release button 115*c*, the process returns to step S243.

If the type of the pressed button is the lock release button 115*c*, the control unit 21 turns off the lock flag (S254).

Even in a case where the lock flag is set to on in response to detection of a predetermined object, the timer may expire if the predetermined object is not detected within a certain period of time, and the lock flag may be automatically turned off. In a case where an image frame is automatically locked in response to detection of an object, the user A is less likely to notice the lock of the image frame. Thus, it is effective to automatically turn off the lock flag by using the timer.

The lock flag may be automatically turned off in a state where a predetermined object is detected. In a case where the user A has captured an image of an object for an amount of time sufficient for the quality of the image to be stable, the quality of the image is likely to be stable even after the lock is released. In addition, the viewer can view an image frame that is not kept locked.

Lock of Image Frame by Detection of Stop

Next, a process in which the image capturing apparatus 10 locks image data in response to detection of the stop of the image capturing apparatus 10 will be described with reference to FIG. 33. As described above with reference to FIG. 23, in some cases, the user A stops moving to capture an image of a predetermined object such as the electronic whiteboard 601. In other words, the user A is likely to stop moving to reduce blur. The image capturing apparatus 10 automatically turns on the lock flag in response to detection of the stop of the image capturing apparatus 10, without the user A pressing the lock button 115*b*. This configuration is based on the assumption that when the user A stops moving, the image capturing apparatus 10 also stops moving and that when the image capturing apparatus 10 stops moving, the user A also stops moving.

Figure 33:
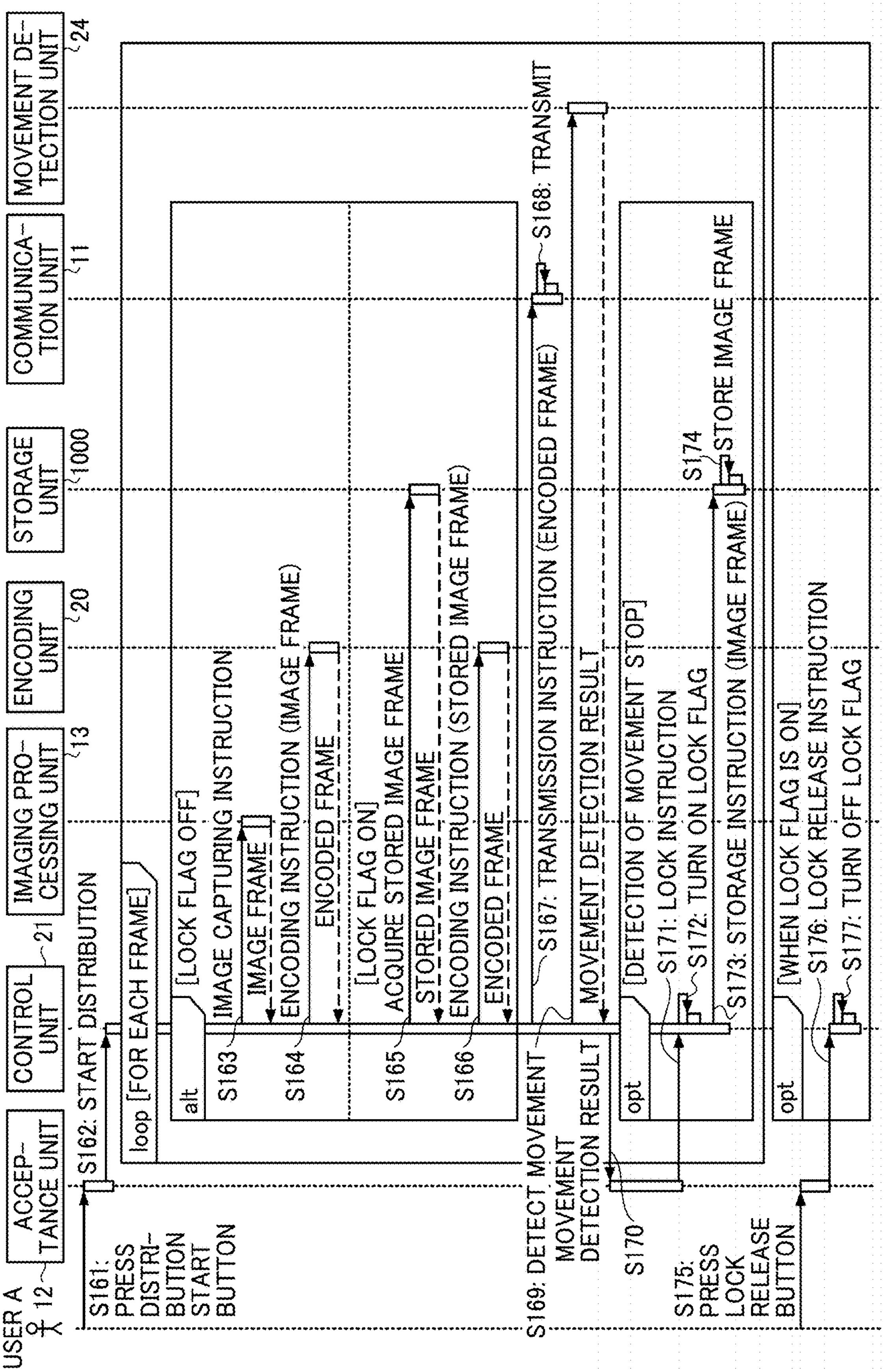
FIG. 33 is a sequence diagram illustrating an example process in which the image capturing apparatus transmits image data in response to an image frame being locked in response to detection of the stop of the image capturing apparatus.

FIG. 33 is a sequence diagram illustrating a process in which the image capturing apparatus 10 transmits image data in response to an image frame being locked in response to detection of the stop of the image capturing apparatus 10. In the description of FIG. 33, differences from FIG. 24 will be described. In FIG. 33, the processing of steps S161 to S168 is similar to the processing of steps S101 to S108 in FIG. 24.

S169: The control unit 21 requests the movement detection unit 24 to detect the movement of the image capturing apparatus 10 and acquires a detection result of the movement from the movement detection unit 24. In this embodiment, it is desirable to detect whether the image capturing apparatus 10 is moving or stationary. Accordingly, the movement detection unit 24 monitors the signals of the acceleration sensor 120 and the gyro sensor 119 and determines whether the image capturing apparatus 10 is stationary. For example, since the acceleration is integrated to obtain the velocity, the movement detection unit 24 integrates the acceleration and determines whether the velocity is substantially zero. Processing similar to that for the acceleration sensor 120 is performed for the gyro sensor 119. In another embodiment, the movement detection unit 24 determines whether the image capturing apparatus 10 is moving or stationary by using a model obtained by machine learning of the correspondence between the signals of the acceleration sensor 120 and the gyro sensor 119 and an event as to whether the image capturing apparatus 10 is moving or stationary.

S170: When the stop is detected, the control unit 21 notifies the acceptance unit 12 of a movement detection result including the detection of the stop.

S171: Since the image capturing apparatus 10 has stopped, the acceptance unit 12 notifies the control unit 21 of a lock instruction to lock an image frame.

S172: The control unit 21 sets the lock flag to on in response to being notified of the lock instruction.

S173 and S174: In response to detection of the stop of the image capturing apparatus 10, further, the control unit 21 stores, in the storage unit 1000, an image frame that has been captured when the lock flag is on.

S175: The user A presses the lock release button 115*c*. The acceptance unit 12 accepts the pressing of the lock release button 115*c*. As a result, the image frame to be transmitted to the communication terminal 30 is no longer locked.

S176: The acceptance unit 12 notifies the control unit 21 that the lock of the image frame is released.

S177: The control unit 21 sets the lock flag to off in response to being notified that the lock of the image frame is released. The image frame is no longer locked, and normal image distribution resumes.

As described above, the image capturing apparatus 10 accepts a lock instruction in response to detection of the stop of the image capturing apparatus 10. This configuration allows an image frame to be locked without the lock button 115*b* being pressed by the user A or a remote command being transmitted by the user B or C.

Figure 34:
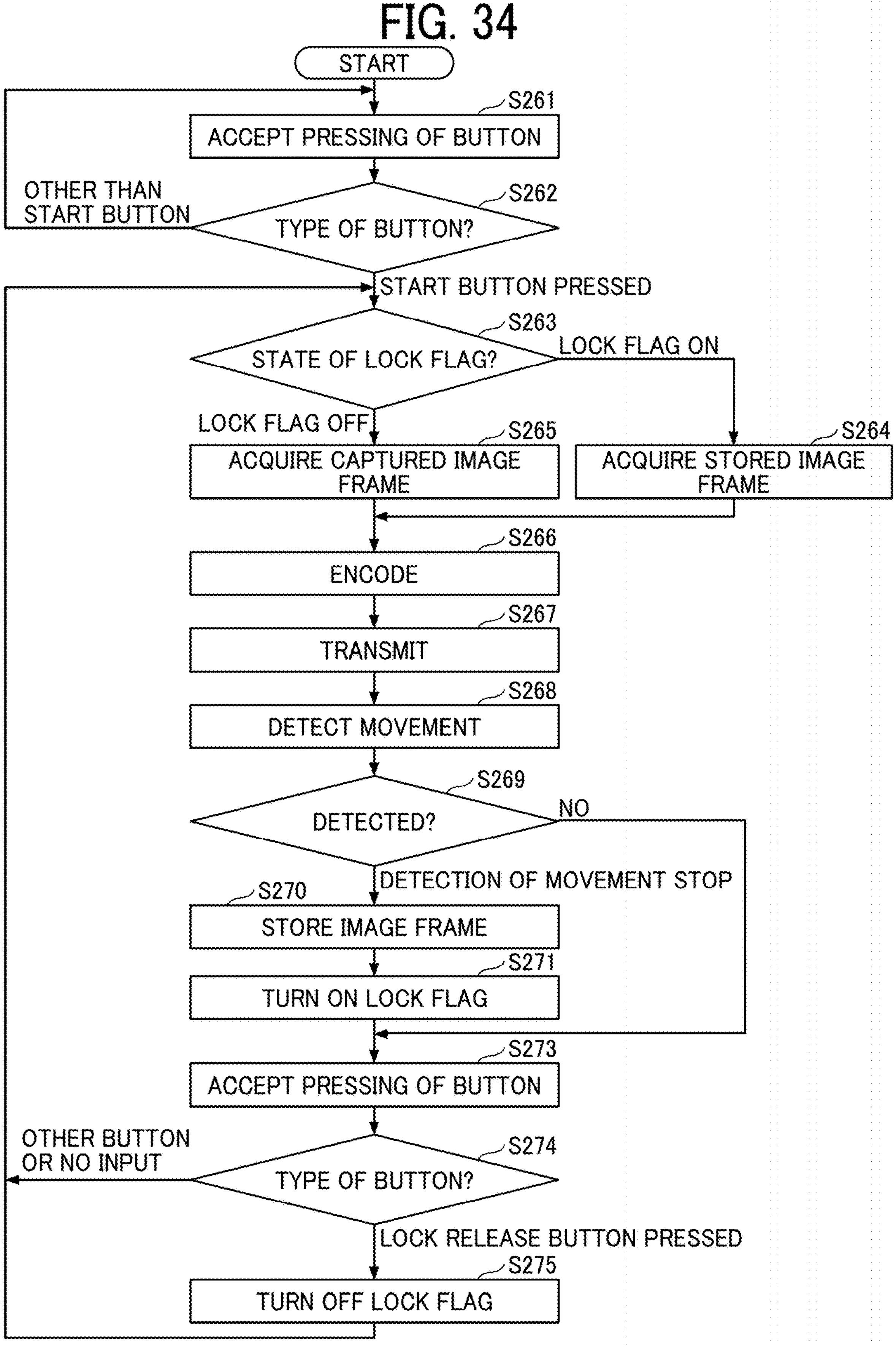
FIG. 34 is a flowchart illustrating an example process in which the image capturing apparatus locks an image frame in response to detection of the stop of the image capturing apparatus.

FIG. 34 is a flowchart illustrating a process in which the image capturing apparatus 10 locks an image frame in response to detection of the stop of the image capturing apparatus 10. In FIG. 34, the sequence diagram illustrated in FIG. 33 is illustrated as a flowchart. In the description of FIG. 34, differences from FIG. 25 will be described. In FIG. 34, the processing of steps S261 to S267 is similar to the processing of steps S201 to S207 in FIG. 25.

In step S267, the communication unit 11 transmits the encoded frame to the communication terminal 30. Then, the movement detection unit 24 detects whether the image capturing apparatus 10 is moving or stationary (S268).

The control unit 21 determines whether the movement detection unit 24 has detected the stop of the image capturing apparatus 10 (S269). If the stop of the image capturing apparatus 10 has been detected, the control unit 21 notifies the acceptance unit 12 of the stop of the image capturing apparatus 10, and stores an image frame that has already been captured in the storage unit 1000 in accordance with the lock instruction from the acceptance unit 12 (S270). Then, the control unit 21 turns on the lock flag (S271).

Then, the acceptance unit 12 accepts the pressing of a button operated on the operation unit 115 by the user A (S273). The acceptance unit 12 determines the type of the pressed button (S274).

If the type of the pressed button is the lock release button 115*c*, the control unit 21 turns off the lock flag (S275).

If the type of the pressed button is other than the lock release button 115*c* ("OTHER BUTTON OR NO INPUT" in S274), the process returns to step S263.

Accordingly, when the user A stops moving the image capturing apparatus 10 (i.e., when the user A stops moving), an image frame can be automatically locked.

Even in a case where the lock flag is set to on in response to the stop of the user A, the lock flag may be automatically turned off in response to the expiration of the timer. In a case where an image frame is automatically locked in response to the stop of the image capturing apparatus 10, the user A is less likely to notice the lock of the image frame. Thus, it is effective to automatically turn off the lock flag by using the timer.

The lock flag may be automatically turned off in response to the user A resuming movement. The user A resumes movement to turn off the lock flag without pressing the lock release button 115*c*.

Figure 35:
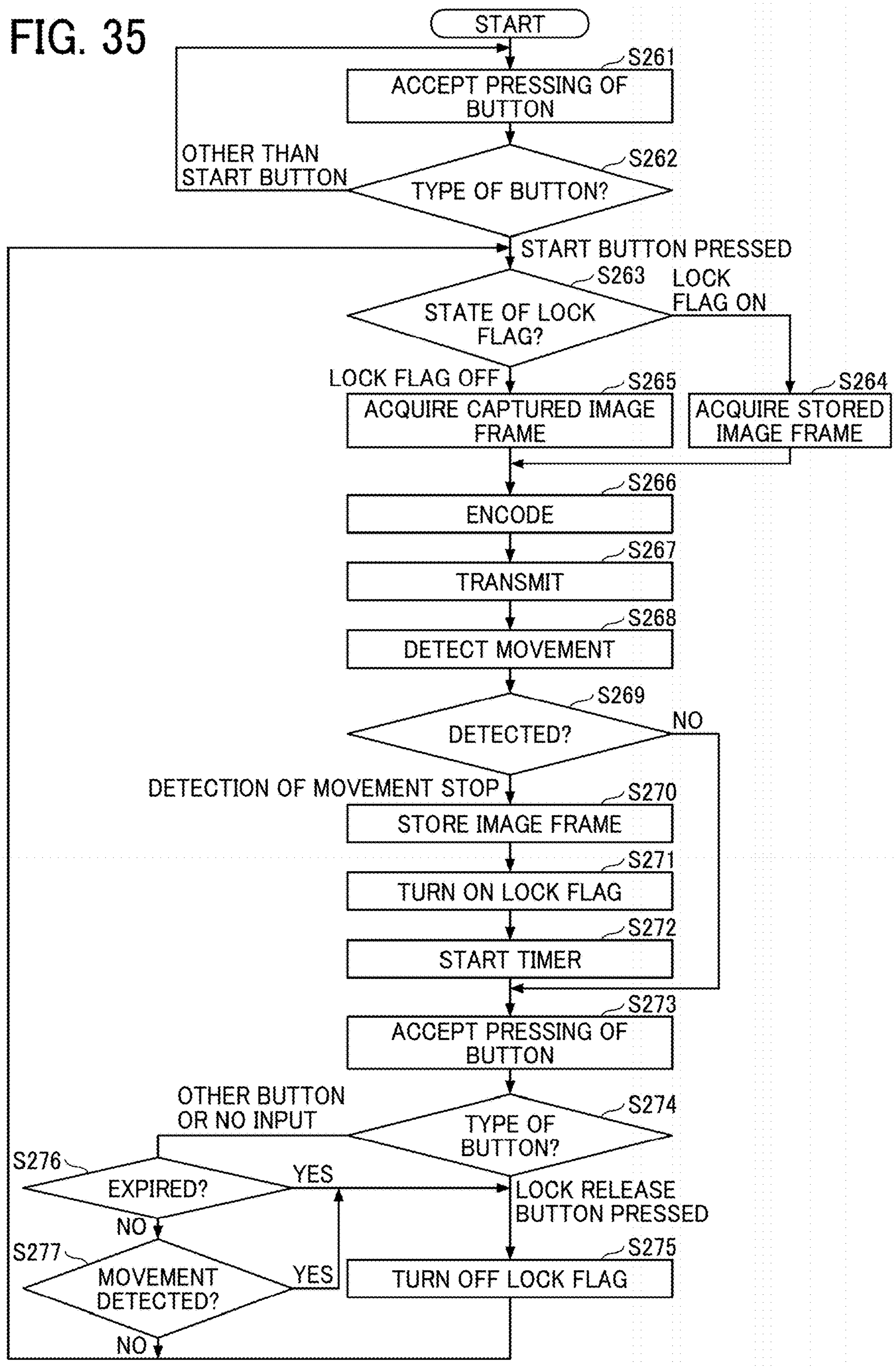
FIG. 35 is a flowchart illustrating an example process in which the image capturing apparatus locks an image frame in response to detection of the stop of the image capturing apparatus and turns off the lock flag by using the timer or in response to detection of start of movement.

FIG. 35 is a flowchart illustrating a process in which the image capturing apparatus 10 locks an image frame in response to detection of the stop of the image capturing apparatus 10 and turns off the lock flag by using the timer or in response to detection of start of movement. In the description of FIG. 35, differences from FIG. 34 will be described.

In step S271, when the control unit 21 turns on the lock flag, the control unit 21 starts the timer (S272).

After that, if it is determined in step S274 that the type of the pressed button is other than the lock release button 115*c*, the timer management unit 23 determines whether the timer has expired (S276). If the timer has expired, the timer management unit 23 turns off the lock flag (S275).

If the timer has not expired, the control unit 21 determines whether a resumption of movement is detected (S277). If a resumption of movement is detected (Yes in S277), the control unit 21 turns off the lock flag (S275).

If no movement is detected (No in S277), the process returns to step S263. As described above, the image capturing apparatus 10 can automatically lock an image frame in response to detection of the stop of the image capturing apparatus 10, and can automatically release the lock of the image frame in response to detection of a resumption of movement of the image capturing apparatus 10 or in response to the expiration of the timer.

Application Example of Communication System in Telemedicine

The following describes an application example of the communication system 1 in telemedicine.

Figure 36:
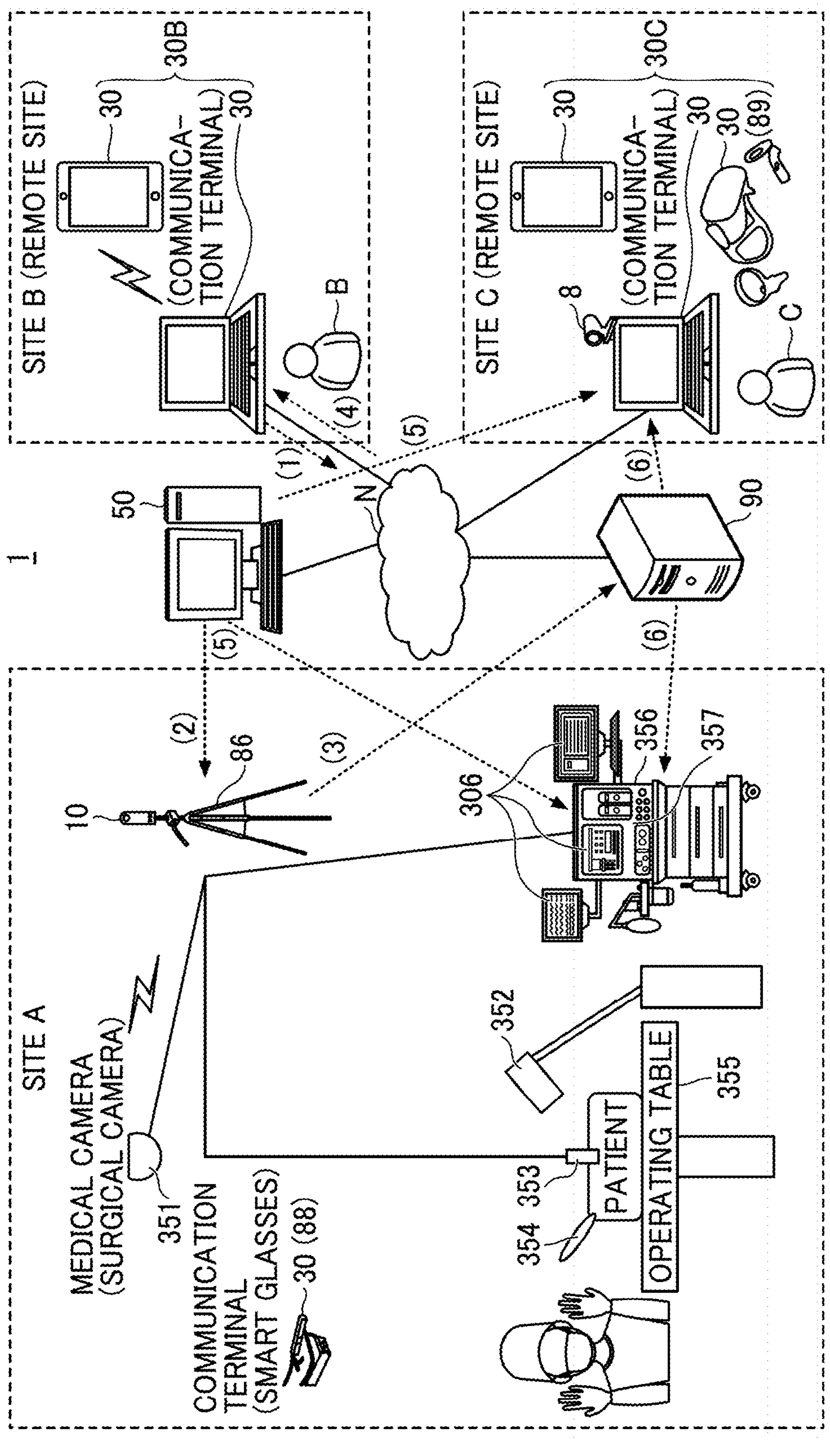
FIG. 36 is a diagram illustrating an example of remote communication using the communication system in telemedicine.

FIG. 36 is a diagram illustrating an example of remote communication using the communication system 1 in telemedicine. In the description of FIG. 36, differences from FIG. 1 will be described. In FIG. 36, the site A is an operating room. The processing steps (1) to (6) in FIG. 36 are similar to those in FIG. 1. In FIG. 36, a patient is placed on an operating table 355 and is subjected to surgery by a medical professional such as a surgeon. The medical professional (corresponding to the user) operates on the patient with various surgical tools 354 such as forceps and a scalpel. The medical professional may wear the smart glasses 88 and transmit an image of the surgical field for surgery performed by the medical professional to the communication network N. Various cameras are placed in the operating room. Examples of the cameras include a surgical camera 351, a surgical field camera 352, and an endoscope 353. All of the cameras in the operating room and the smart glasses 88 are associated with a virtual room.

A main unit 356 is installed in the operating room. The main unit 356 monitors the vitals of a patient, the operating state of medical devices, and the like. The main unit 356 corresponds to the communication terminal 30 according to this embodiment. The communication terminal 30 (i.e., the main unit 356) in the operating room may have a function of receiving video from the endoscope 353 or the surgical field camera 352 in addition to the functions illustrated in FIG. 1. In one example, the communication terminal 30 displays the received video on displays 306 and transmits the video to the information processing system 50 as the video of the site at which the communication terminal 30 is located. An operation panel 357 is an input interface that accepts various operations. In one example, a medical professional operates a device in the operating room via the operation panel 357. The endoscope 353, the surgical camera 351, and the surgical field camera 352 may communicate with the information processing system 50 directly without the intervention of the communication terminal 30.

The communication terminal 30 may have the function of an electronic medical record system or the function of communicating with an electronic medical record system. The communication terminal 30 may display information on an electronic medical record on the display 306.

Figure 37:
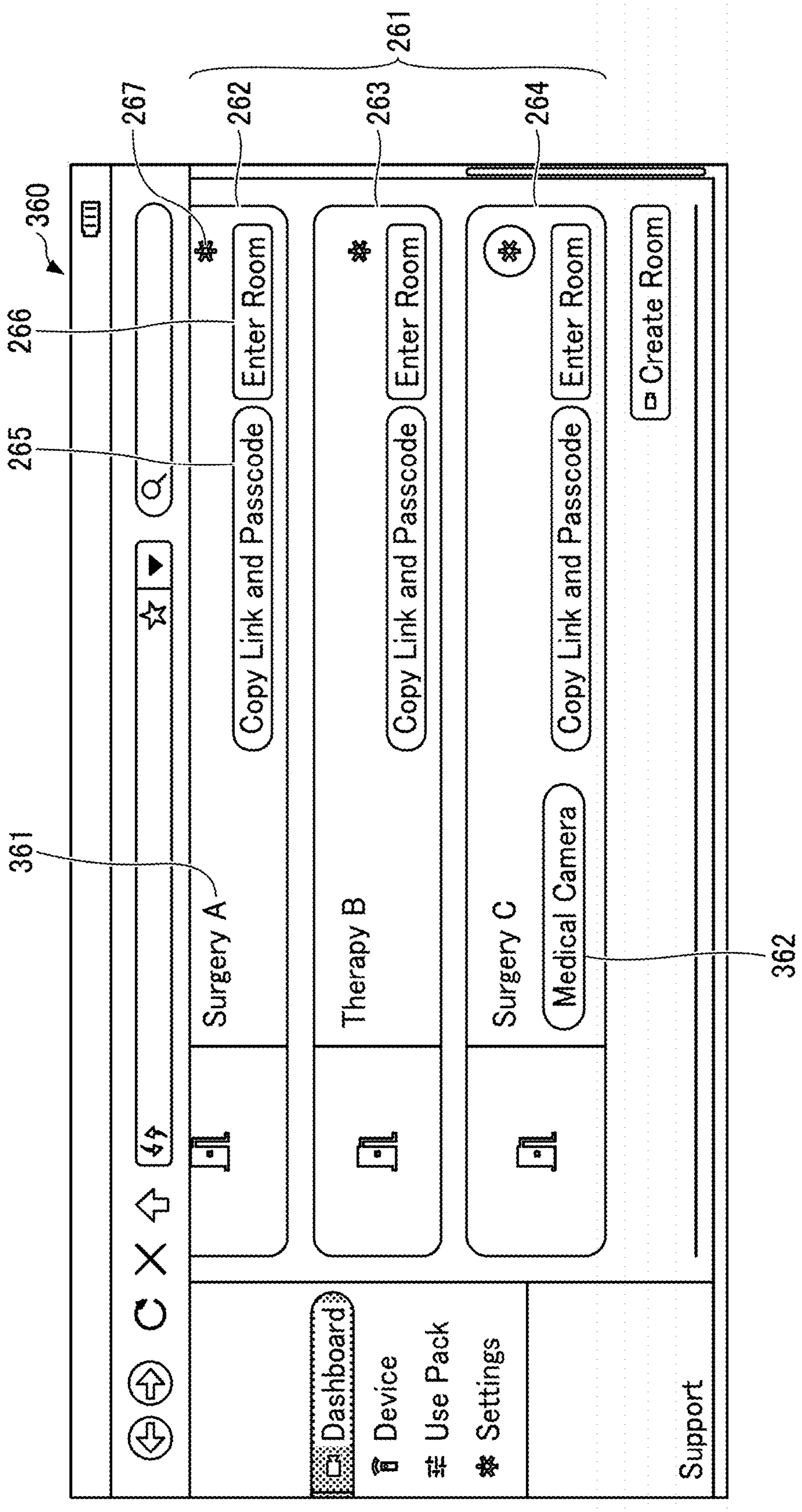
FIG. 37 is a view illustrating an example of the first virtual room association screen for associating an image capturing apparatus with a virtual room for telemedicine.

FIG. 37 is a view illustrating an example of a first virtual room association screen 360 for associating the image capturing apparatus 10 with a virtual room for telemedicine. In the description of FIG. 37, differences from FIG. 17 will be described.

In telemedicine, in one example, the first virtual room association screen 360 displays a list of virtual rooms 361 associated with remote surgery or medical therapy. One of the virtual rooms 361 is associated with a medical camera 362 including a spherical camera. Examples of the medical camera 362 include an endoscope, a surgical field camera for use in capturing a surgical field image in an operating room, and a camera that captures a microscopic image.

As described above, in the image capturing apparatus 10 according to this embodiment, a locked image frame is transmitted from the transmitter side to prevent or reduce the occurrence of blur on the receiver side (or viewer side). In one embodiment, the user A on the transmitter side locks an intended image frame and distributes the image frame without keeping the position locked in place, and the communication terminals 30B and 30C of the users B and C on the receiver side immediately display the intended image frame. As a result, the image recognizability to users may be increased.

While the present disclosure has been described using some embodiments, the embodiments do not limit the present disclosure in any way. Various modifications and replacements may be made without departing from the scope of the present disclosure.

In the example configurations such as that illustrated in FIG. 13, the information processing system 50, the image capturing apparatus 10, and the communication terminal 30 are divided according to main functions thereof to facilitate understanding of the processes performed by the information processing system 50, the image capturing apparatus 10, and the communication terminal 30. No limitation is intended by the divided units of processing or by the name of the units. The processing of each of the information processing system 50, the image capturing apparatus 10, and the communication terminal 30 may be divided into more units of processing in accordance with the content of the processing. Further, the division may be made such that each unit of processing includes more processing operations.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The apparatuses or devices described in one or more embodiments are just one example of plural computing environments that implement the one or more embodiments disclosed herein. In some embodiments, the information processing system 50 includes multiple computing devices such as a server cluster. The multiple computing devices are configured to communicate with one another through any type of communication link including, for example, a network and a shared memory, and perform the processes disclosed herein.

Further, the information processing system 50 can be configured to share the processing steps disclosed herein, for example, the processing steps illustrated in FIGS. 25, 27, 32, 34, and so on in various combinations. For example, a process executed by a predetermined unit may be executed by multiple information processing apparatuses included in the information processing system 50. The components of the information processing system 50 may be integrated into one server apparatus or divided into multiple apparatuses.

As described above, if image data to be transmitted from an image capturing apparatus is not kept locked, is has been inconvenient for the user. For example, the user moves while holding an image capturing apparatus and stops moving to distribute a wide-view image while the user is stationary. In this case, immediately after the user stops moving, it may take time to transmit an image frame with an appropriate level of quality due to, for example, the characteristics of image encoding and the available bandwidth of the network.

In view of this, with the image capturing device described above, transmission of image data, which is to be transmitted from an image capturing apparatus, is locked.

In Aspect 1, an image capturing apparatus includes an imaging processing unit, a communication unit, and an acceptance unit. The imaging processing unit performs an image capturing process to repeatedly generate image frames included in a moving image captured by the image capturing apparatus. The communication unit transmits the image frames repeatedly generated by the imaging processing unit to a communication terminal at a site different from a site at which the image capturing apparatus is located. The acceptance unit accepts a lock instruction to lock an image frame to be transmitted to the communication terminal among the image frames. The communication unit repeatedly transmits the image frame to the communication terminal in response to the acceptance unit accepting the lock instruction.

According to Aspect 2, in the image capturing apparatus of Aspect 1, the communication unit transmits the image frames repeatedly generated by the imaging processing unit to the communication terminal in response to the acceptance unit accepting a lock release instruction to release lock of the image frame.

According to Aspect 3, the image capturing apparatus of Aspect 1 further includes a lock button. The lock button receives the lock instruction. The acceptance unit accepts the lock instruction in response to pressing of the lock button.

According to Aspect 4, the image capturing apparatus of Aspect 2 further includes a lock release button. The lock release button receives the lock release instruction. The acceptance unit accepts the lock release instruction in response to pressing of the lock release button.

According to Aspect 5, in the image capturing apparatus of Aspect 1, the acceptance unit accepts the lock instruction by a remote command transmitted from the communication terminal.

According to Aspect 6, in the image capturing apparatus of Aspect 2, the acceptance unit accepts the lock release instruction by a remote command transmitted from the communication terminal.

According to Aspect 7, the image capturing apparatus of Aspect 1 further includes an object detection unit. The object detection unit detects a predetermined object from the image frames generated by the imaging processing unit. The acceptance unit accepts the lock instruction in response to the object detection unit detecting the predetermined object.

According to Aspect 8, in the image capturing apparatus of Aspect 7, the predetermined object includes an electronic whiteboard.

According to Aspect 9, the image capturing apparatus of Aspect 1 further includes a movement detection unit. The movement detection unit detects whether the image capturing apparatus is moving or has stopped. The acceptance unit accepts the lock instruction in response to the movement detection unit detecting a stop of the image capturing apparatus.

According to Aspect 10, in the image capturing apparatus of Aspect 9, in response to the movement detection unit detecting a start of movement of the image capturing apparatus, the acceptance unit accepts a lock release instruction to release lock of the image frame, and the communication unit transmits the image frames repeatedly generated by the imaging processing unit to the communication terminal.

According to Aspect 11, the image capturing apparatus of any one of Aspects 1 to 10 further includes a timer management unit. The timer management unit starts a timer in response to the acceptance unit accepting the lock instruction. The communication unit starts transmission of the image frames repeatedly generated by the imaging processing unit to the communication terminal in response to expiration of the timer.

According to Aspect 12, the image capturing apparatus of any one of Aspects 1 to 11 further includes a control unit. The control unit stores an image frame that has been generated by the imaging processing unit in a case where the acceptance unit accepts the lock instruction among the image frames. In response to the acceptance unit accepting the lock instruction, the communication unit repeatedly transmits the image frame stored by the control unit to the communication terminal.

According to Aspect 13, in the image capturing apparatus of Aspect 1, in response to the acceptance unit accepting the lock instruction, the communication unit transmits an image frame having a preset message among the image frames to the communication terminal.

According to Aspect 14, in the image capturing apparatus of Aspect 11, in response to the acceptance unit accepting the lock instruction, the communication unit transmits an image frame having a count value of the timer among the image frames to the communication terminal. The timer counts a time until transmission of the image frames repeatedly generated by the imaging processing unit starts.

According to Aspect 15, in the image capturing apparatus of Aspect 12, immediately after the acceptance unit accepts the lock instruction, the communication unit transmits an intra frame of the image frame that has been generated by the imaging processing unit to the communication terminal.

According to Aspect 16, in the image capturing apparatus of Aspect 12, the control unit stores a plurality of image frames that have been generated by the imaging processing unit in a case where the acceptance unit accepts the lock instruction. The image capturing apparatus further includes a display control unit. The display control unit displays the plurality of image frames. The communication unit transmits an image frame for which selection is accepted from a user among the plurality of image frames to the communication terminal.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The invention claimed is:

1. An image capturing apparatus comprising circuitry configured to:

perform an image capturing process to repeatedly generate image frames included in a moving image captured by an imaging device; transmit the image frames repeatedly generated to a communication terminal at a site different from a site at which the image capturing apparatus is located; detect whether the image capturing apparatus is moving or has stopped; accept a lock instruction to lock an image frame to be transmitted to the communication terminal among the image frames in response to the detection of a stop of the image capturing apparatus; repeatedly transmit, to the communication terminal, the image frame having a preset message in response to the acceptance of the lock instruction; save the image frame in response to the acceptance of the lock instruction; repeatedly transmit, to the communication terminal, the saved image frame in response to the acceptance of the lock instruction; and transmit an intra frame of the saved image frame to the communication terminal immediately after the acceptance of the lock instruction.

2. The image capturing apparatus according to claim 1, wherein the circuitry is configured to transmit the image frames repeatedly generated to the communication terminal in response to acceptance of a lock release instruction to release lock of the image frame.

3. The image capturing apparatus according to claim 2, further comprising an operation unit including a lock release button configured to receive the lock release instruction, wherein the circuitry is configured to accept the lock release instruction in response to pressing of the lock release button.

4. The image capturing apparatus according to claim 2, wherein the circuitry is configured to accept the lock release instruction by a remote command transmitted from the communication terminal.

5. The image capturing apparatus according to claim 1, further comprising an operation unit including a lock button configured to receive the lock instruction, wherein the circuitry is configured to accept the lock instruction in response to pressing of the lock button.

6. The image capturing apparatus according to claim 1, wherein the circuitry is configured to accept the lock instruction by a remote command transmitted from the communication terminal.

7. The image capturing apparatus according to claim 1, wherein the circuitry is configured to detect a predetermined object from the image frames, and accept the lock instruction, in response to the detection of the predetermined object.

8. The image capturing apparatus according to claim 7, wherein the predetermined object includes an electronic whiteboard.

9. The image capturing apparatus according to claim 1, wherein in response to the detection of a start of movement of the image capturing apparatus, the circuitry is configured to accept a lock release instruction to release lock of the image frame, and transmit the image frames repeatedly generated to the communication terminal.

10. The image capturing apparatus according to claim 1, wherein the circuitry is further configured to start a timer in response to the acceptance of the lock instruction, and start transmission of the image frames repeatedly generated to the communication terminal in response to expiration of the timer.

11. The image capturing apparatus according to claim 1, wherein the circuitry is configured to start a timer in response to the acceptance of the lock instruction, and include, in the image frame, a countdown value of the timer indicating a remaining time until transmission of the image frames repeatedly generated to the communication terminal is started.

12. The image capturing apparatus according to claim 1, wherein the circuitry is configured to save a plurality of image frames in response to the acceptance of the lock instruction, display the plurality of image frames on a display device, and repeatedly transmit an image frame selected by a user from among the plurality of image frames to the communication terminal.

13. A transmission method comprising: repeatedly generating image frames included in a moving image captured by an imaging device; transmitting the repeatedly generated image frames to a communication terminal at a site different from a site at which the image capturing apparatus is located; detecting whether the image capturing apparatus is moving or has stopped; accepting a lock instruction to lock an image frame to be transmitted to the communication terminal among the image frames in response to the detection of a stop of the image capturing apparatus; repeatedly transmitting, to the communication terminal, the image frame having a preset message in response to the acceptance of the lock instruction; saving the image frame in response to the acceptance of the lock instruction; repeatedly transmitting, to the communication terminal, the saved image frame in response to the acceptance of the lock instruction; and transmitting an intra frame of the saved image frame to the communication terminal immediately after the acceptance of the lock instruction.

14. A non-transitory recording medium storing a plurality of instructions which, when executed by one or more processors, causes the one or more processors to perform a transmission method comprising: repeatedly generating image frames included in a moving image captured by an imaging device; transmitting the repeatedly generated image frames to a communication terminal at a site different from a site at which the image capturing apparatus is located; detecting whether the image capturing apparatus is moving or has stopped; accepting a lock instruction to lock an image frame to be transmitted to the communication terminal among the image frames in response to the detection of a stop of the image capturing apparatus; repeatedly transmitting, to the communication terminal, the image frame having a preset message in response to the acceptance of the lock instruction; saving the image frame in response to the acceptance of the lock instruction; repeatedly transmitting, to the communication terminal, the saved image frame in response to the acceptance of the lock instruction; and transmitting an intra frame of the saved image frame to the communication terminal immediately after the acceptance of the lock instruction.

* * * * *